US012775152B2

(12) United States Patent
Shim

(10) Patent No.: US 12,775,152 B2
(45) Date of Patent: Oct. 27, 2026

(54) OPTICAL SYSTEM AND CAMERA MODULE

(71) Applicant: LG INNOTEK CO., LTD., Seoul (KR)

(72) Inventor: Ju Young Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 224 days.

(21) Appl. No.: 18/840,134

(22) PCT Filed: Feb. 22, 2023

(86) PCT No.: PCT/KR2023/002552
§ 371 (c)(1),
(2) Date: Aug. 21, 2024

(87) PCT Pub. No.: WO2023/163511
PCT Pub. Date: Aug. 31, 2023

(65) Prior Publication Data

US 2025/0189761 A1 Jun. 12, 2025

(30) Foreign Application Priority Data

Feb. 22, 2022 (KR) ........................ 10-2022-0023225

(51) Int. Cl.
*G02B 13/00* (2006.01)
*G02B 9/64* (2006.01)
*H04N 23/55* (2023.01)

(52) U.S. Cl.
CPC ........... *G02B 9/64* (2013.01); *G02B 13/0045* (2013.01); *H04N 23/55* (2023.01)

(58) Field of Classification Search
CPC .................................. G02B 9/64; G02B 17/08
(Continued)

(56) References Cited

U.S. PATENT DOCUMENTS 10,185,126 B2 1/2019 Kim et al.
10,656,410 B2 5/2020 Chae et al.
(Continued)

FOREIGN PATENT DOCUMENTS

KR 10-2015-0141277 A 12/2015
KR 10-2018-0064179 A 6/2018
(Continued)

OTHER PUBLICATIONS

International Search Report dated Jun. 2, 2023 in International Application No. PCT/KR2023/002552.

*Primary Examiner* — James R Greece
(74) *Attorney, Agent, or Firm* — SALIWANCHIK, LLOYD & EISENSCHENK

(57) ABSTRACT

The optical system disclosed in an embodiment of the invention includes an image sensor; and first to seventh lenses aligned along an optical axis from the object toward the sensor, wherein a refractive power of the first lens is negative, and a composite refractive power of the second lens to the seventh lens is positive, at least one of the sixth lens and the seventh lens is made of a plastic material, each of the first to seventh lenses has an object-side surface and a sensor-side surface, and a difference between the effective diameters of the object-side surface and the sensor-side surface of the fifth lens may be the greatest among the differences between the effective diameters of the object-side surface and the sensor-side surface of each of the first to seventh lenses.

20 Claims, 37 Drawing Sheets

(58) Field of Classification Search
USPC .......................................................... 359/755
See application file for complete search history.

(56) References Cited

U.S. PATENT DOCUMENTS

| | | | |
|---|---|---|---|
| 10,845,575 B2 | 11/2020 | Kim et al. | |
| 11,169,361 B2 | 11/2021 | Kim et al. | |
| 2017/0146778 A1 | 5/2017 | Jeong et al. | |
| 2019/0049698 A1* | 2/2019 | Chen .................. | G02B 13/0045 |
| 2021/0181463 A1 | 6/2021 | Kim et al. | |

FOREIGN PATENT DOCUMENTS

| | | |
|---|---|---|
| KR | 10-2018-0070870 A | 6/2018 |
| KR | 10-2019-0067607 A | 6/2019 |
| KR | 10-2016-0107437 A | 9/2019 |
| KR | 10-2019-0128902 A | 11/2019 |
| KR | 10-2021-0151332 A | 12/2021 |

* cited by examiner

FIG. 3

| | Surface | Radius of curvature | Thickness/ Distance | Semi-aperture | Index | Abbe number | Focal length |
|---|---|---|---|---|---|---|---|
| Lens1 | S1 | 28.878 | 2.000 | 5.963 | 1.856 | 40.104 | -43.294 |
| | S2 | 15.715 | 2.210 | 5.616 | | | |
| Lens2 | S1 | -43.671 | 4.996 | 5.527 | 1.552 | 75.495 | 41.765 |
| | S2(Stop) | -15.704 | 0.820 | 5.487 | | | |
| Lens3 | S1 | 20.033 | 3.716 | 6.275 | 1.620 | 63.395 | 19.482 |
| | S2 | -28.297 | 0.100 | 6.333 | | | |
| Lens4 | S1 | 10.894 | 4.458 | 6.075 | 1.651 | 53.030 | 28.823 |
| | S2 | 97.748 | 0.000 | 5.226 | | | |
| Lens5 | S1 | 97.748 | 2.000 | 5.226 | 1.747 | 27.760 | -8.433 |
| | S2 | 6.241 | 2.126 | 4.202 | | | |
| Lens6 | S1 | 24.784 | 2.708 | 4.358 | 1.537 | 55.707 | 42.249 |
| | S2 | -258.549 | 0.906 | 4.175 | | | |
| Lens7 | S1 | 27.385 | 2.000 | 4.142 | 1.664 | 21.213 | -51.089 |
| | S2 | 14.711 | 0.303 | 4.604 | | | |
| IR Filter | S1 | | 0.400 | 4.634 | | | |
| | S2 | | 1.760 | 4.647 | | | |
| Cover | S1 | | 0.300 | 4.737 | | | |
| | S2 | | 0.040 | 4.747 | | | |
| Image | | | 0.000 | 4.754 | | | |

FIG. 4

| | L1 | | L6 | | L7 | |
|---|---|---|---|---|---|---|
| | S1 | S2 | S1 | S2 | S1 | S2 |
| Y | 28.87808 | 15.71516 | 24.7841 | -258.549 | 27.38489 | 14.71062 |
| K | -31.0704 | -5.368 | 22.47814 | -99 | 16.11027 | -0.66971 |
| A | -0.00018 | -0.00013 | 0.000448 | -0.00114 | -0.00429 | -0.00321 |
| B | -5.02E-06 | -4.70E-06 | 6.13E-07 | 0.000141 | 0.000115 | 4.05E-05 |
| C | 3.61E-07 | 6.75E-07 | 3.79E-06 | -1.19E-06 | 6.22E-06 | 1.02E-05 |
| D | -2.60E-08 | -6.28E-08 | -9.09E-07 | -1.73E-06 | -2.52E-06 | -1.76E-06 |
| E | 1.47E-09 | 4.02E-09 | 1.10E-07 | 3.08E-07 | 3.52E-07 | 1.52E-07 |
| F | -5.54E-11 | -1.67E-10 | -7.76E-09 | -2.97E-08 | -3.16E-08 | -8.17E-09 |
| G | 1.31E-12 | 4.34E-12 | 3.21E-10 | 1.73E-09 | 1.81E-09 | 2.76E-10 |
| H | -1.76E-14 | -6.37E-14 | -7.25E-12 | -5.66E-11 | -5.99E-11 | -5.41E-12 |
| J | 1.02E-16 | 4.04E-16 | 6.92E-14 | 7.97E-13 | 8.56E-13 | 4.74E-14 |

FIG. 5

| Y(mm) | T1 | G1 | T2 | G2 | T3 | G3 | T4 | G4 | T5 | G5 | T6 | G6 | T7 |
|---|---|---|---|---|---|---|---|---|---|---|---|---|---|
| 0 | 2.000 | 2.210 | 4.996 | 0.820 | 3.716 | 0.100 | 4.458 | 0.000 | 2.000 | 2.126 | 2.708 | 0.906 | 2.000 |
| 0.2 | 2.001 | 2.208 | 4.995 | 0.822 | 3.714 | 0.103 | 4.456 | 0.000 | 2.003 | 2.123 | 2.707 | 0.907 | 2.001 |
| 0.4 | 2.002 | 2.203 | 4.992 | 0.829 | 3.709 | 0.110 | 4.451 | 0.000 | 2.012 | 2.116 | 2.705 | 0.909 | 2.003 |
| 0.6 | 2.005 | 2.194 | 4.988 | 0.840 | 3.701 | 0.123 | 4.443 | 0.000 | 2.027 | 2.104 | 2.700 | 0.913 | 2.006 |
| 0.8 | 2.009 | 2.182 | 4.982 | 0.856 | 3.689 | 0.141 | 4.432 | 0.000 | 2.048 | 2.087 | 2.694 | 0.918 | 2.010 |
| 1 | 2.015 | 2.167 | 4.975 | 0.877 | 3.673 | 0.164 | 4.417 | 0.000 | 2.076 | 2.066 | 2.685 | 0.923 | 2.017 |
| 1.2 | 2.021 | 2.148 | 4.968 | 0.902 | 3.655 | 0.192 | 4.399 | 0.000 | 2.109 | 2.040 | 2.673 | 0.929 | 2.025 |
| 1.5 | 2.033 | 2.114 | 4.950 | 0.948 | 3.620 | 0.244 | 4.365 | 0.000 | 2.171 | 1.991 | 2.651 | 0.936 | 2.040 |
| 1.7 | 2.042 | 2.087 | 4.936 | 0.985 | 3.593 | 0.285 | 4.339 | 0.000 | 2.221 | 1.953 | 2.632 | 0.939 | 2.052 |
| 1.9 | 2.053 | 2.057 | 4.922 | 1.026 | 3.562 | 0.331 | 4.309 | 0.000 | 2.278 | 1.911 | 2.611 | 0.939 | 2.067 |
| 2.1 | 2.065 | 2.024 | 4.905 | 1.071 | 3.528 | 0.382 | 4.276 | 0.000 | 2.341 | 1.864 | 2.586 | 0.935 | 2.084 |
| 2.3 | 2.078 | 1.989 | 4.887 | 1.122 | 3.490 | 0.439 | 4.239 | 0.000 | 2.412 | 1.813 | 2.557 | 0.927 | 2.104 |
| 2.5 | 2.093 | 1.950 | 4.867 | 1.177 | 3.449 | 0.501 | 4.199 | 0.000 | 2.491 | 1.757 | 2.525 | 0.913 | 2.126 |
| 2.7 | 2.109 | 1.909 | 4.845 | 1.237 | 3.404 | 0.569 | 4.155 | 0.000 | 2.577 | 1.697 | 2.488 | 0.892 | 2.151 |
| 2.9 | 2.126 | 1.866 | 4.822 | 1.301 | 3.356 | 0.642 | 4.108 | 0.000 | 2.672 | 1.632 | 2.449 | 0.861 | 2.179 |
| 3.1 | 2.145 | 1.820 | 4.797 | 1.370 | 3.304 | 0.721 | 4.057 | 0.000 | 2.776 | 1.564 | 2.404 | 0.820 | 2.212 |
| 3.3 | 2.166 | 1.771 | 4.770 | 1.444 | 3.249 | 0.805 | 4.002 | 0.000 | 2.888 | 1.491 | 2.356 | 0.767 | 2.248 |
| 3.5 | 2.188 | 1.721 | 4.741 | 1.523 | 3.191 | 0.895 | 3.943 | 0.000 | 3.011 | 1.415 | 2.303 | 0.699 | 2.290 |
| 3.7 | 2.211 | 1.669 | 4.710 | 1.607 | 3.128 | 0.990 | 3.880 | 0.000 | 3.145 | 1.334 | 2.246 | 0.613 | 2.339 |
| 3.9 | 2.236 | 1.615 | 4.678 | 1.695 | 3.063 | 1.092 | 3.814 | 0.000 | 3.291 | 1.250 | 2.183 | 0.507 | 2.396 |
| 4.1 | 2.264 | 1.559 | 4.644 | 1.789 | 2.993 | 1.200 | 3.743 | 0.000 | 3.450 | 1.162 | 2.114 | | |
| 4.3 | 2.293 | 1.501 | 4.608 | 1.887 | 2.921 | 1.313 | 3.668 | 0.000 | | | | | |
| 4.5 | 2.324 | 1.442 | 4.569 | 1.991 | 2.844 | 1.433 | 3.589 | 0.000 | | | | | |
| 4.7 | 2.357 | 1.382 | 4.529 | 2.099 | 2.764 | 1.559 | 3.505 | 0.000 | | | | | |
| 4.9 | 2.392 | 1.320 | 4.487 | 2.213 | 2.680 | 1.692 | 3.416 | 0.000 | | | | | |
| 5.1 | 2.430 | 1.257 | 4.443 | 2.331 | 2.593 | 1.831 | 3.323 | 0.000 | | | | | |
| 5.3 | 2.470 | 1.193 | 4.397 | 2.455 | 2.501 | 1.977 | | | | | | | |
| 5.5 | 2.513 | 1.128 | 4.349 | 2.584 | 2.407 | 2.130 | | | | | | | |
| 5.7 | | | | | 2.308 | 2.290 | | | | | | | |
| 5.9 | | | | | 2.206 | 2.458 | | | | | | | |
| 6.1 | | | | | 2.099 | | | | | | | | |
| 6.3 | | | | | | | | | | | | | |

FIG. 6

| CRA Data | | | |
|---|---|---|---|
| Field | Room temperature | Low temperature | High temperature |
| 0 | 0 | 0 | 0 |
| 0.1 | 2.169 | 2.176 | 2.160 |
| 0.2 | 4.321 | 4.335 | 4.304 |
| 0.3 | 6.431 | 6.452 | 6.406 |
| 0.4 | 8.470 | 8.496 | 8.439 |
| 0.5 | 10.405 | 10.435 | 10.370 |
| 0.6 | 12.207 | 12.237 | 12.171 |
| 0.7 | 13.845 | 13.872 | 13.813 |
| 0.8 | 15.293 | 15.312 | 15.269 |
| 0.9 | 16.549 | 16.556 | 16.539 |
| 1 | 17.662 | 17.656 | 17.666 |

FIG. 14

| | Surface | Radius of curvature | Thickness/ Distance | Semi-aperture | Index | Abbe number | Focal length |
|---|---|---|---|---|---|---|---|
| Lens1 | S1 | 26.707 | 4.026 | 6.919 | 1.856 | 40.104 | -53.309 |
| | S2 | 15.678 | 5.151 | 5.926 | | | |
| Lens2 | S1 | -33.188 | 4.992 | 5.576 | 1.552 | 75.495 | 50.299 |
| | S2(Stop) | -15.928 | 0.393 | 5.547 | | | |
| Lens3 | S1 | 22.740 | 4.575 | 6.166 | 1.620 | 63.395 | 20.814 |
| | S2 | -27.573 | 0.103 | 6.301 | | | |
| Lens4 | S1 | 11.571 | 4.549 | 6.114 | 1.651 | 53.030 | 15.855 |
| | S2 | -81.248 | 0.000 | 5.385 | | | |
| Lens5 | S1 | -81.248 | 3.111 | 5.385 | 1.747 | 27.760 | -7.967 |
| | S2 | 6.528 | 0.956 | 4.155 | | | |
| Lens6 | S1 | 18.392 | 2.685 | 4.183 | 1.537 | 55.707 | 33.458 |
| | S2 | -742.843 | 1.358 | 3.972 | | | |
| Lens7 | S1 | -28.006 | 2.000 | 3.954 | 1.664 | 21.213 | -51.847 |
| | S2 | -154.498 | 0.100 | 4.557 | | | |
| IR Filter | S1 | | 0.400 | 4.611 | | | |
| | S2 | | 1.760 | 4.627 | | | |
| Cover | S1 | | 0.300 | 4.735 | | | |
| | S2 | | 0.040 | 4.747 | | | |
| Image | | | 0.000 | 4.754 | | | |

FIG. 15

| | L1 | | L6 | | L7 | |
|---|---|---|---|---|---|---|
| | S1 | S2 | S1 | S2 | S1 | S2 |
| Y | 26.7068 | 15.67801 | 18.39243 | -742.843 | -28.0061 | -154.498 |
| K | -0.5072 | -0.42439 | 14.04569 | -38.022 | 23.04731 | -2.88E+19 |
| A | -6.76E-05 | 3.26E-06 | 0.000195 | -0.00029 | -0.0027 | -0.00222 |
| B | -5.10E-07 | -5.19E-07 | 3.07E-06 | 1.90E-05 | 1.03E-05 | 2.11E-05 |
| C | 2.33E-11 | 2.30E-09 | 6.54E-08 | 4.28E-07 | 1.87E-07 | 8.01E-08 |
| D | -2.12E-12 | 2.78E-11 | 2.82E-09 | -1.34E-08 | -2.63E-08 | -7.26E-09 |
| E | -5.96E-13 | -3.82E-12 | 1.48E-10 | 8.29E-10 | -1.21E-09 | -1.16E-10 |
| F | 2.15E-15 | -4.85E-14 | 8.81E-12 | 8.88E-11 | 3.60E-11 | 1.23E-11 |
| G | 2.02E-16 | 2.22E-15 | 4.70E-13 | 3.35E-12 | 6.86E-12 | -2.01E-13 |
| H | 1.49E-18 | 7.07E-17 | -1.27E-16 | 1.36E-14 | 3.64E-13 | -3.36E-14 |
| J | -5.91E-20 | -1.79E-18 | -3.84E-15 | -1.13E-15 | -3.69E-14 | 8.94E-16 |

FIG. 16

| Y( mm) | T1 | G1 | T2 | G2 | T3 | G3 | T4 | G4 | T5 | G5 | T6 | G6 | T7 |
|---|---|---|---|---|---|---|---|---|---|---|---|---|---|
| 0 | 4.026 | 5.151 | 4.992 | 0.393 | 4.575 | 0.103 | 4.549 | 0.000 | 3.111 | 0.956 | 2.685 | 1.358 | 2.000 |
| 0.2 | 4.027 | 5.149 | 4.992 | 0.396 | 4.573 | 0.106 | 4.547 | 0.000 | 3.114 | 0.954 | 2.684 | 1.357 | 2.001 |
| 0.4 | 4.028 | 5.143 | 4.990 | 0.402 | 4.569 | 0.113 | 4.541 | 0.000 | 3.124 | 0.948 | 2.681 | 1.355 | 2.003 |
| 0.6 | 4.031 | 5.134 | 4.987 | 0.413 | 4.561 | 0.125 | 4.531 | 0.000 | 3.140 | 0.938 | 2.675 | 1.351 | 2.007 |
| 0.8 | 4.035 | 5.120 | 4.982 | 0.428 | 4.549 | 0.143 | 4.517 | 0.000 | 3.164 | 0.924 | 2.667 | 1.346 | 2.012 |
| 1 | 4.039 | 5.104 | 4.976 | 0.447 | 4.535 | 0.165 | 4.499 | 0.000 | 3.194 | 0.906 | 2.656 | 1.338 | 2.018 |
| 1.2 | 4.045 | 5.083 | 4.969 | 0.470 | 4.517 | 0.192 | 4.477 | 0.000 | 3.231 | 0.885 | 2.643 | 1.328 | 2.027 |
| 1.4 | 4.052 | 5.058 | 4.960 | 0.498 | 4.496 | 0.224 | 4.452 | 0.000 | 3.275 | 0.859 | 2.628 | 1.314 | 2.037 |
| 1.6 | 4.060 | 5.030 | 4.951 | 0.530 | 4.472 | 0.261 | 4.422 | 0.000 | 3.325 | 0.829 | 2.609 | 1.297 | 2.050 |
| 1.8 | 4.070 | 4.998 | 4.939 | 0.567 | 4.445 | 0.303 | 4.388 | 0.000 | 3.384 | 0.796 | 2.587 | 1.275 | 2.065 |
| 2 | 4.080 | 4.962 | 4.927 | 0.608 | 4.414 | 0.350 | 4.350 | 0.000 | 3.449 | 0.759 | 2.562 | 1.248 | 2.082 |
| 2.2 | 4.092 | 4.923 | 4.913 | 0.653 | 4.380 | 0.402 | 4.308 | 0.000 | 3.522 | 0.718 | 2.533 | 1.214 | 2.102 |
| 2.4 | 4.105 | 4.879 | 4.898 | 0.702 | 4.343 | 0.460 | 4.262 | 0.000 | 3.603 | 0.674 | 2.500 | 1.172 | 2.128 |
| 2.6 | 4.119 | 4.832 | 4.881 | 0.756 | 4.303 | 0.522 | 4.211 | 0.000 | 3.692 | 0.626 | 2.464 | 1.121 | 2.153 |
| 2.8 | 4.135 | 4.781 | 4.863 | 0.814 | 4.259 | 0.590 | 4.157 | 0.000 | 3.790 | 0.574 | 2.423 | 1.060 | 2.185 |
| 3 | 4.152 | 4.726 | 4.843 | 0.877 | 4.213 | 0.663 | 4.098 | 0.000 | 3.896 | 0.520 | 2.378 | 0.985 | 2.221 |
| 3.2 | 4.170 | 4.668 | 4.822 | 0.944 | 4.162 | 0.741 | 4.034 | 0.000 | 4.012 | 0.463 | 2.328 | 0.896 | 2.263 |
| 3.4 | 4.190 | 4.605 | 4.800 | 1.018 | 4.109 | 0.824 | 3.967 | 0.000 | 4.137 | 0.404 | 2.275 | 0.789 | 2.312 |
| 3.6 | 4.211 | 4.539 | 4.776 | 1.092 | 4.052 | 0.914 | 3.895 | 0.000 | 4.273 | 0.343 | 2.218 | 0.660 | 2.368 |
| 3.8 | 4.234 | 4.469 | 4.751 | 1.173 | 3.992 | 1.008 | 3.818 | 0.000 | 4.420 | 0.283 | 2.160 | 0.502 | 2.433 |
| 4 | 4.259 | 4.395 | 4.724 | 1.258 | 3.929 | 1.108 | 3.737 | 0.000 | 4.578 | 0.225 | | | |
| 4.2 | 4.286 | 4.317 | 4.696 | 1.348 | 3.882 | 1.214 | 3.651 | 0.000 | | | | | |
| 4.4 | 4.314 | 4.235 | 4.666 | 1.443 | 3.792 | 1.326 | 3.560 | 0.000 | | | | | |
| 4.6 | 4.344 | 4.150 | 4.634 | 1.542 | 3.718 | 1.443 | 3.465 | 0.000 | | | | | |
| 4.8 | 4.376 | 4.061 | 4.601 | 1.648 | 3.642 | 1.567 | 3.364 | 0.000 | | | | | |
| 5 | 4.410 | 3.968 | 4.566 | 1.755 | 3.561 | 1.696 | 3.259 | 0.000 | | | | | |
| 5.2 | 4.446 | 3.872 | 4.530 | 1.869 | 3.478 | 1.832 | 3.148 | 0.000 | | | | | |
| 5.4 | 4.485 | 3.772 | 4.491 | 1.987 | 3.391 | 1.974 | | | | | | | |
| 5.6 | 4.525 | | | | 3.300 | 2.123 | | | | | | | |
| 5.8 | 4.568 | | | | 3.206 | 2.279 | | | | | | | |
| 6 | 3.460 | | | | 3.108 | 2.441 | | | | | | | |
| 6.2 | | | | | | | | | | | | | |
| 6.4 | | | | | | | | | | | | | |

FIG. 17

| CRA Data | | | |
|---|---|---|---|
| Field | Room temperature | Low temperature | High temperature |
| 0 | 0 | 0 | 0 |
| 0.1 | 2.150 | 2.157 | 2.141 |
| 0.2 | 4.278 | 4.292 | 4.261 |
| 0.3 | 6.359 | 6.379 | 6.335 |
| 0.4 | 8.366 | 8.391 | 8.336 |
| 0.5 | 10.268 | 10.295 | 10.236 |
| 0.6 | 12.043 | 12.069 | 12.011 |
| 0.7 | 13.680 | 13.702 | 13.652 |
| 0.8 | 15.196 | 15.213 | 15.175 |
| 0.9 | 16.636 | 16.646 | 16.623 |
| 1 | 18.052 | 18.055 | 18.045 |

FIG. 25

| | Surface | Radius of curvature | Thickness/ Distance | Semi-aperture | Index | Abbe number |
|---|---|---|---|---|---|---|
| Lens1 | S1 | 28.491 | 4.468 | 6.861 | 1.856 | 40.104 |
| | S2 | 16.238 | 4.373 | 5.807 | | |
| Lens2 | S1 | -34.964 | 4.767 | 5.518 | 1.552 | 75.495 |
| | S2(Stop) | -16.156 | 1.251 | 5.470 | | |
| Lens3 | S1 | 24.606 | 4.153 | 6.331 | 1.620 | 63.395 |
| | S2 | -24.841 | 0.100 | 6.473 | | |
| Lens4 | S1 | 11.876 | 4.502 | 6.268 | 1.700 | 55.459 |
| | S2 | -64.462 | 0.000 | 5.556 | | |
| Lens5 | S1 | -64.462 | 3.051 | 5.556 | 1.777 | 29.735 |
| | S2 | 6.814 | 0.935 | 4.264 | | |
| Lens6 | S1 | 18.405 | 2.673 | 4.291 | 1.537 | 55.707 |
| | S2 | 311.835 | 1.317 | 4.014 | | |
| Lens7 | S1 | -36.268 | 2.000 | 3.998 | 1.664 | 21.213 |
| | S2 | 108.928 | 0.203 | 4.524 | | |
| IR Filter | S1 | | 0.400 | 4.581 | | |
| | S2 | | 1.760 | 4.600 | | |
| Cover | S1 | | 0.300 | 4.731 | | |
| | S2 | | 0.040 | 4.746 | | |
| Image | | | 0.000 | 4.751 | | |

FIG. 26

| | L1 | | L6 | | L7 | |
|---|---|---|---|---|---|---|
| | S1 | S2 | S1 | S2 | S1 | S2 |
| Y | 28.49129 | 16.23801 | 18.40462 | 311.8354 | -36.2678 | 108.9278 |
| K | -0.6635 | -0.43135 | 13.81189 | 99 | 21.95513 | -99 |
| A | -6.9E-05 | 3.46E-06 | 0.00022 | -0.00026 | -0.00267 | -0.00207 |
| B | -4.95E-07 | -5.22E-07 | 3.69E-06 | 2.24E-05 | 1.47E-05 | 2.42E-05 |
| C | 2.39E-10 | 3.81E-09 | 7.89E-08 | 5.06E-07 | 4.27E-07 | 1.22E-07 |
| D | 2.37E-12 | 4.41E-11 | 2.10E-09 | -1.11E-08 | -1.71E-08 | -6.75E-09 |
| E | -5.40E-13 | -4.09E-12 | 6.62E-11 | 9.88E-10 | -9.58E-10 | -9.55E-11 |
| F | 1.82E-15 | -5.68E-14 | 6.06E-12 | 9.75E-11 | 4.12E-11 | 1.32E-11 |
| G | 1.74E-16 | 2.27E-15 | 5.14E-13 | 3.60E-12 | 7.05E-12 | -2.09E-13 |
| H | 1.10E-18 | 7.62E-17 | 7.86E-15 | 8.60E-15 | 3.72E-13 | -3.61E-14 |
| J | -4.63E-20 | -1.85E-18 | -3.83E-15 | -1.71E-15 | -3.77E-14 | 7.90E-16 |

FIG. 27

| Y(mm) | T1 | G1 | T2 | G2 | T3 | G3 | T4 | G4 | T5 | G5 | T6 | G6 | T7 |
|---|---|---|---|---|---|---|---|---|---|---|---|---|---|
| 0 | 4.468 | 4.373 | 4.767 | 1.251 | 4.153 | 0.100 | 4.502 | 0.000 | 3.051 | 0.935 | 2.673 | 1.317 | 2.000 |
| 0.2 | 4.469 | 4.371 | 4.766 | 1.253 | 4.151 | 0.102 | 4.500 | 0.000 | 3.054 | 0.933 | 2.672 | 1.317 | 2.001 |
| 0.4 | 4.470 | 4.366 | 4.764 | 1.259 | 4.146 | 0.110 | 4.494 | 0.000 | 3.064 | 0.927 | 2.669 | 1.315 | 2.003 |
| 0.6 | 4.473 | 4.357 | 4.761 | 1.270 | 4.138 | 0.122 | 4.484 | 0.000 | 3.080 | 0.918 | 2.664 | 1.311 | 2.007 |
| 0.8 | 4.476 | 4.344 | 4.756 | 1.284 | 4.127 | 0.140 | 4.470 | 0.000 | 3.103 | 0.905 | 2.656 | 1.306 | 2.012 |
| 1 | 4.481 | 4.328 | 4.750 | 1.302 | 4.112 | 0.162 | 4.452 | 0.000 | 3.132 | 0.888 | 2.647 | 1.299 | 2.019 |
| 1.2 | 4.487 | 4.308 | 4.743 | 1.325 | 4.094 | 0.190 | 4.430 | 0.000 | 3.169 | 0.868 | 2.635 | 1.290 | 2.028 |
| 1.5 | 4.494 | 4.284 | 4.734 | 1.352 | 4.073 | 0.222 | 4.404 | 0.000 | 3.211 | 0.845 | 2.620 | 1.277 | 2.039 |
| 1.7 | 4.502 | 4.257 | 4.724 | 1.383 | 4.049 | 0.260 | 4.374 | 0.000 | 3.261 | 0.817 | 2.603 | 1.261 | 2.051 |
| 1.9 | 4.512 | 4.227 | 4.713 | 1.418 | 4.021 | 0.303 | 4.340 | 0.000 | 3.318 | 0.786 | 2.582 | 1.241 | 2.067 |
| 2.1 | 4.522 | 4.192 | 4.700 | 1.457 | 3.990 | 0.350 | 4.302 | 0.000 | 3.382 | 0.752 | 2.559 | 1.215 | 2.085 |
| 2.3 | 4.534 | 4.154 | 4.686 | 1.500 | 3.956 | 0.403 | 4.259 | 0.000 | 3.453 | 0.715 | 2.533 | 1.184 | 2.105 |
| 2.5 | 4.547 | 4.112 | 4.670 | 1.548 | 3.919 | 0.461 | 4.212 | 0.000 | 3.532 | 0.674 | 2.503 | 1.145 | 2.129 |
| 2.7 | 4.562 | 4.067 | 4.653 | 1.599 | 3.878 | 0.525 | 4.162 | 0.000 | 3.619 | 0.630 | 2.469 | 1.097 | 2.157 |
| 2.9 | 4.577 | 4.018 | 4.635 | 1.655 | 3.834 | 0.593 | 4.107 | 0.000 | 3.714 | 0.584 | 2.432 | 1.039 | 2.188 |
| 3.1 | 4.594 | 3.965 | 4.615 | 1.716 | 3.787 | 0.667 | 4.047 | 0.000 | 3.817 | 0.535 | 2.390 | 0.970 | 2.224 |
| 3.3 | 4.613 | 3.909 | 4.594 | 1.780 | 3.737 | 0.746 | 3.983 | 0.000 | 3.928 | 0.484 | 2.346 | 0.887 | 2.265 |
| 3.5 | 4.633 | 3.849 | 4.571 | 1.849 | 3.683 | 0.831 | 3.915 | 0.000 | 4.049 | 0.432 | 2.298 | 0.788 | 2.311 |
| 3.7 | 4.654 | 3.786 | 4.547 | 1.922 | 3.626 | 0.921 | 3.843 | 0.000 | 4.180 | 0.379 | 2.250 | 0.669 | 2.363 |
| 3.9 | 4.678 | 3.718 | 4.521 | 2.000 | 3.565 | 1.017 | 3.766 | 0.000 | 4.321 | 0.328 | 2.202 | 0.524 | 2.420 |
| 4 | 4.690 | 3.683 | 4.507 | 2.040 | 3.533 | 1.067 | 3.725 | 0.000 | 4.395 | 0.303 | 2.180 | 0.440 | 2.451 |
| 4.1 | 4.702 | 3.647 | 4.494 | 2.081 | 3.501 | 1.118 | 3.684 | 0.000 | 4.473 | 0.279 | 2.161 | | |
| 4.3 | 4.729 | 3.573 | 4.465 | 2.168 | 3.434 | 1.225 | 3.598 | 0.000 | 4.636 | 0.235 | | | |
| 4.5 | 4.758 | 3.494 | 4.434 | 2.258 | 3.363 | 1.338 | 3.507 | 0.000 | | | | | |
| 4.6 | 4.772 | 3.454 | 4.418 | 2.305 | 3.327 | 1.397 | 3.459 | 0.000 | | | | | |
| 4.7 | 4.788 | 3.413 | 4.402 | 2.354 | 3.289 | 1.457 | 3.411 | 0.000 | | | | | |
| 4.9 | 4.820 | 3.327 | 4.369 | 2.453 | 3.212 | 1.581 | 3.310 | 0.000 | | | | | |
| 5.1 | 4.855 | 3.238 | 4.333 | 2.558 | 3.131 | 1.712 | 3.204 | 0.000 | | | | | |
| 5.3 | 4.891 | 3.145 | 4.296 | 2.667 | 3.046 | 1.849 | 3.093 | 0.000 | | | | | |
| 5.5 | 4.930 | 3.049 | 4.257 | 2.780 | 2.959 | 1.993 | 2.977 | 0.000 | | | | | |
| 5.6 | 4.950 | 3.000 | | | 2.913 | 2.067 | 2.917 | 0.000 | | | | | |
| 5.7 | 4.971 | | | | 2.867 | 2.143 | | | | | | | |
| 5.9 | 5.015 | | | | 2.773 | 2.299 | | | | | | | |
| 6.1 | | | | | 2.674 | 2.463 | | | | | | | |
| 6.3 | | | | | 2.572 | 2.633 | | | | | | | |
| 6.4 | | | | | 2.520 | | | | | | | | |

FIG. 28

| CRA Data | | | |
|---|---|---|---|
| Field | Room temperature | Low temperature | High temperature |
| 0 | 0.000 | 0.000 | 0.000 |
| 0.1 | 2.123 | 2.130 | 2.115 |
| 0.2 | 4.230 | 4.244 | 4.214 |
| 0.3 | 6.304 | 6.324 | 6.280 |
| 0.4 | 8.323 | 8.349 | 8.293 |
| 0.5 | 10.266 | 10.295 | 10.232 |
| 0.6 | 12.115 | 12.145 | 12.079 |
| 0.7 | 13.864 | 13.893 | 13.828 |
| 0.8 | 15.528 | 15.555 | 15.495 |
| 0.9 | 17.145 | 17.170 | 17.114 |
| 1 | 18.754 | 18.777 | 18.727 |

OPTICAL SYSTEM AND CAMERA MODULE

CROSS-REFERENCE TO RELATED APPLICATIONS

This application is the U.S. national stage application of International Patent Application No. PCT/KR2023/002552, filed Feb. 22, 2023, which claims the benefit under 35 U.S.C. § 119 of Korean Application No. 10-2022-0023225, filed Feb. 22, 2022, the disclosures of each of which are incorporated herein by reference in their entirety.

TECHNICAL FIELD

An embodiment relates to an optical system for improved optical performance and a camera module including the same. An embodiment of the invention relates to an optical system for a vehicle and a camera module having the same.

BACKGROUND ART

ADAS (Advanced Driving Assistance System) is an advanced driver assistance system for assisting the driver to drive and is composed of sensing the situation in front, determining the situation based on the sensed result, and controlling the behavior of the vehicle based on the situation determination. For example, the ADAS sensor device detects a vehicle ahead and recognizes a lane. Then, when the target lane or target speed and the target in front are determined, the vehicle's ESC (Electrical Stability Control), EMS (Engine Management System), MDPS (Motor Driven Power Steering), etc. are controlled. Typically, ADAS may be implemented as an automatic parking system, a low-speed city driving assistance system, a blind spot warning system, and the like. The sensor devices for sensing the forward situation in ADAS are a GPS sensor, a laser scanner, a front radar, and a lidar, and the most representative is a camera for taking pictures of the front, rear, and side of the vehicle.

Such a camera may be placed outside or inside a vehicle to detect surrounding conditions of the vehicle. In addition, the camera may be disposed inside the vehicle to detect situations of the driver and passengers. For example, the camera may photograph the driver at a location adjacent to the driver, and detect the driver's health condition, drowsiness, or drinking. In addition, the camera may photograph the passenger at a location adjacent to the passenger, detect whether the passenger is sleeping, health status, etc., and provide information about the passenger to the driver. In particular, the most important element to obtain an image from a camera is an imaging lens that forms an image. Recently, interest in high performance, such as high image quality and high resolution, is increasing, and in order to realize this, research on an optical system including a plurality of lenses is being conducted. However, there is a problem in that the characteristics of the optical system change when the camera is exposed to harsh environments outside or inside the vehicle, such as high temperature, low temperature, moisture, and high humidity. In this case, the camera has a problem in that it is difficult to uniformly derive excellent optical characteristics and aberration characteristics. Therefore, a new optical system and camera capable of solving the above problems are required.

DISCLOSURE

Technical Problem

An embodiment provides an optical system and a camera module with improved optical characteristics. An embodiment provides an optical system and a camera module having excellent optical performance in a low-temperature to high-temperature environment. An embodiment provides an optical system and a camera module capable of inhibiting or minimizing changes in optical characteristics in various temperature ranges.

Technical Solution

An optical system according to an embodiment of the invention includes an image sensor; and first to seventh lenses aligned along an optical axis from an object toward a sensor side, wherein a refractive power of the first lens is negative, a composite refractive power of the second lens to the seventh lens is positive, at least one of the sixth lens and the seventh lens is formed of a plastic material, each of the first to seventh lenses has an object-side surface and a sensor-side surface, and a difference between effective diameters of the object-side surface and the sensor-side surface of the fifth lens may be the greatest among the differences between the effective diameters of the object-side surface and the sensor-side surface of each of the first to seventh lenses.

According to an embodiment of the invention, an absolute value of a radius of curvature of the sensor-side surface of the fifth lens may be the smallest among absolute values of a radius of curvature of the object-side surface and the sensor-side surface of the first to seventh lenses.

According to an embodiment of the invention, based on the optical axis, a distance from the sensor-side surface of the second lens to the object-side surface of the third lens is G2, and a distance from the sensor-side surface of the third lens to the object-side surface of the fourth lens is G3, a distance from the sensor-side surface of the fifth lens to the object-side surface of the sixth lens is G5, a distance from the image-side surface of the sixth lens to the object-side surface of the seventh lens is G6, and G5 may be the largest of G2, G3, G5, and G6.

According to an embodiment of the invention, a distance on the optical axis from the sensor-side surface of the first lens to the object-side surface of the second lens is G1, and a distance on the optical axis from the sensor-side surface of the seventh lens to the image sensor is BFL, and BFL may be the largest among G1, G2, G3, G5, G6, and BFL.

According to an embodiment of the invention, an effective diameter of the object-side surface of the fourth lens is CA_L4S1, an effective diameter of the sensor-side surface of the fourth lens is CA_L4S2, and it may satisfy: $1.3 \leq CA\_L4S1/CA\_L4S2 \leq 1.6$.

According to an embodiment of the invention, an average value of the effective diameter of the object-side surface of each of the first to fifth lenses is GL_CA1_AVER, an average value of the effective diameter of the object-side surfaces of each of the sixth to seventh lenses is PL_CA1_AVER, and it may satisfy: $1.20 \leq GL\_CA1\_AVER/PL\_CA1\_AVER \leq 1.55$.

An optical system according to an embodiment of the invention includes a plurality of lenses and an image sensor, wherein a first lens closest to an object among the plurality of lenses is a first glass lens and has a negative refractive power, and a composite refractive power of the lenses other than the first lens is positive, at least two or more lenses adjacent to the image sensor among the plurality of lenses are plastic lenses, an effective diameter of an object-side surface of each of the plastic lenses are smaller than an effective diameter of the object-side surface of the first glass lens, a second glass lens closest to the plastic lens may have a sensor-side surface smaller than an effective diameter of the sensor-side surface of another glass lens.

According to an embodiment of the invention, a lens closest to the image sensor is a first plastic lens, and an effective diameter of an object-side surface of the first plastic lens may be smaller than an effective diameter of a sensor-side surface of the first plastic lens. A distance between the sensor-side surface of the first plastic lens and the image sensor on an optical axis may be the largest among distances between the plurality of lenses on the optical axis. An object-side surface of the first lens may have a convex shape on the optical axis, and a horizontal field of view FOV_H of the optical system may be 30 degrees or more and 40 degrees or less.

According to an embodiment of the invention, a difference between the effective diameters of the object-side surface and the sensor-side surface of the second glass lens may be the largest among differences between the effective diameters of the object-side surface and the sensor-side surface of each of the plurality of lenses.

An optical system according to an embodiment of the invention includes a plurality of lenses and an image sensor, a first lens closest to an object among the plurality of lenses is a glass lens and has a negative refractive power, and a composite refractive power of the lenses other than the first lens is a positive, at least two or more lenses adjacent to the image sensor among the plurality of lenses are plastic lenses, a refractive index of the first lens is greater than 1.7, and an object-side surface of the first lens is convex with respect to the optical axis, and a sensor-side surface of the first lens may have a concave shape.

According to an embodiment of the invention, a horizontal angle of view of the optical system may be greater than or equal to 30 degrees and less than or equal to 40 degrees. An aperture stop disposed around a sensor-side surface of the second lens may be included.

According to an embodiment of the invention, two lenses of the plurality of lenses are combined lens bonded to each other, the combined lens includes a first combined lens and a second combined lens, and a product of a refractive power of the first combined lens and a refractive power of the second combined lens may be less than zero. The combined lens may include a first combined lens and a second combined lens, and a difference between an Abbe number of the first combined lens and an Abbe number of the second combined lens may be 20 or more and 40 or less. A distance in an optical axis between the combined lens and a lens disposed on an object side of the combined lens may be smaller than a distance in the optical axis between the image sensor and the last lens.

A distance from the first glass lens to the image sensor is TTL, a total effective focal length is F, and it may satisfy: $1.8 \leq TTL/F \leq 2.3$. The object-side surface and the sensor-side surface of the first lens may be aspheric surfaces.

An optical system or camera module according to an embodiment of the invention includes a plurality of lenses and an image sensor, wherein a refractive power of a first lens closest to an object among the plurality of lenses is negative, and a composite refractive power of lenses other than the first lens is positive, at least two or more lenses adjacent to the image sensor among the plurality of lenses are plastic lenses, the first lens and the plastic lenses are aspherical lenses, a horizontal angle of view is 30 degrees or more and 40 degrees or less, and when a temperature is changed to a high temperature (85 degrees to 105 degrees) compared to room temperature (25 degrees), a rate of change in an effective focus distance and a rate of change in the angle of view may be 0 to 5%.

Advantageous Effects

An optical system and a camera module according to an embodiment may have improved optical characteristics. In detail, in the optical system according to the embodiment, a plurality of lenses may have set thicknesses, refractive powers, and distances from adjacent lenses. Accordingly, the optical system and the camera module according to the embodiment may have improved MTF characteristics, aberration control characteristics, resolution characteristics, etc. in a set field of view range, and may have good optical performance in the periphery of the field of view.

In addition, the optical system and the camera module according to the embodiment may have good optical performance in a temperature range from low temperature (about −20° C. to −40° C.) to high temperature (85° C. to 105° C.). In detail, the plurality of lenses included in the optical system may have set materials, refractive power, and refractive index. Accordingly, even when the focal length of each lens changes due to a change in refractive index due to a change in temperature, the first to seventh lenses can compensate each other. That is, the optical system can effectively distribute refractive power in a range of the low to high temperature, and can inhibit or minimize a change in optical characteristics in a range of the low to high temperature. Therefore, the optical system and the camera module according to the embodiment may maintain improved optical characteristics in various temperature ranges.

In addition, the optical system and the camera module according to the embodiment may satisfy a set angle of view through mixing of a plastic lens and a glass lens and implement excellent optical characteristics. Due to this, the optical system can provide a more vehicle camera module. Accordingly, the optical system and the camera module may be provided for various applications and devices, and can have excellent optical properties even in harsh temperature environments, for example, exposed to the outside of a vehicle or inside a high-temperature vehicle in summer.

DESCRIPTION OF DRAWINGS

FIG. 3 is a table showing lens characteristics of the optical system of FIG. 1.

FIG. 4 is a table showing aspheric coefficients of lenses in the optical system of FIG. 1.

FIG. 5 is a table showing the thickness of each lens of the optical system of FIG. 1 and the distance between adjacent lenses.

FIG. 6 is a table showing chief ray angle (CRA) data at room temperature, low temperature, and high temperature according to positions of image sensors in the optical system of FIG. 1.

FIG. 14 is a table showing lens characteristics of the optical system of FIG. 13.

FIG. 15 is a table showing aspheric coefficients of lenses in the optical system of FIG. 13.

FIG. 16 is a table showing the thickness of each lens in the optical system of FIG. 13 and the distance between adjacent lenses.

FIG. 17 is a table showing chief ray angle (CRA) data at room temperature, low temperature, and high temperature according to positions of image sensors in the optical system of FIG. 13.

FIG. 25 is a table showing lens characteristics of the optical system of FIG. 24.

FIG. 26 is a table showing aspheric coefficients of lenses in the optical system of FIG. 24.

FIG. 27 is a table showing the thickness of each lens in the optical system of FIG. 24 and the distance between adjacent lenses.

FIG. 28 is a table showing chief ray angle (CRA) data at room temperature, low temperature, and high temperature according to positions of image sensors in the optical system of FIG. 24.

BEST MODE

Figure 1:
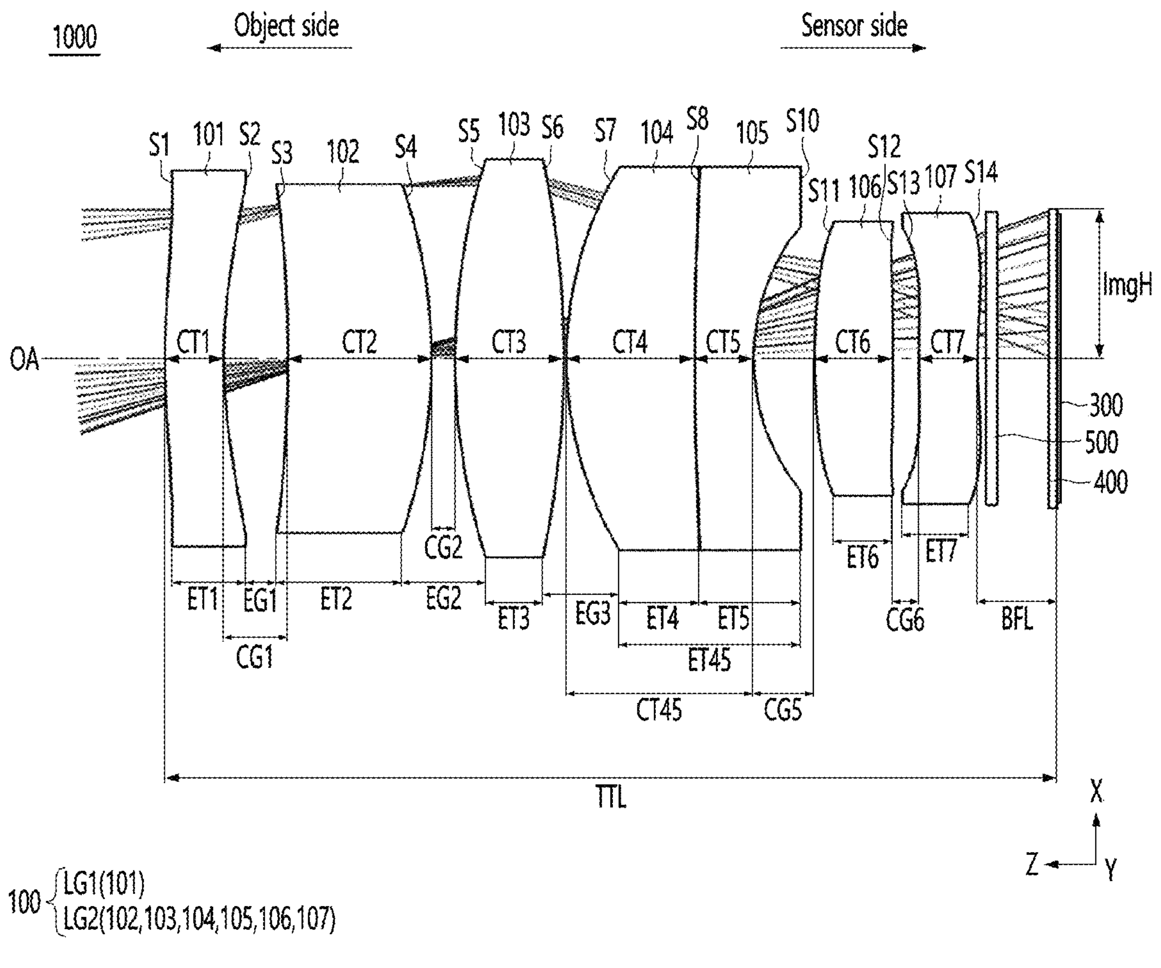
FIG. 1 is a side cross-sectional view of an optical system and a camera module having the same according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In the description of the invention, an "object-side surface" may mean a surface of the lens facing an object side with respect to the optical axis OA, and a "sensor-side surface" may mean a surface of a lens facing an imaging surface (image sensor) with respect to the optical axis. The convex surface of the lens may mean a convex shape on the optical axis or paraxial region, and the concave surface of the lens may mean a concave shape on the optical axis or paraxial region. The radius of curvature, the center thickness, and the distance between optical axes between lenses described in the table for lens data may mean values (unit, mm) along the optical axis. The vertical direction may mean a direction perpendicular to the optical axis, and an end of a lens or lens surface may mean an end of an effective region of a lens through which incident light passes. The size of the effective diameter on the lens surface may have a measurement error of up to =0.4 mm depending on the measurement method. The paraxial region refers to a very narrow region near the optical axis, and is a region in which a distance from which a light ray falls from the optical axis OA is almost zero. Hereinafter, the term "optical axis" may include the center of each lens or a very narrow area near the optical axis.

Figure 13:
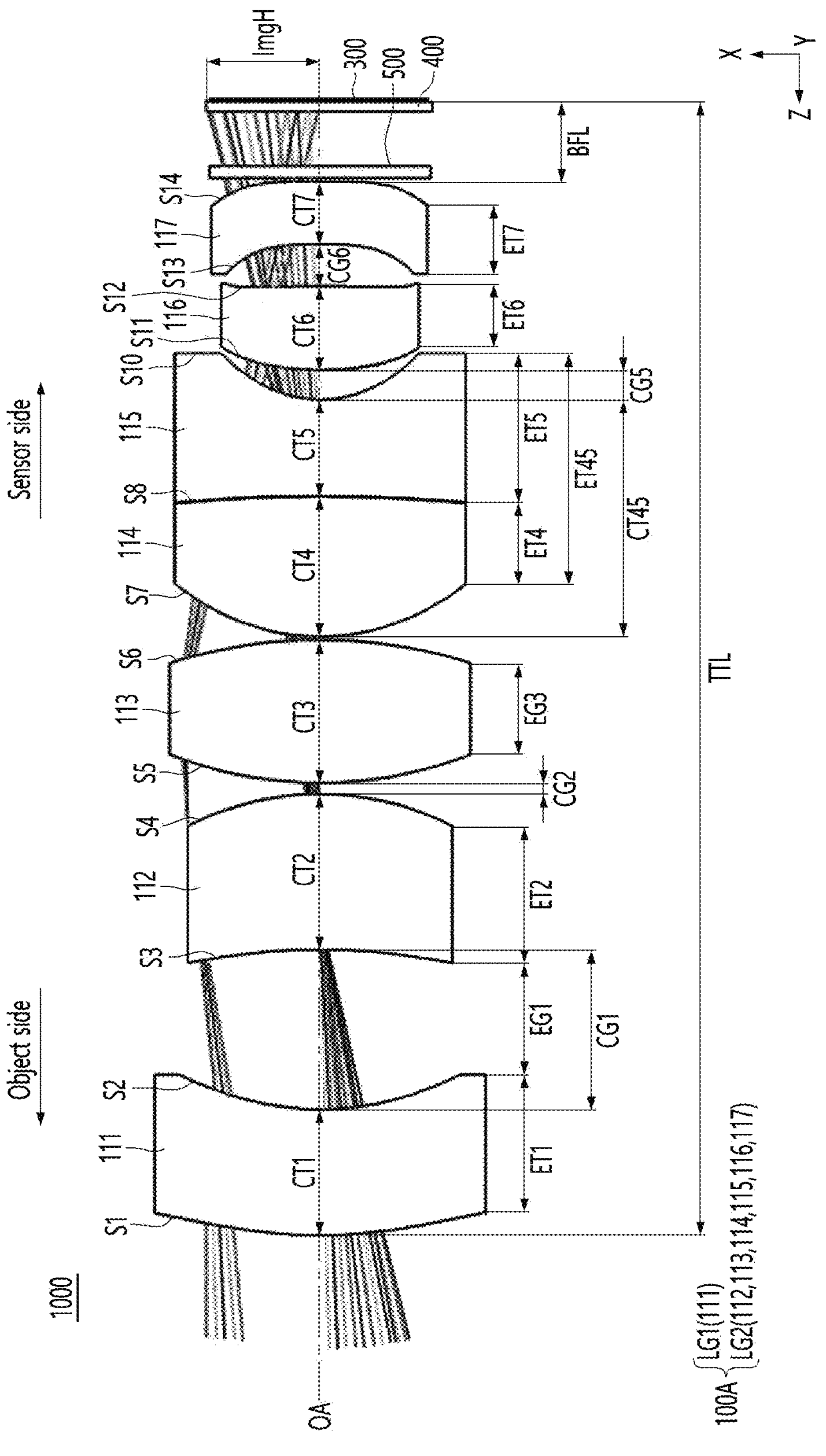
FIG. 13 is a side cross-sectional view of an optical system and a camera module having the same according to a second embodiment.
Figure 24:
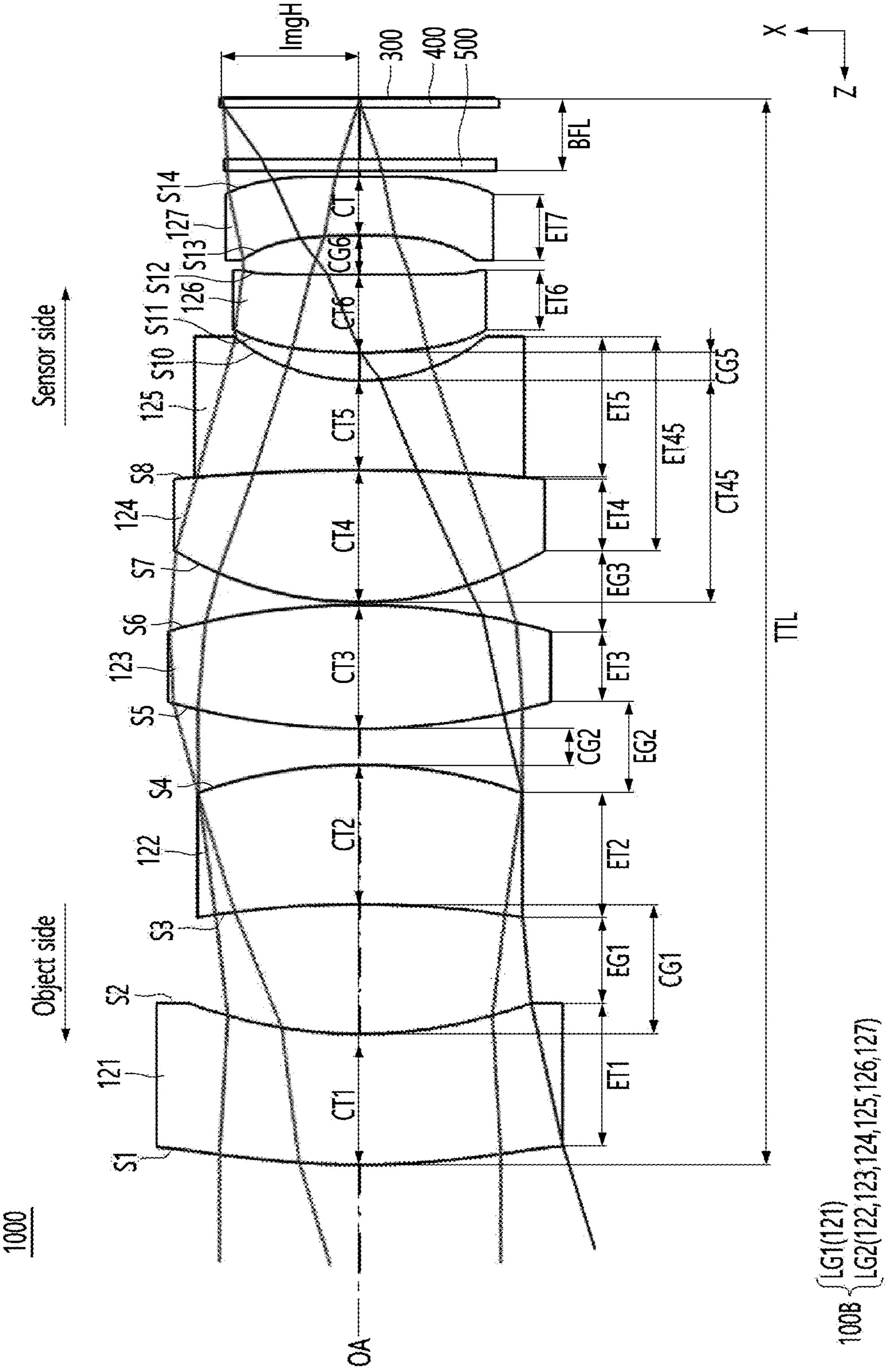
FIG. 24 is a side cross-sectional view of an optical system and a camera module having the same according to a third embodiment.

As shown in FIGS. 1, 13, and 24, the optical system 1000 according to the embodiment(s) of the invention may include a plurality of lens groups LG1 and LG2. In detail, each of the plurality of lens groups LG1 and LG2 includes at least one lens. For example, the optical system 1000 may include a first lens group LG1 and a second lens group LG2 sequentially disposed along the optical axis OA toward the image sensor 300 from the object side. The number of lenses of each of the first lens group LG1 and the second lens group LG2 may be different from each other. The number of lenses of the second lens group LG2 may be greater than the number of lenses of the first lens group LG1, for example, may be greater than four times or more than five times the number of lenses of the first lens group LG1.

The first lens group LG1 may include at least one lens. The first lens group LG1 may have three or less lenses. Preferably, the first lens group LG1 may be a single lens. The second lens group LG2 may include two or more lenses. The second lens group LG2 may have four or more lenses or five or more lenses. Preferably, the second lens group LG2 may include six lenses. The optical system 1000 may include n lenses, the n-th lens may be the last lens, and the n−1-th lens may be a lens closest to the last lens. The n is an integer greater than or equal to five, and may be, for example, in a range of five to eight. The first lens group LG1 may include at least one lens made of glass. In the first lens group LG1, a lens closest to the object side may be a lens made of glass. Such a glass material has a small amount of change in expansion and contraction due to a change in external temperature, and the surface is not easily scratched, so surface damage may be inhibited.

As the lens material of the second lens group LG2, at least one glass lens and at least one plastic lens may be mixed. In the second lens group LG2, at least one lens made of plastic may be disposed closer to the sensor than at least one lens made of glass. The second lens group LG2 may include two or more glass lenses, for example, two to four glass lenses. The second lens group LG2 may include, for example, two to five lenses. As another example, the second lens group LG2 may have one or more plastic lenses. The second lens group LG2 may include one or more plastic lenses, for example, one to three plastic lenses.

At least one lens closest to the sensor side in the optical system 1000 may be made of a plastic material. For example, at least two lenses closest to the sensor side may be plastic lenses. At least one lens closest to the object side in the optical system 1000 may be made of glass. Two or three or more lenses closest to the object side may be made of glass. Since the change rate of contraction and expansion according to temperature change of the glass lens is smaller than that of the plastic material, the glass lens may be disposed on a region adjacent to the outside of the lens barrel.

Among the lenses of the optical system 1000, a lens having the maximum Abbe number may be located in the second lens group LG2, and a lens having the maximum refractive index may be located in the first lens group LG1. The maximum Abbe number may be 65 or more, and the maximum refractive index may be 1.75 or more. The lens having the maximum effective diameter in the optical system 1000 may be a lens close to the object side or a lens between two lenses on the object side and two lenses on the sensor side. Preferably, the lens having the maximum effective diameter may be disposed between lenses made of glass. The effective diameter may be a diameter of an effective region into which effective lights are incident from each lens. The effective diameter is an average of the effective diameter of the object-side surface and the effective diameter of the sensor-side surface of each lens. An embodiment of the invention may reduce the weight of the camera module by further mixing the plastic lens in the optical system 1000, may provide a lower manufacturing cost, and may suppress the deterioration of optical characteristics due to temperature change. Various types of plastic lenses may be substituted for glass lenses, and polishing and processing of lens surfaces such as aspheric surfaces or free curved surfaces may be facilitated.

Each of the lenses may include an effective region and an ineffective region. The effective region may be a region through which light incident on each of the lenses passes. That is, the effective region may be defined as an effective region or an effective diameter in which the incident light is refracted to realize optical characteristics. The ineffective region may be arranged around the effective region. The ineffective region may be an area in which effective light from the plurality of lenses is not incident. That is, the ineffective region may be a region unrelated to the optical characteristics. Also, an end of the ineffective region may be a region fixed to a lens barrel (not shown) accommodating the lens.

In the optical system 1000, TTL (Total top length) may be more than twice as high as ImgH, for example, more than four times. The total track length (TTL) is a distance from the center of the object-side surface of the first lens to the upper surface of the image sensor 300 along the optical axis OA. The ImgH is a distance from the optical axis OA to the diagonal end of the image sensor 300 or ½ of the maximum diagonal length of the image sensor 300. In the optical system 1000, an effective focal length (EFL) of 10 mm or more and an angle of view (FOV) of less than 45 degrees may be provided as a standard optical system in a vehicle camera module. For example, the optical system and camera module according to the embodiment may be applied to a camera module for ADAS (Advanced Driving Assistance System). In the optical system 1000, an equation value of TTL/(2*ImgH) may be 2.5 or more or 2.7 or more. By setting a value of TTL/(2*ImgH) to 2.5 or more in the optical system 1000, a lens optical system for a vehicle may be provided. The total number of lenses of the first and second lens groups LG1 and LG2 is 8 or less. Accordingly, the optical system 1000 may provide an image without exaggeration or distortion of the formed image.

An effective diameter of at least one or all of the plastic lenses in the optical system 1000 may be smaller than the length of the image sensor 300. The length of the image sensor 300 is the maximum length of a diagonal line perpendicular to the optical axis OA. In the optical system 1000, lenses having an effective diameter larger than the length of the image sensor 300 may be 50% or more, and lenses having an effective diameter smaller than the length of the image sensor 300 may be less than 50%.

The optical system 1000 may include a combined lens in which two different lenses are bonded together. Effective diameters of the lenses disposed on the object side with respect to the combined lens may be greater than the length of the image sensor 300. Effective diameters of the lenses disposed on the sensor side with respect to the combined lens may be smaller than the length of the image sensor 300. Also, an object-side lens in the combined lens may be longer than the image sensor 300, and a sensor-side lens in the combined lens may be disposed in a range of +110% of the length of the image sensor 300.

On the optical axis OA, the first lens group LG1 and the second lens group LG2 may have a set distance. An optical axis distance between the first lens group LG1 and the second lens group LG2 on the optical axis OA may be an optical axis interval between a sensor-side surface of the lens closest to the sensor side among the lenses in the first lens group LG1 and an object-side surface of the lens closest to the object side among the lenses in the second lens group LG2. The optical axis distance between the first lens group LG1 and the second lens group LG2 may be 0.8 times or more than an optical axis distance of the first lens group LG1, and may be in a range of 0.8 times to 1.5 times or 0.8 times to 1.2 times. The optical axis distance between the first lens group LG1 and the second lens group LG2 may be less than or equal to 0.2 times the optical axis distance of the second lens group LG2, for example, in a range of 0.01 to 0.2 times. The optical axis distance of the second lens group LG2 is an optical axis distance between the object-side surface of the lens closest to the object side of the second lens group LG2 and the sensor-side surface of the lens closest to the image sensor 300. Here, two surfaces facing each other among the lens surfaces of the first lens group LG1 and the second lens group LG2 may have a concave object side and a concave sensor side. That is, the sensor-side surface closest to the sensor side of the first lens group LG1 may be concave, and the object-side surface closest to the object side of the second lens group LG2 may be concave. The first lens group LG1 refracts the light incident through the object side to converge, and the second lens group LG2 converts the light emitted through the first lens group LG1 into the image sensor 300 may be refracted.

The first lens group LG1 may have negative (−) refractive power, and the second lens group LG2 may have positive (+) refractive power. Among the lenses of the first lens group LG1, the lens closest to the object side has negative (−) refractive power, and among the lenses of the second lens group LG2, the lens closest to the sensor side may have negative (−) refractive power. When the focal length is expressed as an absolute value, the focal length of the first lens group LG1 may be twice or more, for example, 2 times to 10 times the focal length of the second lens group LG2. The effective focal length EFL of the optical system 1000 may be smaller than the absolute value of the focal length of the first lens group LG1. The number of lenses having negative (−) refractive power in the optical system 1000 may be smaller than the number of lenses having positive (+) refractive power. The number of lenses having negative (−) refractive power may be 60% or less of the total number of lenses, for example, in a range of 25% to 59% or 40% to 49%. The refractive power is the reciprocal of the focal length.

As shown in FIGS. 1, 13 and 24, the lens portions 100, 100A, and 100B may be a mixture of glass lenses and plastic lenses. The number of lenses of the plastic lens may be 60% or less of the total number of lenses, and may be in the range of 20% to 50% or 25% to 45%. An effective diameter of a lens closest to the image sensor 300 in the lens portions 100, 100A, and 100B may be smaller than an effective diameter of a lens closest to the object side. The size of the effective diameter may be an average size of an object-side surface and a sensor-side surface of each lens. By controlling the size of the effective diameter of each lens, the optical system 1000 may compensate for deterioration of optical characteristics due to resolution and temperature change by controlling incident light, improve chromatic aberration control characteristics, and improve the vignetting characteristics of the optical system 1000.

The lens portions 100, 100A, and 100B include first lenses 101, 111, and 121, second lenses 102, 112, and 122, third lenses 103, 113, and 123, fourth lenses 104, 114, and 124, fifth lenses 105, 115, and 125, sixth lenses 106, 116, and 126, and seventh lenses 107, 117, and 127. In the lens portions 100, 100A, and 100B, when the focal length is expressed as an absolute value, the focal lengths of the first lenses 101, 111, and 121 may be greater than those of the third lenses 103, 113, and 123 and the fifth lenses 105, 115, and 125. The focal lengths of the third lenses 103, 113, and 123 and the fifth lenses 105, 115, and 125 may be smaller than those of the plastic lens(s). Here, the plastic lenses may be the sixth lenses 106, 116, and 126 and the seventh lenses 107, 117, and 127.

To explain the center thickness CT of the lenses, the center thickness of the second lenses 102, 112, and 122 and the fourth lenses 104, 114, and 124 may be greater than the center thickness of the plastic lens(s). For example, at least two or more lenses made of glass may have a center thickness greater than a center thickness of a plastic lens. The center thickness of each of the sixth lenses 106, 116, and 126 and the seventh lenses 107, 117, and 127 may be smaller than the center thickness of each of the second lenses 102, 112, and 112 and the fourth lenses 104, 114, and 124. In the lens portions 100, 100A, and 100B, an average thickness of the center of the lenses made of glass may be greater than an average thickness of the center of the plastic material. The glass lenses may be the first to fifth lenses 101 to 105.

Within the lens portions 100, 100A and 100B, the first lenses 101, 101, and 111 may have the highest refractive index, greater than 1.7, for example, greater than 1.8. In the lens portions 100, 100A, and 100B, the number of lenses having a refractive index lower than the average refractive index of the plastic lenses, for example, the sixth lenses 106, 116, 126 and the seventh lenses 107, 117, and 127, is three or less, for example, two or less. An average refractive index of the glass lenses in the lens portions 100, 100A, and 100B may be greater than an average refractive index of the plastic lenses.

Abbe numbers of the second lenses 102, 112, and 112 may be greater than Abbe numbers of the first lenses 101, 111, and 121. The Abbe number of the second lenses 102, 112, and 122 may be the largest in the lens portions 100, 100A and 100B and may be 65 or more. In the lens portions 100, 100A, and 100B, the number of lenses having an Abbe number lower than the average Abbe number of the plastic material lenses, for example, the sixth lenses 106, 116, 126 and the seventh lenses 107, 117, and 127, is 2 or less, for example, 1 or less. An average of the Abbe numbers of the glass lenses in the lens portions 100, 100A, and 100B may be greater than an average of the Abbe numbers of the plastic lenses. An average of the Abbe numbers of the plastic lenses may be 45 or less.

An effective diameter (CA: Clear apertures) of the third lenses 103, 113, and 123 may be larger than those of the first lenses 101, 111, and 121. An effective diameter of the first surface S1 of the first lenses 101, 111, and 121 may be larger than an effective diameter of the second surface S2. Effective diameters of the second lenses 102, 112, and 122 may be smaller than those of the third lenses 103, 113, and 123. The effective diameters of the third lenses 103, 123, and 133 may have the largest effective diameters in the lens portions 100, 100A, and 100B. The number of lenses larger than the average effective diameter of the plastic lenses in the lens portions 100, 100A, and 100B may be 5 or less, for example, 4 or less. The average effective diameter of the plastic lenses may be smaller than the average effective diameter of the glass lenses. The average effective diameter of the glass materials may be 10 mm or more, for example, in the range of 10 mm to 15 mm. Among the lenses made of glass, a lens having a minimum effective diameter may be disposed closest to the plastic lens. In the lens portions 100, 100A, and 100B, the minimum effective diameter may be in the range of 8 mm to 10 mm, and the maximum effective diameter may be in the range of 11 mm to 15 mm. An average of the effective diameters of the glass material lenses may be greater than a diagonal length of the image sensor 300. Accordingly, the optical system 1000 may improve resolving power and chromatic aberration control characteristics by controlling incident light, and may improve vignetting characteristics of the optical system 1000.

Describing the radius of curvature as an absolute value, a lens surface having a minimum radius of curvature based on an optical axis within the lens portions 100, 100A, and 100B may be a sensor-side surface of the lens closest to the plastic lens. The lens surface having the minimum radius of curvature may be the sensor-side surface of the glass lens closest to the plastic lens. For example, the sensor-side tenth surface S10 of the fifth lenses 105, 115, and 125 may have a minimum radius of curvature within the lens portions 100, 100A, and 100B. When the lens surface having the minimum radius of curvature is the sensor-side surface of the glass lens closest to the plastic lens, that is, the fifth lens 105, 115, or 125, it may be refracted so as to proceed to the effective region of the plastic lens.

A lens surface having the maximum radius of curvature within the lens portions 100, 100A and 100B may be a sensor-side surface of a plastic lens disposed between the glass lens and the image sensor 300. In the case of two or more plastic lenses, a lens surface having the maximum radius of curvature may be a lens surface closer to the object side among sensor-side surfaces of the plastic lenses. For example, the sensor-side twelfth surface S12 of the sixth lenses 106, 116, and 126 may have a maximum radius of curvature within the lens portion 100. Here, the minimum radius of curvature may be 20 or less, for example, 10 or less. The maximum radius of curvature may be 10 times or more than the minimum radius of curvature. That is, the sensor-side surfaces of the sixth lenses 106, 116, and 126 may refract the light incident on the object-side surface to guide the periphery portion of the image sensor 300.

The lens portions 100, 100A, and 110B may include at least one combined lens. In the combined lens, at least two lenses having different refractive powers are bonded together, and the distance between the two lenses may be less than 0.01 mm. The combined lens may include an object-side first combined lens and a sensor-side second combined lens. For example, the fourth lenses 104, 114, and 124 and the fifth lenses 105, 115, and 125 may be bonded. A bonded surface between the fourth lenses 104, 114, and 124 and the fifth lenses 105, 115, and 125 may be defined as an eighth surface S8. The eighth surface S8 may be the same surface as the ninth surface of the fifth lenses 105, 115, and 125. A distance between the fourth lenses 104, 114, and 124 and the fifth lenses 105, 115, and 125 may be less than 0.01 mm. A distance between the fourth lenses 104, 114, and 124 and the fifth lenses 105, 115, and 125 may be less than 0.01 mm from the optical axis OA to the end of the effective region. The fourth lenses 104, 114, and 124 and the fifth lenses 105, 115, and 125 may have refractive powers opposite to each other. A product of refractive powers of the first combined lens and the second combined lens may have a value smaller than zero. The composite refractive power of the fourth and fifth lenses 104 and 105 may be a positive (+) value.

A difference between the Abbe numbers of the first and second combined lens may be greater than or equal to 20. A difference between the Abbe numbers of the two lenses to be bonded may be 20 or more and 40 or less. In this case, the aberration characteristics of the optical system may be improved. When the difference between the Abbe numbers of the two lenses to be bonded is less than 20, the effect of improving the aberration characteristics of the optical system may be insignificant. In the embodiment, the fourth lenses 104, 114, and 124 and the fifth lenses 105, 115, and 125 are lenses to be bonded, and the difference between the Abbe numbers of the two lenses to be bonded may satisfy a range of 20 to 40.

When the combined lens has a positive refractive power, the object-side fourth lenses 104, 114, and 124 may have a positive refractive power, and the sensor-side fifth lenses 105, 115, and 125 may have a negative refractive power. Also, based on the combined lens, the object-side third lenses 103, 113, and 123 may have positive refractive power, and the sensor-side sixth lenses 106, 116, and 126 may have positive refractive power. The combined lens may be disposed between the glass lenses 103, 113, and 123 and the plastic lenses 106, 116, and 126. Accordingly, the third lenses 103, 113, and 123, the combined lens, and the sixth lenses 106, 116, and 126 may refract some incident light in the optical axis direction.

An effective diameter of the fourth lenses 104, 114, and 124, which are object-side lenses, within the combined lens may be larger than the diagonal length of the image sensor 300. The effective diameters of the fourth lenses 104, 114, and 124 are the average of the effective diameters of the seventh surface S7 and the eighth surface S8, and may be greater than the diagonal length of the image sensor 300. The effective diameters of the fifth lenses 105, 115, and 125, which are sensor-side lenses, within the combined lens are smaller than those of the fourth lens 104 and may have a length within +110% or +105% of the diagonal length of the image sensor 300.

The optical axis distance between the combined lens and the third lenses 103, 113, and 123 disposed on the object side of the combined lens may be smaller than the optical axis distance BFL between the image sensor 300 and the last lens.

In the thickness T1 of the first lenses 101, 111, and 121, the difference between the maximum thickness and the minimum thickness may be 1.1 times or more, for example, in a range of 1.1 times to 1.5 times, the center thickness may be the minimum, and the edge thickness may be maximum. The thickness T2 of the second lenses 102, 112, and 122 may have a maximum thickness greater than or equal to 1.1 times the minimum thickness, for example, in a range of 1.1 times to 1.5 times. A center of the second lens 102, 112, or 122 may have a maximum thickness, and an edge may have a minimum thickness. The maximum thickness of the second lenses 102, 112, and 122 may be the thickest among the centers of the lenses. A difference between the maximum thickness and the minimum thickness of the fourth lenses 104, 114, and 124 may be smaller than the difference between the maximum thickness and the minimum thickness of the fifth lenses 105, 115, and 125. The center thickness CT45 of the combined lens may be smaller than the edge thickness ET45. The center thickness CT45 of the combined lens is a distance from the center of the object-side seventh surface S7 of the fourth lenses 104, 114, and 124 to the center of the tenth surface S10 of the fifth lenses 105, 115, and 125, and the edge thickness ET45 is a distance from the end of the effective region of the seventh surface S7 to the tenth surface S10 in the optical axis direction.

The optical system 1000 or the camera module may include the image sensor 300. The image sensor 300 may detect light and convert it into an electrical signal. The image sensor 300 may detect light sequentially passing through the lens portions 100, 100A, and 100B. The image sensor 300 may include a device capable of sensing incident light, such as a charge coupled device (CCD) or a complementary metal oxide semiconductor (CMOS). Here, the length of the image sensor 300 is the maximum length in a diagonal direction orthogonal to the optical axis OA, may be smaller than the effective diameter of the lens closest to the object side in the first lens group LG1, and may be larger than the effective diameter of the lens closest to the sensor side in the second lens group LG2. Here, the number of lenses having an effective diameter larger than the length of the image sensor 300 may be 4 to 5, and the number of lenses having an effective diameter smaller than the length of the image sensor 300 may be 2 to 3.

The optical system 1000 or the camera module may include a filter 500. The filter 500 may be disposed between the second lens group LG2 and the image sensor 300. The filter 500 may be disposed between the image sensor 300 and a lens closest to the sensor side among the lenses of the lens portions 100, 100A and 100B. For example, when the optical systems 100 and 100A are 7 lenses, the filter 500 may be disposed between the seventh lens 107 and the image sensor 300.

The cover glass 400 is disposed between the filter 500 and the image sensor 300, protects an upper portion of the image sensor 192, and may inhibit a decrease in reliability of the image sensor 192. The cover glass 400 may be removed. The filter 500 may include an infrared filter or an infrared cut-off filter (IR cut-off). The filter 500 may pass light of a set wavelength band and filter light of a different wavelength band. When the filter 500 includes an infrared filter, radiant heat emitted from external light may be blocked from being transferred to the image sensor 300. In addition, the filter 500 may transmit visible light and reflect infrared light.

The optical system 1000 according to the embodiment may include an aperture stop (not shown). The aperture stop may control the amount of light incident to the optical system 1000. In the lenses disposed between the object and the aperture stop, the effective diameter of the lens tends to decrease as it moves toward the aperture stop from the object side. In the lenses disposed between the aperture stop and the sensor, an effective diameter of the lenses tends to increase from the aperture stop toward the sensor. 'The effective diameter of the lenses tends to increase as it goes from the aperture stop to the sensor side' does not mean only when the effective diameter of the lenses increases from the aperture stop toward the sensor in the lens disposed between the aperture stop and the sensor. As in the embodiment of the invention, in the lenses disposed between the aperture stop and the sensor, the effective diameter of the lenses increases and decreases from the aperture stop toward the sensor.

In detail, the lens surface on which the aperture stop is disposed is designed to have the smallest effective diameter compared to the effective diameters of the lenses disposed immediately in front of or immediately behind the aperture. This is to more efficiently control and guide the amount of light of the optical system. When the aperture stop is disposed around the sensor-side surface of the second lens as in the embodiment, condition is satisfied: Effective diameter of the object-side surface of the first lens>Effective diameter of the sensor-side surface of the first lens>Effective diameter of object-side surface of the second lens>Effective diameter of the sensor-side surface of the second lens (effective diameter of the aperture stop). Further condition is satisfied: Effective diameter of the sensor-side surface of the second lens (effective diameter of the aperture stop)<Effective diameter of the object-side surface of the third lens<Effective diameter of the sensor-side surface of the third lens<Effective diameter of the object-side surface of the fourth lens<Effective diameter of the sensor-side surface of the fourth lens.

The aperture stop may be disposed at a set position. For example, the aperture stop may be disposed around an object-side surface or a sensor-side surface of a lens closest to the object side among the lenses of the second lens group LG2. Alternatively, the aperture stop may be disposed around the object-side surface or the sensor-side surface of the object-side lens of the first lens group LG1. Alternatively, at least one lens selected from among the plurality of lenses may serve as an aperture stop. In detail, an object-side surface or a sensor-side surface of one lens selected from among the lenses of the optical system 1000 may serve as an aperture stop to adjust the amount of light.

In the optical system 1000 of the embodiment, the sum of the refractive indices of the lenses of the lens portions 100, 100A, and 100B is 8 or more, for example, in the range of 8 to 15, and the average refractive index may be in the range of 1.6 to 1.7. The sum of Abbe numbers of each of the lenses may be 220 or more, for example, in the range of 220 to 350, and the average Abbe number may be 50 or less, for example, in the range of 31 to 50. The sum of the center thicknesses of all lenses may be greater than or equal to 15 mm, for example, in the range of 20 mm to 28 mm, and the average of the center thicknesses may be in the range of 2.8 mm to 4 mm. The sum of the center distances between the lenses on the optical axis OA may be greater than or equal to 4.5 mm, for example, in the range of 4.5 mm to 7 mm and may be smaller than the sum of the center thicknesses of the lenses. In addition, the average value of the effective diameter of each of the lens surfaces S1 to S14 of the lens portions 100, 100A, and 100B may be 8 mm or more, for example, in a range of 8 mm to 15 mm.

In the optical system according to an embodiment of the invention, the angle of view (diagonal line) may be 50 degrees or less, for example, in the range of 20 degrees to 50 degrees. The F number of the optical system or camera module may be 2.4 or less, for example, in the range of 1.4 to 2.4 or in the range of 1.6 to 1.8. In the optical system according to an embodiment of the invention, the angle of view (diagonal line) may be 50 degrees or less, for example, in the range of 20 degrees to 50 degrees. The F number of the optical system or camera module may be 2.4 or less, for example, in the range of 1.4 to 2.4 or in the range of 1.6 to 1.8. Here, the horizontal angle of view (FOV_H) in the Y-axis direction of the vehicle optical system may be greater than 20 degrees and less than 40 degrees, for example, greater than 30 degrees and less than 40 degrees, or may be in the range of 25 degrees to 35 degrees. At this time, the height of the sensor in the Y direction may be 4.032 mm±0.5 mm in the optical axis OA. The horizontal angle of view (FOV_H) is an angle of view based on the horizontal height of the sensor. Since the embodiment is an optical system applied to a vehicle camera, the first lens may be made of glass even when a plastic lens and a glass lens are used together. This has the advantage that the glass material is scratch-resistant and not sensitive to external temperature compared to the plastic material. A glass lens is used as a first lens to more effectively inhibit scratches by foreign substances when disposed outside the vehicle, and when contaminants adhere to the first lens, the object-side surface may have a convex shape so as not to interfere with the viewing angle. When designed in a concave shape, contaminants attached to the first lens are gathered along the optical axis, and image capturing is difficult. The angle of view may be greater than 20 degrees and less than 40 degrees, for example, in the range of 30 degrees to 40 degrees or 25 degrees to 35 degrees for detecting lanes and unexpected substances around the vehicle during vehicle operation. This horizontal angle of view may be a preset angle for ADAS.

The optical system 1000 according to the embodiment may further include a reflective member (not shown) for changing a path of light. The reflective member may be implemented as a prism that reflects incident light of the first lens group LG1 toward the lenses. Hereinafter, an optical system according to an embodiment will be described in detail.

First Embodiment

Figure 2:
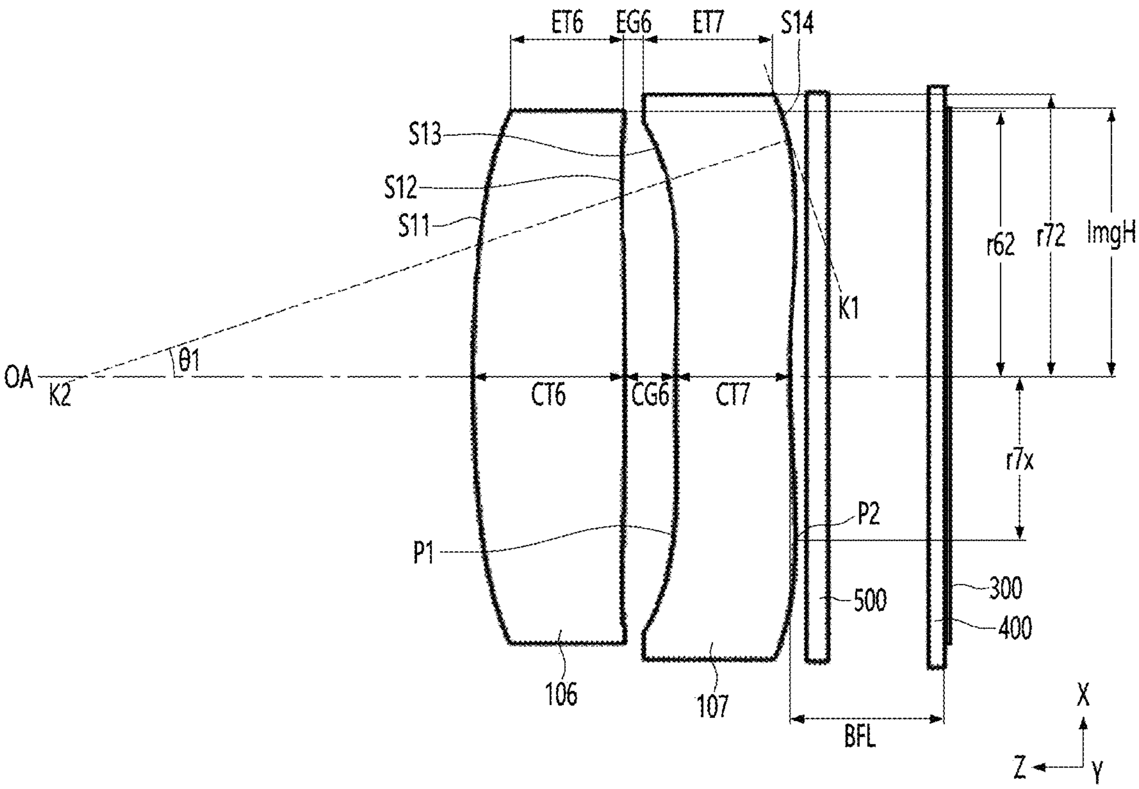
FIG. 2 is a side cross-sectional view for explaining the relationship between n-th lens and n−1-th lens in FIG. 1.
Figure 7:
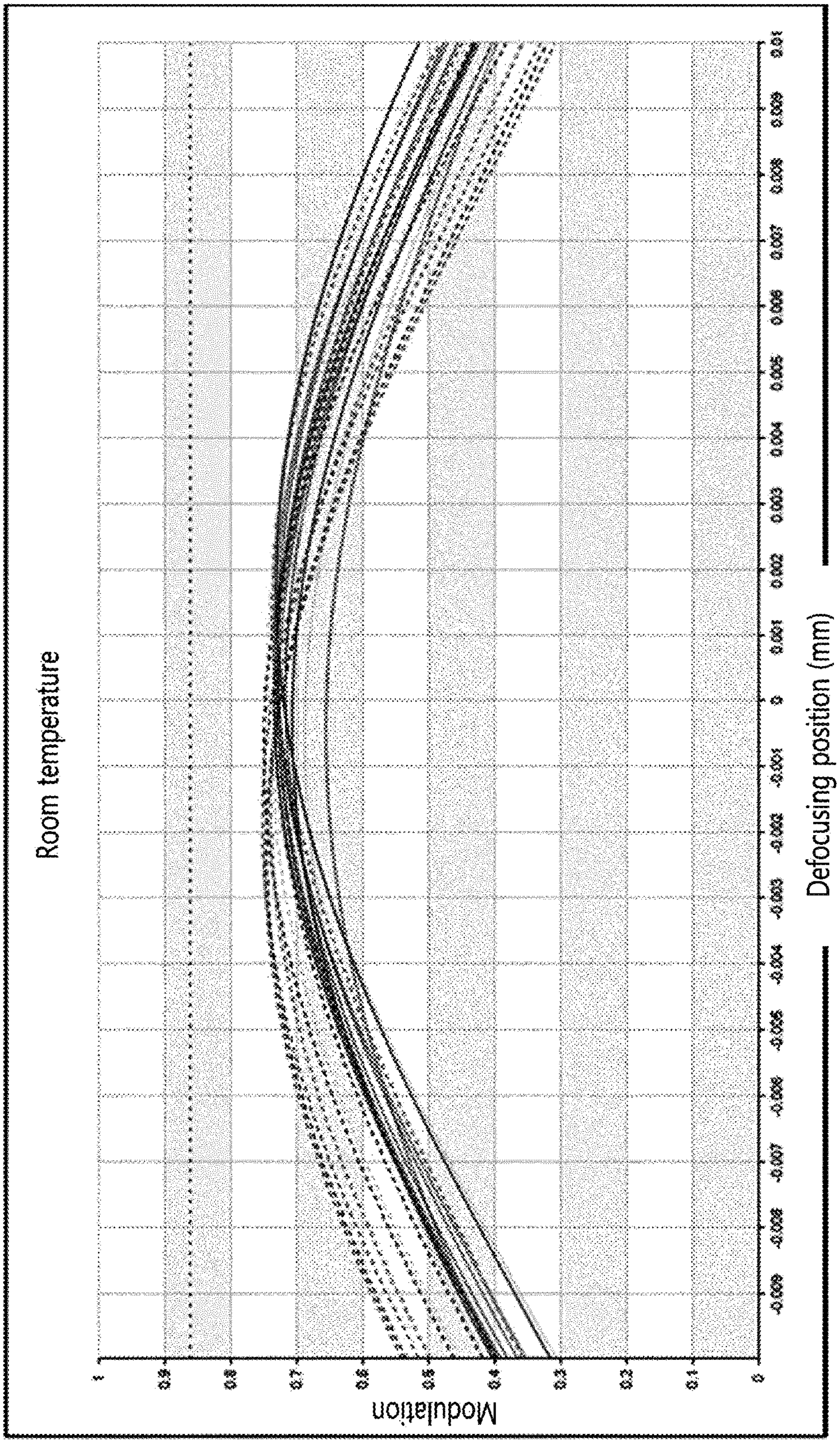
FIG. 7 is a graph showing data on a diffraction modulation transfer function (MTF) of the optical system of FIG. 1 at room temperature.
Figure 8:
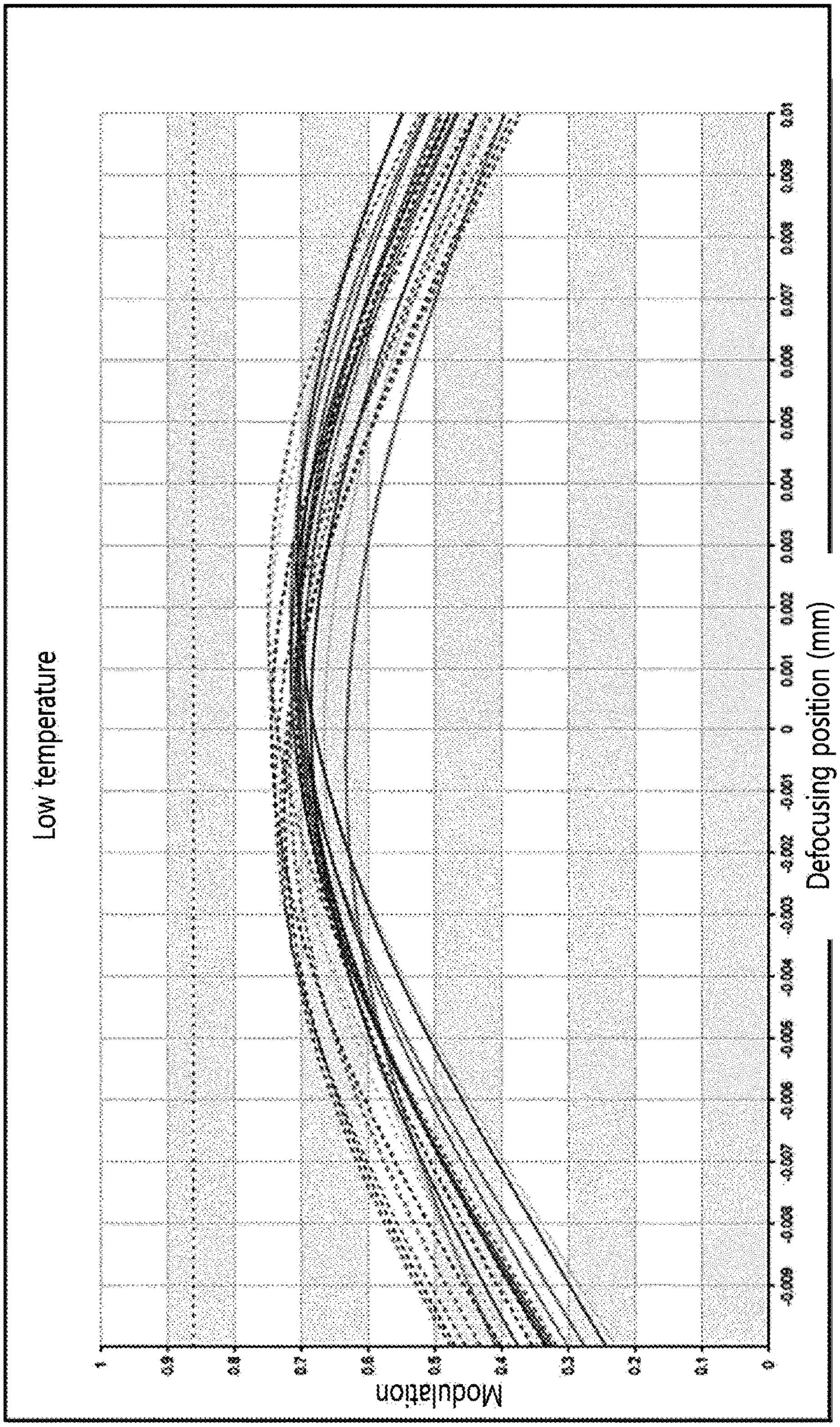
FIG. 8 is a graph showing data on the diffraction MTF of the optical system of FIG. 1 at a low temperature.
Figure 9:
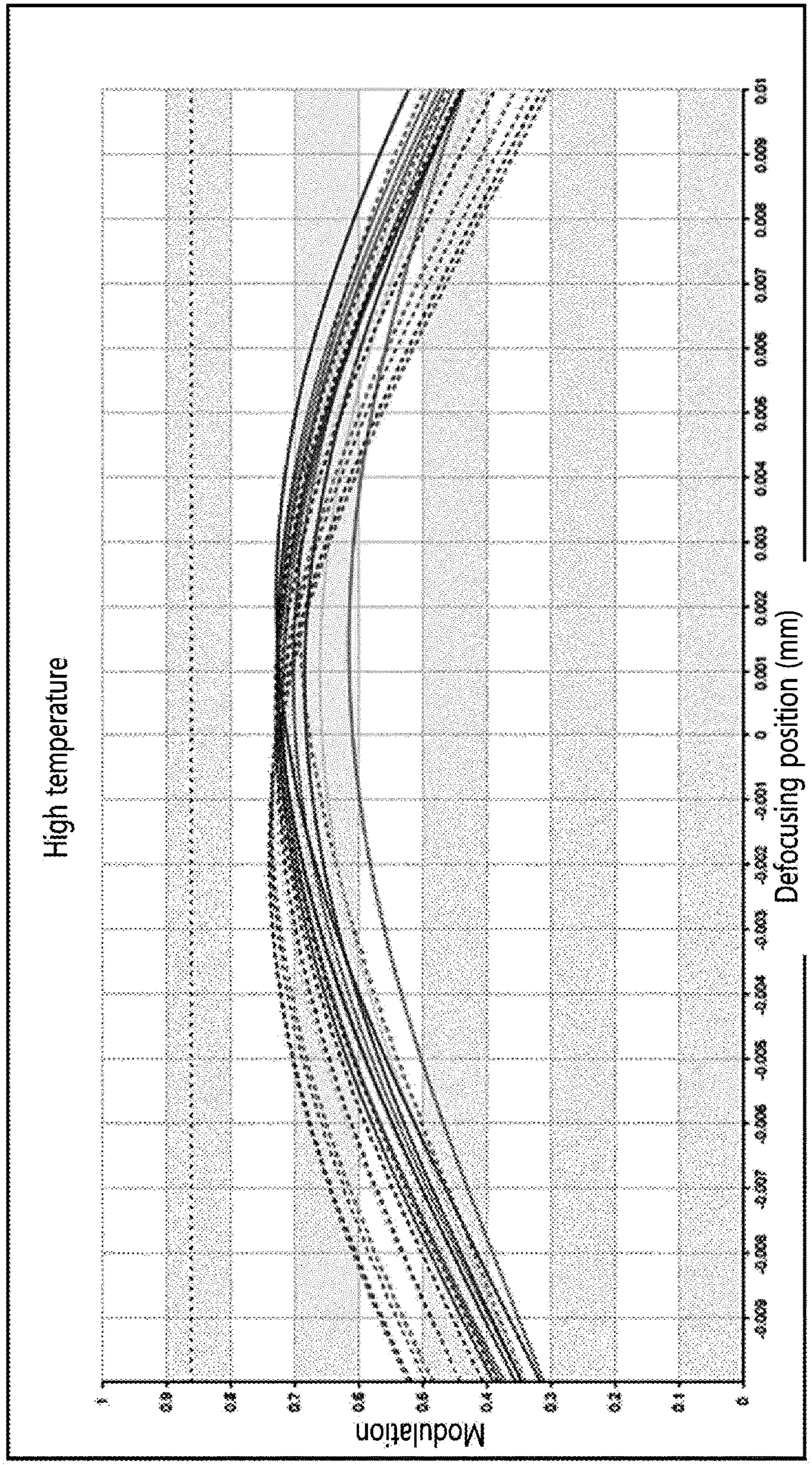
FIG. 9 is a graph showing data on the diffraction MTF of the optical system of FIG. 1 at a high temperature.
Figure 10:
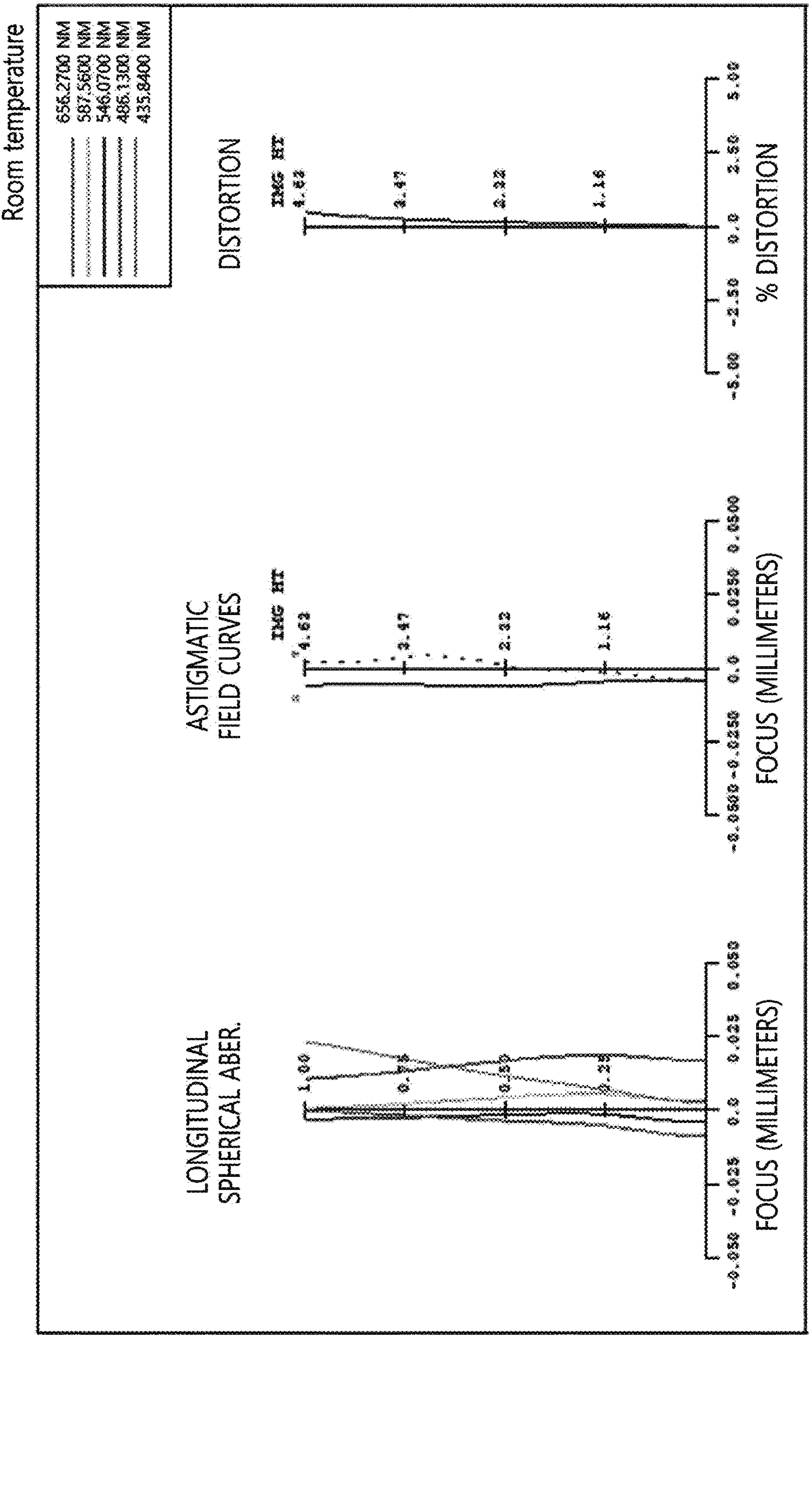
FIG. 10 is a graph showing data on aberration characteristics of the optical system of FIG. 1 at room temperature.
Figure 11:
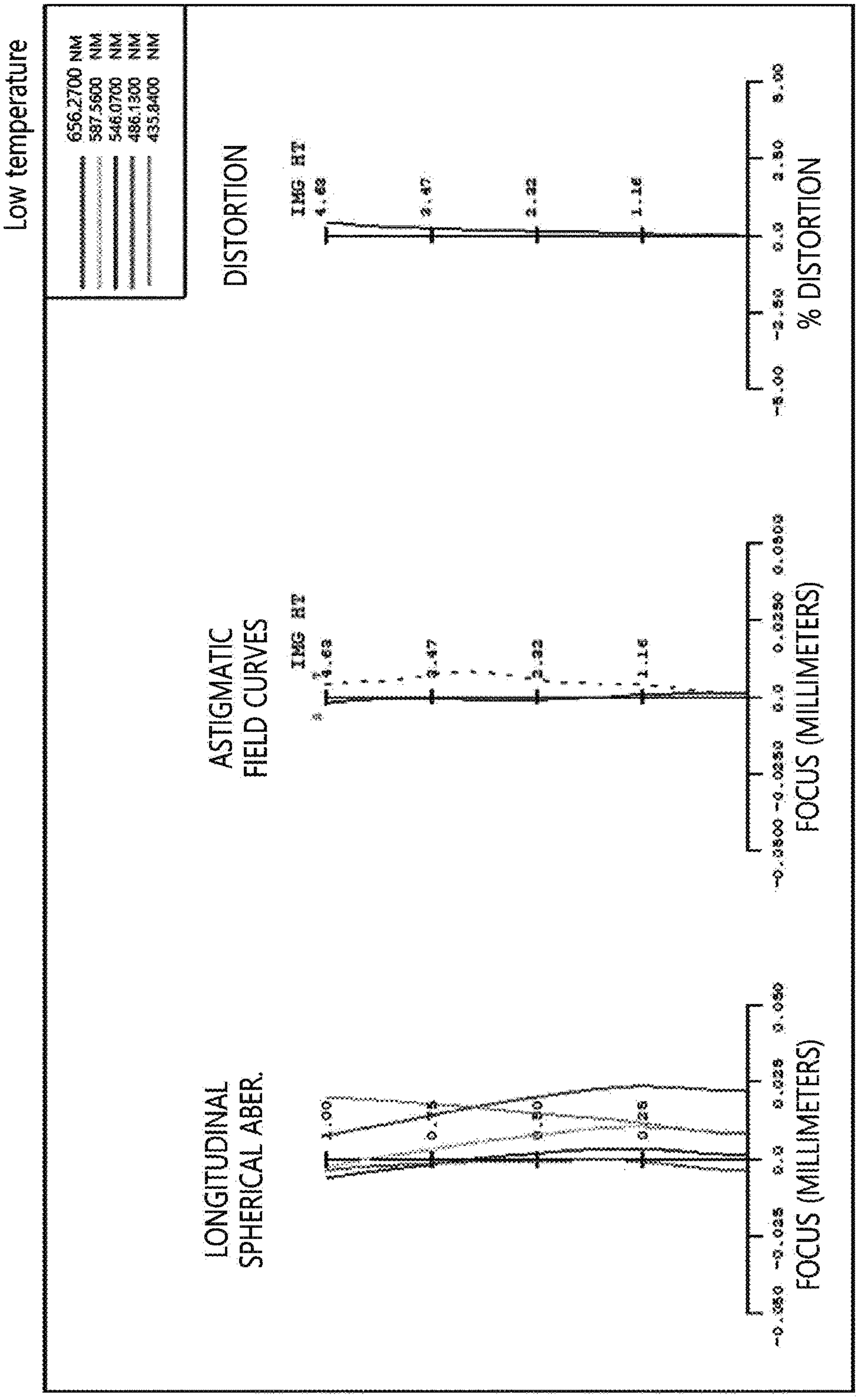
FIG. 11 is a graph showing data on aberration characteristics of the optical system of FIG. 1 at a low temperature.
Figure 12:
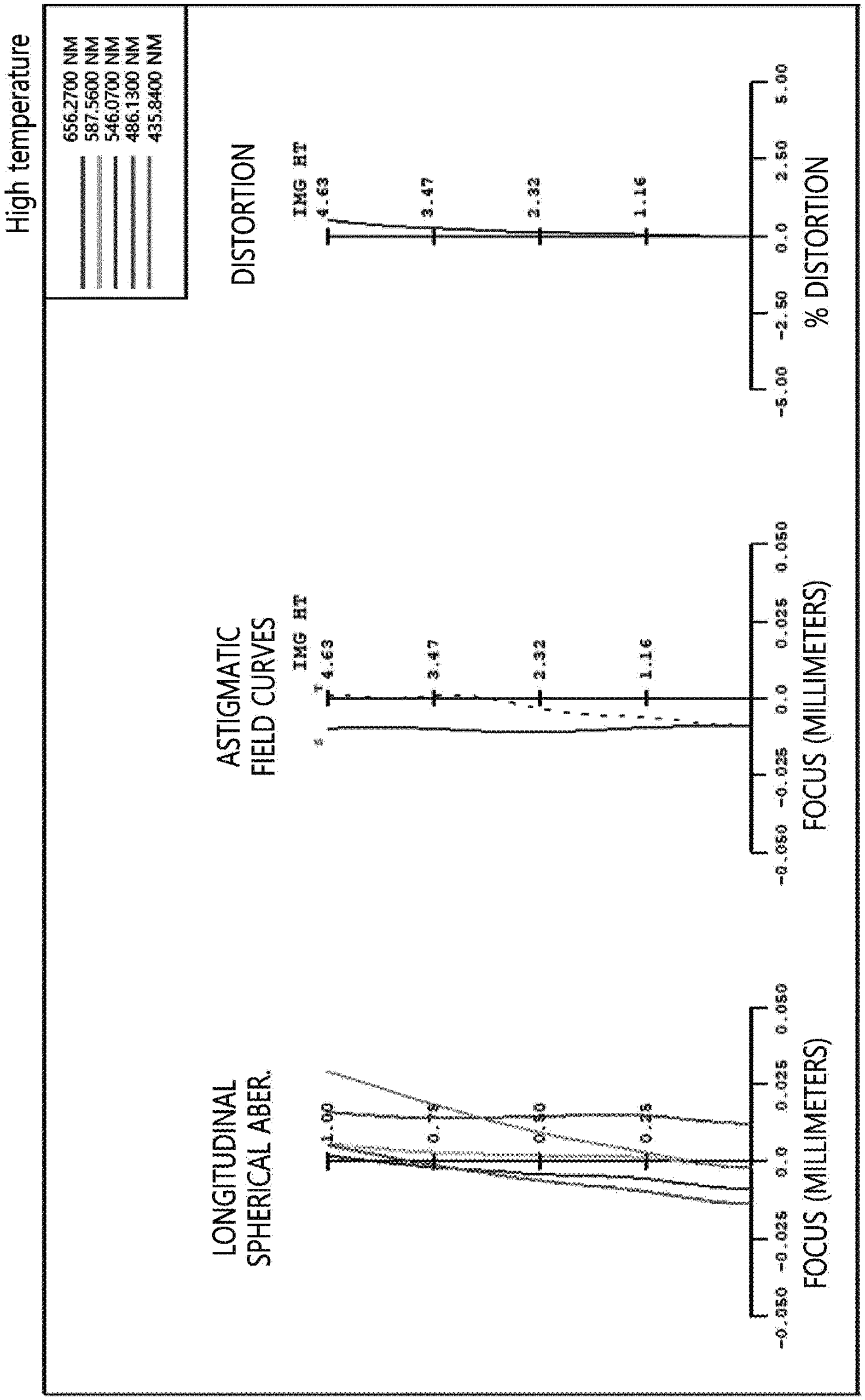
FIG. 12 is a graph showing data on aberration characteristics of the optical system of FIG. 1 at a high temperature.

FIG. 1 is a side cross-sectional view of an optical system and a camera module having the same according to a first embodiment, FIG. 2 is a side cross-sectional view for explaining the relationship between the n-th and n−1-th lenses of FIG. 1, FIG. 3 is a table showing a lens characteristics of the optical system of FIG. 1, FIG. 4 is a table showing the aspherical coefficients of lenses in the optical system of FIG. 1, FIG. 5 is a table showing the thickness of each lens and the distance between adjacent lenses in the optical system of FIG. 1, and FIG. 6 is a table showing CRA (Chief Ray Angle) data at room temperature, low temperature, and high temperature according to the position of the image sensor in the optical system of FIG. 1. FIG. 7 is a graph showing data on the diffraction MTF (Modulation Transfer Function) at room temperature of the optical system of FIG. 1, FIG. 8 is a graph showing data on the diffraction MTF of the optical system of FIG. 1 at a low temperature, FIG. 9 is a graph showing data on the diffraction MTF of the optical system of FIG. 1 at a high temperature, FIG. 10 is a graph showing data on aberration characteristics of the optical system of FIG. 1 at room temperature, FIG. 11 is a graph showing data on aberration characteristics of the optical system of FIG. 1 at a low temperature, and FIG. 12 is a graph showing data on aberration characteristics of the optical system of FIG. 1 at a high temperature.

Referring to FIGS. 1 to 3, the optical system 1000 includes a lens portion 100, and the lens portion 100 may include a first lens 101 to a seventh lens 107. The first to seventh lenses 101, 102, 103, 104, 105, 106, and 107 may be sequentially disposed along the optical axis OA of the optical system 1000.

The first lens 101 is the closest lens to the object side in the first lens group LG1. The seventh lens 107 is a lens closest to the image sensor 107 in the second lens group LG2 or the lens portion 100. Light corresponding to object information may pass through the first lens 101 to the seventh lens 107 and the filter 500 and be incident on the image sensor 300. The first lens 101 may be a first lens group LG1, and the second to seventh lenses 102, 103, 104, 105, 106, and 107 may be a second lens group LG2. An aperture stop may be disposed on any one of the circumference of the object-side or sensor-side surface of the first lens 101 or the circumference of the object-side or sensor-side surface of the second lens 102. The first lens 101 may have positive (+) or negative (−) refractive power on the optical axis OA. The first lens 101 may have negative (−) refractive power. The first lens 101 may include a plastic material or a glass material, and may be, for example, a glass material. The first lens 101 made of glass may reduce changes in the center position and radius of curvature due to temperature changes in the peripheral environment, and may protect the incident side surface of the optical system 1000.

The first lens 101 may include a first surface S1 defined as an object-side surface and a second surface S2 defined as a sensor-side surface. The first lens 101 may have a meniscus shape convex toward the object side. In other words, on the optical axis OA, the first surface S1 may have a convex shape, and the second surface S2 may have a concave shape. Aspheric surface coefficients of the first and second surfaces S1 and S2 may be provided as S1 and S2 in L1 of FIG. 4. The first lens 101 may be manufactured as a lens having an aspherical surface by injection molding a glass material. The first surface S1 of the first lens 101 may have a critical point, and the location of the critical point is located to a region of 4.5 mm or more from the optical axis OA, or may be in a range of 5 mm and 6 mm or in the range of 5 mm to 5.5 mm. Here, the critical point is a point at which the sign of the slope value with respect to the optical axis OA and the direction perpendicular to the optical axis OA changes from positive (+) to negative (−) or from negative (−) to positive (+), and may mean a point at which the slope value is zero. Also, the critical point may be a point at which the slope value of a tangent passing through the lens surface decreases as it increases, or a point where the slope value increases as it decreases. As another example, at least one or both of the first surface S1 and the second surface S2 may be provided from the optical axis OA to an end of the effective region without a critical point.

The second lens 102 may be disposed between the first lens 101 and the third lens 103. The second lens 102 may have positive (+) or negative (−) refractive power on the optical axis OA. The second lens 102 may have positive (+) refractive power. The second lens 102 may include a plastic or glass material. For example, the second lens 102 may be made of a glass material. The second lens 102 may include a third surface S3 defined as an object-side surface and a fourth surface S4 defined as a sensor-side surface. In the optical axis OA, the third surface S3 may have a concave shape, and the fourth surface S4 may have a convex shape. The second lens 102 may have a meniscus shape convex toward the sensor. Alternatively, the third surface S3 may be convex and the fourth surface S4 may be convex. The second lens 102 may have a convex shape on both sides. At least one or both of the third surface S3 and the fourth surface S4 may be spherical. At least one or both of the third surface S3 and the fourth surface S4 may be provided from the optical axis OA to an end of the effective region without a critical point.

The third lens 103 may have positive (+) or negative (−) refractive power on the optical axis OA. The third lens 103 may have positive (+) refractive power. The third lens 103 may include a plastic or glass material. For example, the third lens 103 may be made of a glass material. The third lens 103 may include a fifth surface S5 defined as an object-side surface and a sixth surface S6 defined as a sensor-side surface. The third lens 103 may have a convex shape on both sides of the optical axis OA. For example, in the optical axis OA, the fifth surface S5 may have a convex shape, and the sixth surface S6 may have a convex shape. Both surfaces of the third lens 103 may be convex. Alternatively, the third lens 103 may have a convex meniscus shape toward the object side or the sensor side. Alternatively, the third lens 103 may have a concave shape on both sides of the optical axis. At least one or both of the fifth surface S5 and the sixth surface S6 may be spherical. At least one or both of the fifth surface S5 and the sixth surface S6 may be provided from the optical axis OA to an end of the effective region without a critical point.

The fourth lens 104 may have positive (+) or negative (−) refractive power on the optical axis OA. The fourth lens 104 may have positive (+) refractive power. The fourth lens 104 may include a plastic or glass material. For example, the fourth lens 104 may be made of a glass material. The fourth lens 104 may include a seventh surface S7 defined as an object-side surface and an eighth surface S8 defined as a sensor-side surface. The fourth lens 104 may have a meniscus shape convex toward the object side. In other words, the seventh surface S7 of the optical axis OA may have a convex shape, and the eighth surface S8 may have a concave shape. Alternatively, on the optical axis OA, the seventh surface S7 may have a concave shape, and the eighth surface S8 may have a concave or convex shape. At least one or both of the seventh surface S7 and the eighth surface S8 may be spherical. The seventh surface S7 and the eighth surface S8 may be provided from the optical axis OA to the end of the effective region without a critical point.

The fifth lens 105 may have positive (+) or negative (−) refractive power on the optical axis OA. The fifth lens 105 may have negative (−) refractive power. The fifth lens 105 may include a plastic or glass material. For example, the fifth lens 105 may be made of a glass material. The fifth lens 105 may include a ninth surface defined as an object-side surface and a tenth surface S10 defined as a sensor-side surface. The ninth surface may have a convex shape along the optical axis OA, and the tenth surface S10 may have a concave shape along the optical axis OA. The fifth lens 105 may have a meniscus shape convex toward the object side. Alternatively, the ninth surface of the optical axis OA may have a concave shape, and the tenth surface S10 may have a convex shape. At least one of the ninth and tenth surfaces S10 may be a spherical surface. For example, both the ninth surface and the tenth surface S10 may be spherical. At least one or all of the ninth and tenth surfaces S10 may be provided from the optical axis OA to an end of the effective region without a critical point.

The fourth lens 104 and the fifth lens 105 may be bonded. A bonding surface between the fourth lens 104 and the fifth lens 105 may be defined as an eighth surface S8. The eighth surface S8 may be the same surface as the ninth surface of the fifth lens 105. A distance between the fourth and fifth lenses 104 and 105 may be less than 0.01 mm. A distance between the fourth and fifth lenses 104 and 105 may be less than 0.01 mm from the optical axis OA to the end of the effective region. The fourth and fifth lenses 104 and 105 may have refractive powers opposite to each other. The composite refractive power of the fourth and fifth lenses 104 and 105 may have positive (+) refractive power.

A product of a refractive power of an object-side lens of the combined lens and a refractive power of a sensor-side lens of the combined lens may be less than zero. A product of a focal length of an object-side lens and a focal length of a sensor-side lens of the combined lens may be smaller than zero. Accordingly, the aberration characteristics of the optical system may be improved. When the refractive power of the two lenses of the combined lens is equal to each other, there is a limit to aberration improvement. The composite refractive power of the combined lens may have positive refractive power, and the object-side third lens 103 and the sensor-side sixth lens 106 may have positive refractive power based on the combined lens. Accordingly, the third lens 103, the combined lens, and the sixth lens 106 may refract some incident light in the optical axis direction.

An effective diameter of the fourth lens 104 may be greater than a diagonal length of the image sensor 300. The effective diameter of the fourth lens 104 is the average of the effective diameters of the seventh surface S7 and the eighth surface S8 and may be greater than the diagonal length of the image sensor 300. The effective diameter of the fifth lens 105 is smaller than the effective diameter of the fourth lens 104 and may have a length within +110% or +105% of the diagonal length of the image sensor 300.

When the fifth lens 105 is a glass lens and the sixth and seventh lenses 106 and 107 are plastic lenses, difference in effective diameters CA of the object-side eighth surface S8 and the sensor-side tenth surface S10 of the fifth lens 105 may be the largest. For example, when the effective diameter of the object-side surface and the effective diameter of the sensor-side surface of the fifth lens 105 are CA_L5S1 and CA_L5S2, CA_L5S1>CA_L5S2 is satisfied, and the difference between CA_L5S1 and CA_L5S2 may be the largest among the differences between the effective diameters of the object-side surface and the sensor-side surface of the lenses. Accordingly, it is possible to set the difference between the effective diameters of the lens closest to the plastic lens, that is, the fifth lens 105, to be maximized so that the light traveling to the plastic lens having a relatively small effective diameter may be effectively guided.

The fifth lens 105 is a glass lens, and the sixth and seventh lenses 106 and 107 are plastic lenses and may be designed to have a small effective diameter. In order to guide the incident light to the plastic lens having a small effective diameter, the difference between the effective diameters between the object-side surface and the sensor-side surface of the fifth lens 105 disposed on the object side of the plastic lens must be designed to be larger than other lenses.

Since the fifth lens 105 is disposed on the object-side surface of the plastic lens and is the closest lens to the plastic lens among the glass lenses, a ratio of the effective diameters between the object-side surface and the sensor-side surface of the fifth lens 105 satisfies a condition: $1.1 \leq CA\_L5S1/CA\_L5S2 \leq 1.4$, but in another embodiment, a ratio of the effective diameters between the object-side surface and the sensor-side surface of the glass lens disposed on the object-side surface of the plastic lens and closest to the plastic lens may satisfy: $1.1 \leq GCA\_S1/GCA\_S2 \leq 1.4$. GCA_S1 is the effective diameter of the object-side surface of the glass lens closest to the plastic lens, and GCA_S2 is the effective diameter of the sensor-side surface of the glass lens closest to the plastic lens.

The meaning of being disposed on the object-side surface of the plastic lens may mean a lens disposed between the plastic lens and the object. The closer to the plastic lens, the smaller the effective diameter of the lens. As another example, when there is a glass lens disposed on the sensor-side surface of the plastic lens and disposed closest to the plastic lens, a ratio of the effective diameters between the object-side surface and the sensor-side surface of the glass lens may be satisfied the following condition: $1.1 \leq GCA\_S2/GCA\_S1 \leq 1.4$.

The sixth lens 106 may have positive (+) or negative (−) refractive power on the optical axis OA. The sixth lens 106 may have positive (+) refractive power. The sixth lens 106 may include a plastic or glass material. For example, the sixth lens 106 may be made of a plastic material. The sixth lens 106 may include an eleventh surface S11 defined as an object-side surface and a twelfth surface S12 defined as a sensor-side surface. The sixth lens 106 may have a convex shape on both sides of the optical axis OA. For example, on the optical axis OA, the eleventh surface S11 may have a convex shape, and the twelfth surface S12 may have a convex shape. Alternatively, the sixth lens 106 may have a meniscus shape convex toward the object side, a meniscus shape convex toward the sensor side, or a shape in which both sides are concave. At least one of the eleventh surface S11 and the twelfth surface S12 may be an aspheric surface. For example, both the eleventh surface S11 and the twelfth surface S12 may be aspherical surfaces. The aspheric coefficients of the eleventh and twelfth surfaces S11 and S12 may be provided as S1 and S2 of L6 in FIG. 4.

The eleventh surface S11 of the sixth lens 106 may be provided without a critical point from the optical axis OA to the end of the effective region. The twelfth surface S12 may have at least one critical point from the optical axis OA to the end of the effective region. The critical point of the twelfth surface S12 may be located at 70% or more of the semi-aperture from the optical axis OA, or may be located in a range of 70% to 90% or 75% to 85%. The critical point of the twelfth surface S12 may be located at a position of 3 mm or more from the optical axis OA, for example, in a range of 3 mm to 3.9 mm.

The seventh lens 107 may have positive (+) or negative (−) refractive power on the optical axis OA. The seventh lens 107 may have negative (−) refractive power. The seventh lens 107 may include a plastic or glass material. For example, the seventh lens 107 may be made of a plastic material. The seventh lens 107 may include a thirteenth surface S13 defined as an object-side surface and a fourteenth surface S14 defined as a sensor-side surface. The seventh lens 107 may have a meniscus shape convex from the optical axis toward the object side. For example, on the optical axis OA, the thirteenth surface S13 may have a convex shape, and the fourteenth surface S14 may have a concave shape. Alternatively, on the optical axis OA, the thirteenth surface S13 may have a convex shape, and the fourteenth surface S14 may have a concave shape. At least one of the thirteenth surface S13 and the fourteenth surface S14 may be an aspheric surface. For example, both the thirteenth surface S13 and the fourteenth surface S14 may be aspheric surfaces. The aspherical surface coefficients of the thirteenth and fourteenth surfaces S13 and S14 may be provided as S1 and S2 of L7 in FIG. 4.

The seventh lens 107 may be a plastic lens closest to the image sensor 300. By arranging the plastic lens most adjacent to the image sensor, optical performance may be improved by the lens surface having an aspheric surface, so that aberration characteristics may be improved and the effect on resolution may be controlled. In addition, by arranging the plastic lens as the lens closest to the image sensor, it may be insensitive to an assembly tolerance compared to a lens made of glass. That is, the meaning of being insensitive to assembly tolerance may not significantly affect optical performance even when assembled with a slight difference compared to the design during assembly.

At least one or both of the thirteenth surface S13 and the fourteenth surface S14 of the seventh lens 107 may have a critical point. The thirteenth surface S13 of the seventh lens 107 may have at least one critical point from the optical axis OA to the end of the effective region. The critical point P1 of the thirteenth surface S13 may be located at 50% or less of the semi-aperture r62 from the optical axis OA, or located in a range of 30% to 50% or 35% to 45%. The critical point P1 of the thirteenth surface S13 may be located at a position less than 2 mm from the optical axis OA, for example, in a range of 1.1 mm to 2 mm. The fourteenth surface S14 of the seventh lens 107 may have at least one critical point from the optical axis OA to the end of the effective region. The critical point P2 of the fourteenth surface S14 may be located at a distance r7x of 48% or more of the semi-aperture r72 from the optical axis OA, or in a range of 48% to 68% or 53% to 63%. The critical point P2 of the fourteenth surface S14 may be located at a position of 2.1 mm or more from the optical axis OA, for example, in a range of 2.1 mm to 3 mm.

Referring to FIG. 2, a back focal length (BFL) is an optical axis distance from the image sensor 300 to the last lens. A tangent line K1 passing through an arbitrary point on the fourteenth surface S14 of the seventh lens 107 and a normal line K2 perpendicular to the tangent line K1 may have a predetermined angle θ1 with the optical axis OA. The maximum tangential angle θ1 on the fourteenth surface S14 in the first direction X may be 45 degrees or less, for example, in the range of 5 degrees to 45 degrees or 5 degrees to 35 degrees. In FIG. 2, CT7 is the center thickness or an optical axis thickness of the seventh lens 107, and ET7 is the edge thickness of the seventh lens 107. CT6 is the center thickness or optical axis thickness of the sixth lens 106, and the edge thickness is the distance in the optical axis direction between the object-side surface and the sensor-side surface at the end of the effective region of each lens. CG6 is an optical axis distance from the center of the sixth lens 106 to the center of the seventh lens 107 (i.e., center interval). That is, CG6 is a distance from the center of the twelfth surface S12 to the center of the thirteenth surface S13. EG6 is a distance in the optical axis direction from the edge of the sixth lens 106 to the edge of the seventh lens 107 (i.e., edge interval).

The distance from the sensor-side surface of the second lens 102 to the object-side surface of the third lens 103 based on the optical axis is G2, and a distance from the sensor-side surface of the third lens 103 to the object-side surface of the fourth lens 104 based on the optical axis is G3, a distance from the sensor-side surface of the fifth lens 105 to the object-side surface of the sixth lens 106 based on the optical axis is G5, and a distance from the sensor-side surface of the sixth lens 106 to the object-side surface of the seventh lens 107 based on the optical axis is G6, G5 may be the largest among G2, G3, G5, and G6, and the following condition may be satisfied.

$$G2, G3, G6 < G5 \qquad \text{Condition 1:}$$

$$(2*G6) \leq G5 \leq (3*G6) \qquad \text{Condition 2:}$$

$$(2*G2) \leq G5 \leq (3*G2) \qquad \text{Condition 3:}$$

The effective diameters become smaller from the fifth lens 105 toward the sixth lens 106, and the center distance between the fifth lens 105 and the sixth lens 106 may be designed to guide light in an environment where the effective diameter decreases. When the conditions 2 and 3 are smaller than the lower limit, some of the light guided by the fifth lens 105 cannot enter the sixth lens 106, and the resolution of the optical system is lowered. When the design is larger than the upper limit of the conditions 2 and 3, unnecessary light is incident to the sixth lens 106, and the aberration characteristics of the optical system may be deteriorated.

The distance on the optical axis from the sensor-side surface of the first lens 101 to the object-side surface of the second lens 102 is G1, and a distance on the optical axis from the sensor-side surface of the seventh lens 107 to the image sensor 300 is BFL, where BFL may be the largest among G1, G2, G3, G5, G6, and BFL. BFL may satisfy the following condition.

$$1.1 \leq BFL/G5 \leq 1.5 \quad \text{Condition 1:}$$

$$2 \leq BFL \leq 3 \quad \text{Condition 2:}$$

In order to guide light from the seventh lens 107, which is the last lens, to the center and periphery portions of the image sensor 300, the seventh lens 107 may disperse light. When the value of BFL is smaller than the lower limit of the conditions 1 and 2, some of the light guided by the seventh lens 107 does not reach the image sensor 300 and the resolution of the optical system is lowered. When the value of BFL is greater than the upper limit of the conditions 1 and 2, unnecessary light flows into the image sensor 300 and the aberration characteristics of the optical system may deteriorate.

FIG. 3 is an example of lens data of the optical system of the first embodiment of FIG. 1. As shown in FIG. 3, the radius of curvature, the thickness of the lens, the center distance between the lenses on the first to seventh lenses 101, 102, 103, 104, 105, 106, and 107 on the optical axis OA, the refractive index at the d-line, Abbe number, and an effective diameter (CA: clear aperture) may be set.

The fifth lens 105 is a glass lens, and the sixth and seventh lenses 106 and 107 are plastic lenses and may be designed to have a small effective diameter. Since the fifth lens 105 is disposed on the object-side surface of the plastic lens and is the closest lens to the plastic lens among the glass lenses, a ratio between the effective diameters of the object-side surface and the sensor-side surface of the fifth lens 105 satisfies the condition: 1.1≤CA_L5S1/CA_L5S2≤1.4, but in another embodiment, a ratio between the effective diameters of the object-side surface and the sensor-side surface of the glass lens disposed on the object-side surface of the plastic lens and closest to the plastic lens may satisfy the condition: 1.1≤GCA_S1/GCA_S2≤1.4. GCA_S1 is the effective diameter of the object-side surface of the glass lens closest to the plastic lens, and GCA_S2 is the effective diameter of the sensor-side surface of the glass lens closest to the plastic lens.

The sixth lens 106 is a plastic lens and may be designed to have a small effective diameter. The absolute value of the curvature radius of the sensor-side surface of the fifth lens 105 made of glass adjacent to the object side of the plastic lens may be reduced to guide light entering the plastic lens having a small effective diameter.

As shown in FIG. 4, the lens surfaces of the first, sixth, and seventh lenses 101, 106, and 107 among the lenses of the lens portion 100 according to the first embodiment may include an aspheric surface having a 30th order aspherical surface coefficient. For example, the first, sixth, and seventh lenses 101, 106, and 107 may include lens surfaces having a 30th order aspheric coefficient. As described above, an aspherical surface having a 30th order aspheric coefficient (a value other than "0") may change the aspherical shape of the peripheral portion particularly greatly, so that the optical performance of the peripheral portion of the field of view (FOV) may be well corrected.

Figure 35:
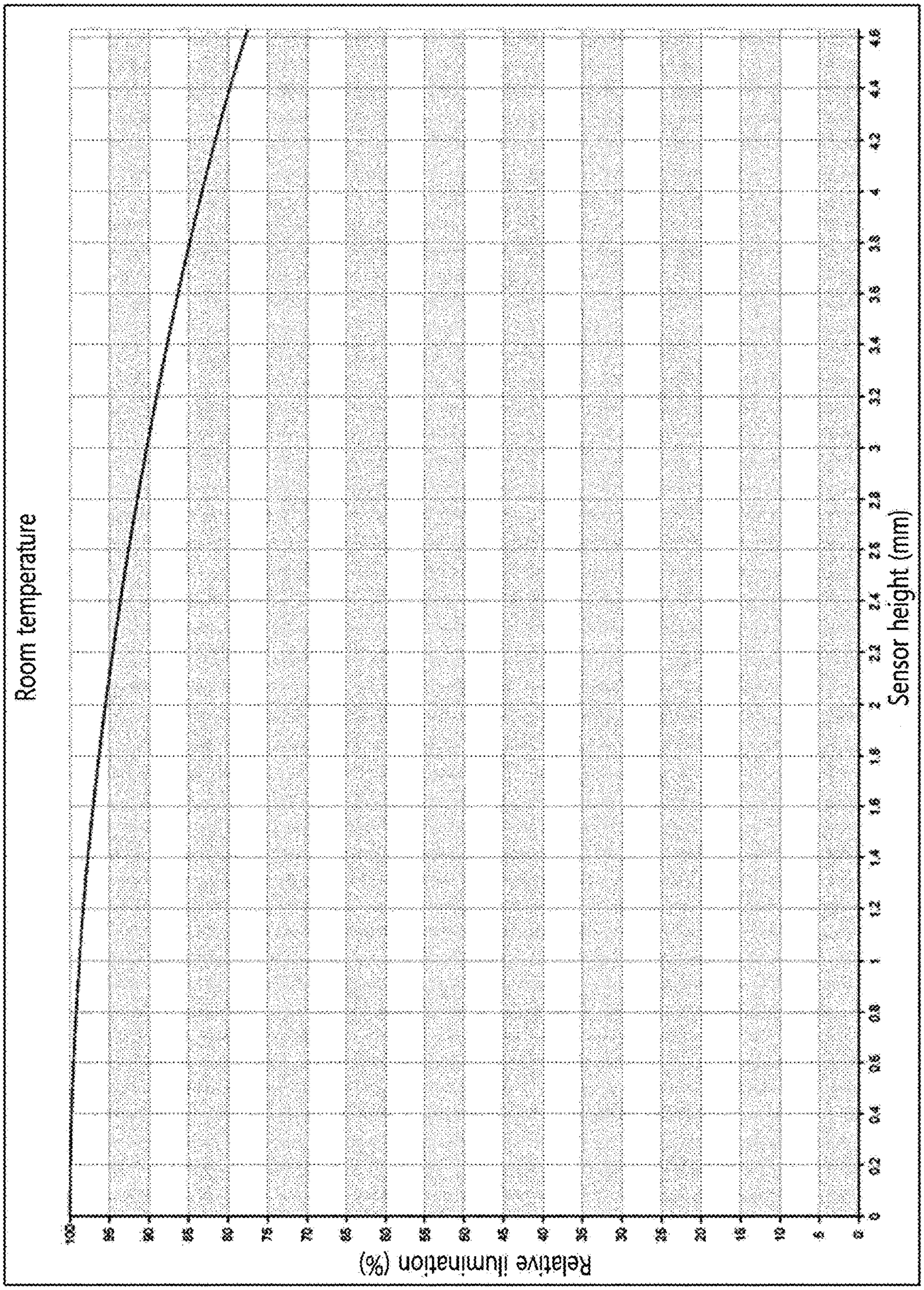
FIG. 35 is a graph illustrating relative illuminance according to a height of an image sensor according to an embodiment.

As shown in FIG. 5, the thicknesses T1 to T7 of the first to seventh lenses 101, 102, 103, 104, 105, 106, and 107 and the distance G1 to G6 between two adjacent lenses may be set. As shown in FIG. 5, it may be indicated at intervals of 0.1 mm or 0.2 mm or more for the thickness T1-T7 of each lens on the Y-axis direction, and at intervals of 0.1 mm or 0.2 mm or more for the distance G1-G6 between lenses. As shown in FIG. 6, in the optical system and camera module of FIG. 1, a chief ray angle (CRA) may be 10 degrees or more, for example, in a range of 10 degrees to 35 degrees or a range of 10 degrees to 25 degrees. As shown in FIG. 35, as a graph showing the ambient light ratio or relative illumination according to the image height in the optical system according to the embodiments, a relative illumination of 70% or more, for example, 75% or more, from the center of the image sensor to the diagonal end may be seen to appear.

FIGS. 7 to 9 are graphs showing diffraction MTF (Modulation Transfer Function) at room temperature, low temperature, and high temperature in the optical system of FIG. 1, and are graphs showing luminance ratio (modulation) according to spatial frequency. As shown in FIGS. 7 to 9, in the first embodiment of the invention, the deviation of the MTF from a low temperature or a high temperature based on room temperature may be less than 10%, that is, 7% or less.

FIGS. 10 to 12 are graphs showing aberration characteristics in the optical system of FIG. 1 at room temperature, low temperature, and high temperature. It is a graph in which spherical aberration, astigmatic field curves, and distortion are measured from left to right in the aberration graphs of FIGS. 10 to 12. In FIGS. 10 to 12, the X axis may indicate a focal length (mm) and distortion (%), and the Y axis may indicate the height of an image sensor. In addition, the graph for spherical aberration is a graph for light in a wavelength band of about 435 nm, about 486 nm, about 546 nm, about 587 nm, and about 656 nm, and the graph for astigmatism and distortion aberration is a graph for light in a wavelength band of about 546 nm. In the aberration diagrams of FIGS. 10 to 12, it may be interpreted that the aberration correction function is better as the curves at room temperature, low temperature, and high temperature are closer to the Y-axis, and it may be seen that the measured values are adjacent to the Y-axis. That is, the optical system 1000 according to the embodiment may have improved resolution and good optical performance not only at the center portion of the field of view (FOV) but also at the periphery portion. Here, the low temperature may be −20 degrees or less, for example, in the range of −20 to −40 degrees, the room temperature may be in the range of 22 degrees±5 degrees or 18 degrees to 27 degrees, and the high temperature may be in the range of 85 degrees or more, for example, 85 degrees to 105 degrees. Accordingly, it may be seen that the decrease in the luminance ratio (modulation) from the low temperature to the high temperature in FIGS. 10 to 12 is less than 10%, for example, 5% or less, or almost unchanged.

Table 1 compares changes in optical properties such as EFL, BFL, F-number, TTL and FOV at room temperature, low temperature and high temperature in the optical system according to the first embodiment, and it may be seen that the change rate of optical properties of the low temperature based on room temperature is 5% or less, for example, 3% or less, and the change rate of the optical properties at low temperature based on room temperature is 5% or less, for example, 3% or less.

TABLE 1

| | Room temper-ature | Low temper-ature | High temper-ature | Low temperature/ Room temperature | High temperature/ Room temperature |
|---|---|---|---|---|---|
| EFL(F) | 15.100 | 15.061 | 15.149 | 99.74% | 100.32% |
| BFL | 2.100 | 2.097 | 2.103 | 99.87% | 100.15% |
| F# | 1.600 | 1.596 | 1.605 | 99.72% | 100.34% |
| TTL | 30.842 | 30.802 | 30.889 | 99.87% | 100.15% |
| FOV | 33.928 | 34.036 | 33.800 | 100.32% | 99.62% |

Therefore, it may be seen that the change rate in optical characteristics according to the temperature change from low temperature to high temperature, for example, the change rate of the effective focal length (EFL), the change rate of the TTL, BFL, F-number, angle of view (FOV) is 10% or less, that is, in a range of 0~5%. Even if at least one or two or more plastic lenses are used, it is designed to allow temperature compensation for the plastic lens, thereby inhibiting deterioration in reliability of optical characteristics. Hereinafter, the second embodiment and the third embodiment will refer to the description of the first embodiment disclosed above, may include the first embodiment, and redundant description will be omitted.

Second Embodiment

Figure 18:
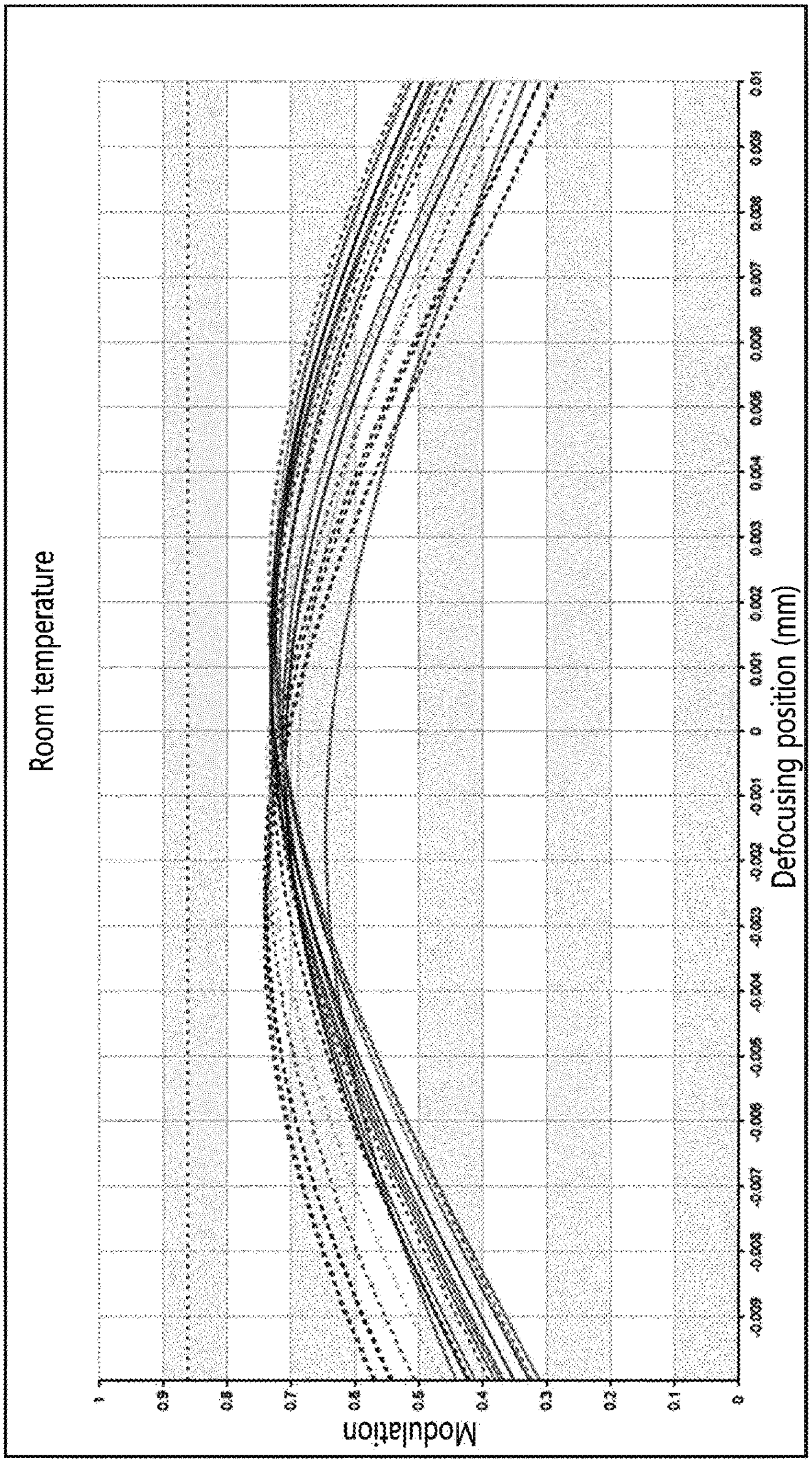
FIG. 18 is a graph showing diffraction MTF data of the optical system of FIG. 13 at room temperature.
Figure 19:
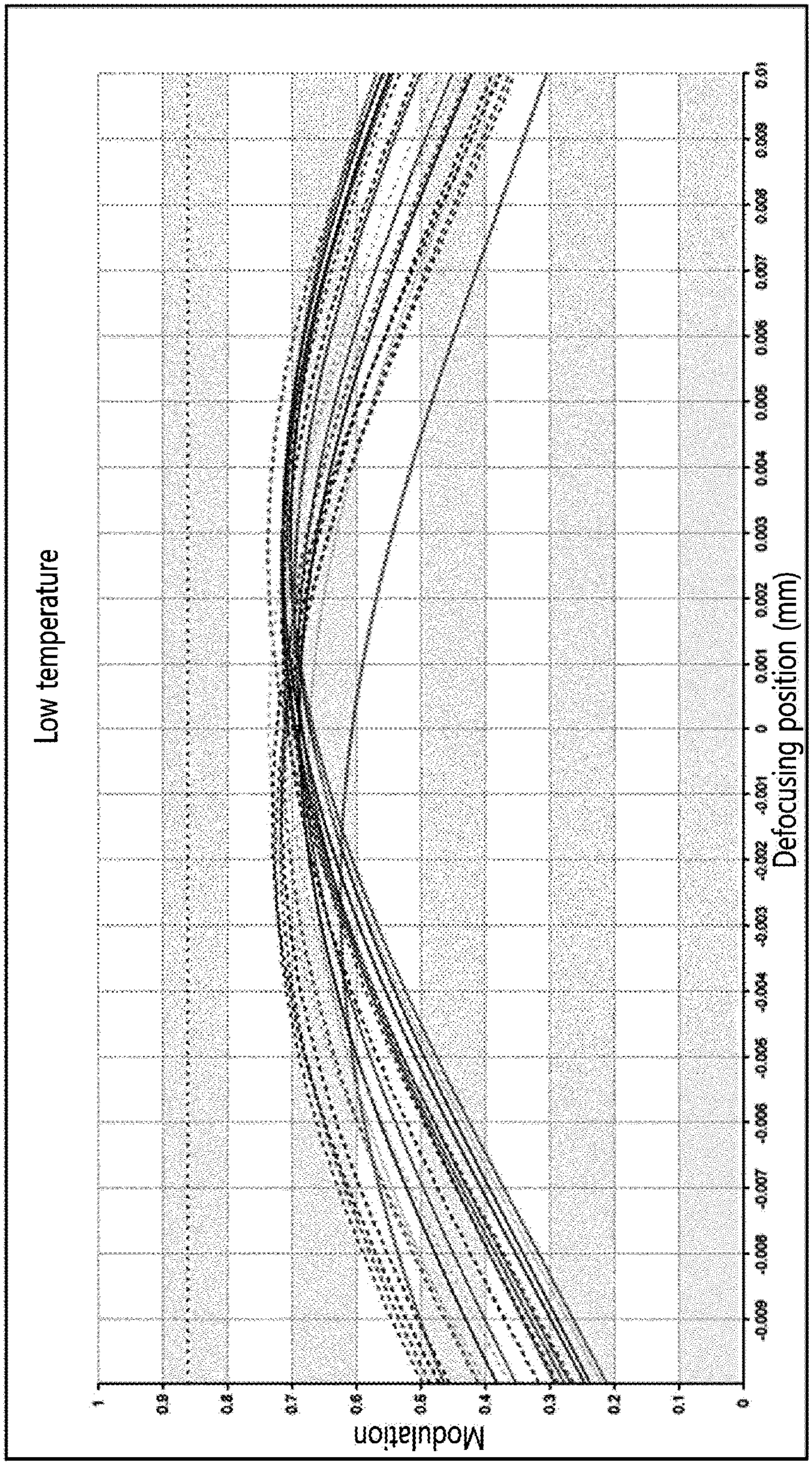
FIG. 19 is a graph showing data on the diffraction MTF of the optical system of FIG. 13 at a low temperature.
Figure 20:
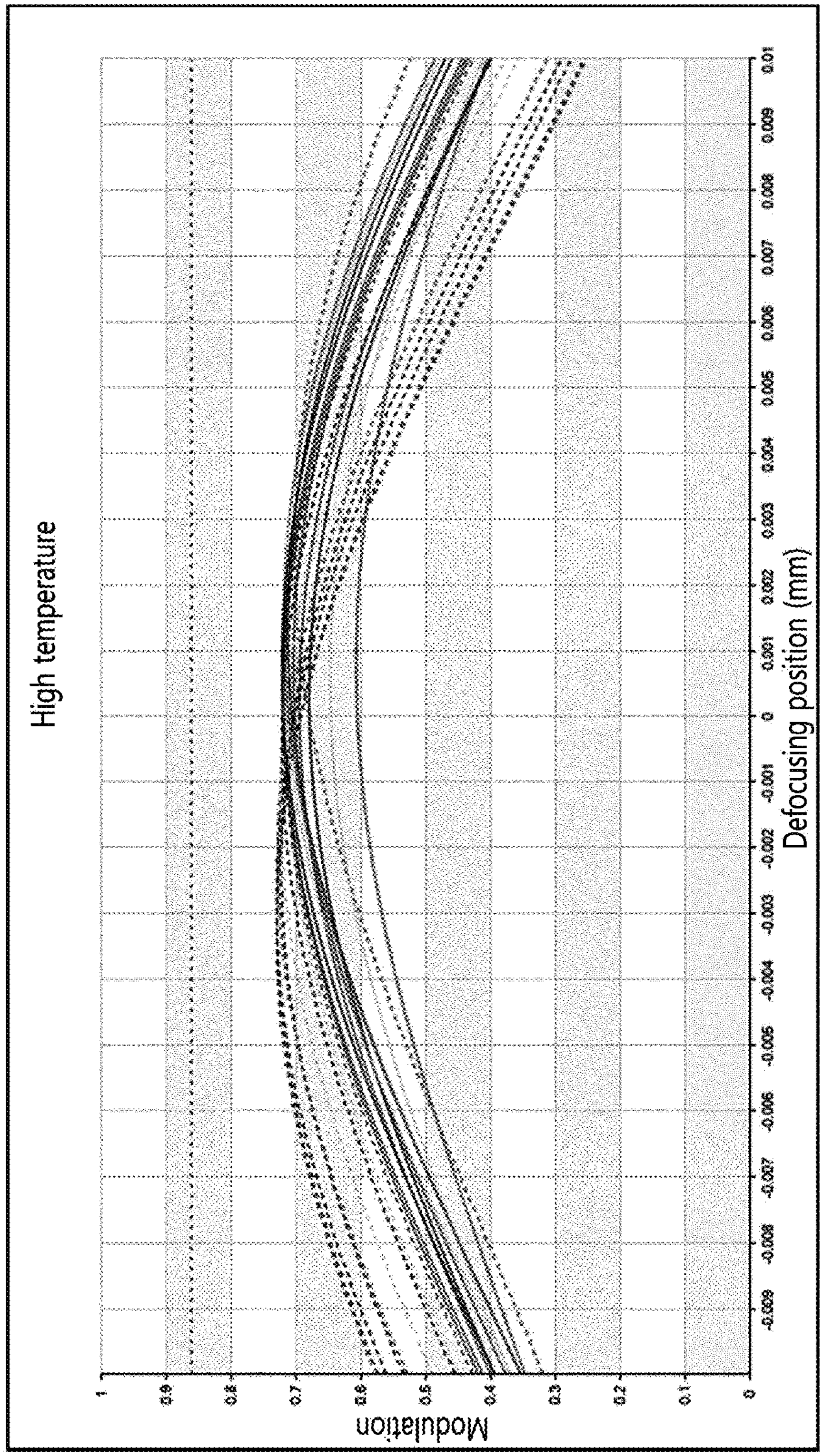
FIG. 20 is a graph showing data on the diffraction MTF of the optical system of FIG. 13 at a high temperature.
Figure 21:
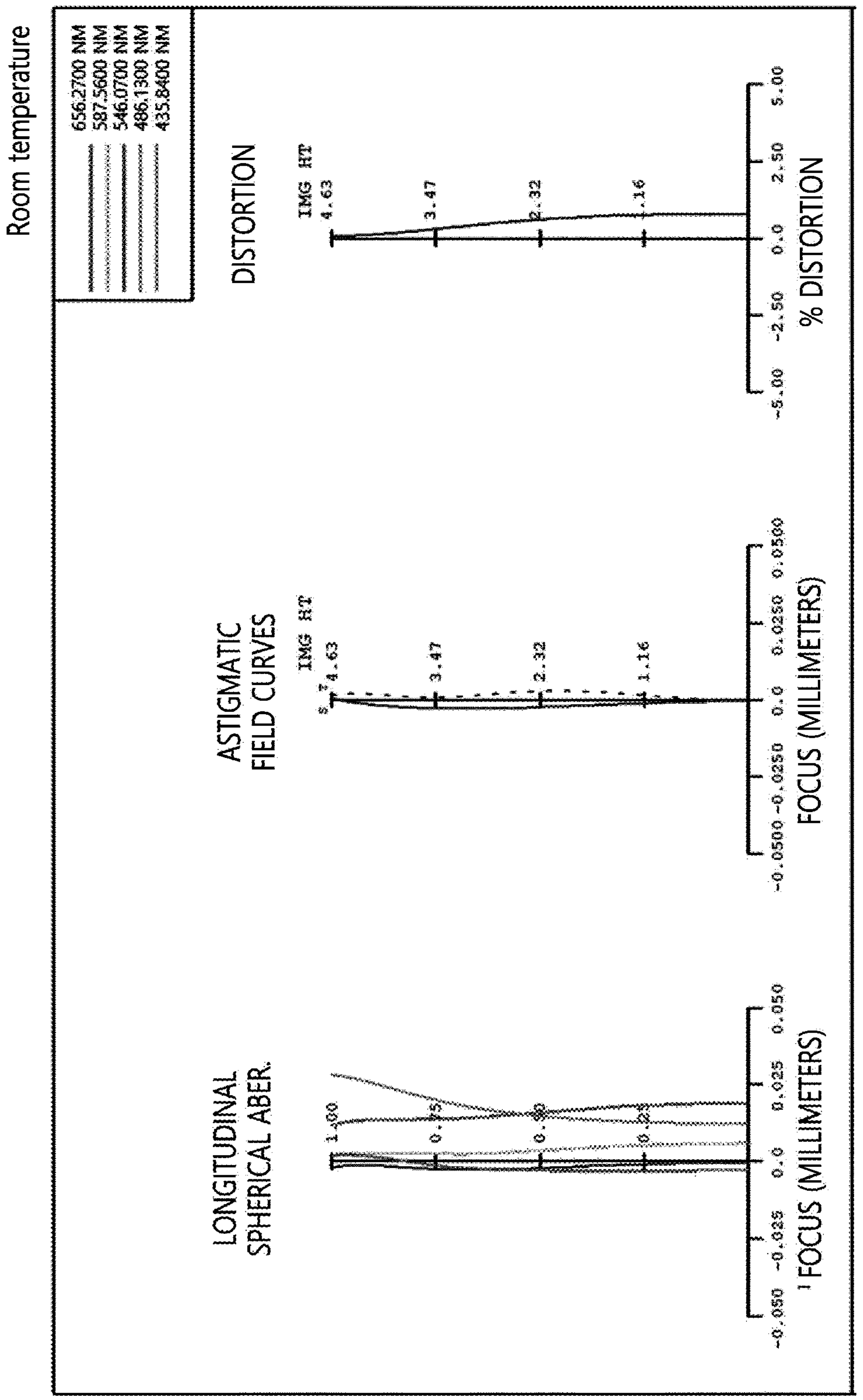
FIG. 21 is a graph showing data on aberration characteristics of the optical system of FIG. 13 at room temperature.
Figure 22:
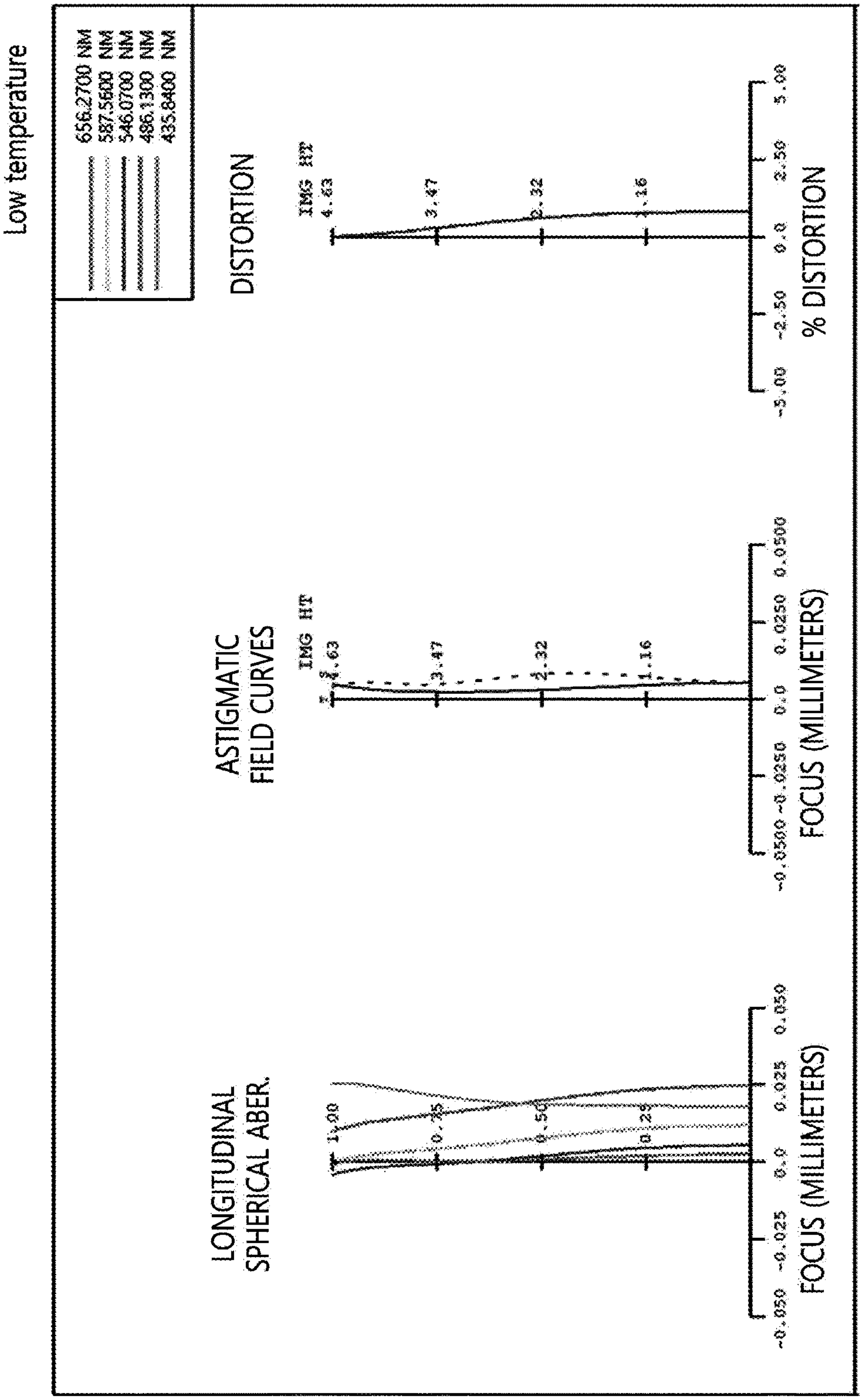
FIG. 22 is a graph showing data on aberration characteristics of the optical system of FIG. 13 at a low temperature.

FIG. 13 is a side cross-sectional view of an optical system according to a second embodiment and a camera module having the same, FIG. 14 is a table showing lens characteristics of the optical system of FIG. 13, FIG. 15 is a table showing aspherical surface coefficients of lenses in the optical system of FIG. 13, FIG. 16 is a table showing the thickness of each lens and the distance between adjacent lenses in the optical system of FIG. 13, FIG. 17 is a table showing data of a CRA (Chief Ray Angle Angle) at room temperature, low temperature and high temperature according to the position of the image sensor in the optical system of FIG. 13, FIG. 18 is a graph showing data on the diffraction MTF at room temperature of the optical system of FIG. 13, FIG. 19 is a graph showing data on the diffraction MTF of the optical system of FIG. 13 at a low temperature, FIG. 20 is a graph showing data on the diffraction MTF of the optical system of FIG. 13 at a high temperature, FIG. 21 is a graph showing data on aberration characteristics of the optical system of FIG. 13 at room temperature, and FIG. 22 is a graph showing data on aberration characteristics of the optical system of FIG. 13 at a high temperature.

Referring to FIGS. 13 to 23, the optical system 1000 according to the second embodiment may include a lens portion 100A having a first lens 111, a second lens 112, a third lens 113, a fourth lens 114, a fifth lens 115, a sixth lens 116, and a seventh lens 117. The first lens 111 may be a first lens group LG1, and the second to seventh lenses 112, 113, 114, 115, 116, and 117 may be a second lens group LG2. The aperture stop may be disposed around a sensor-side surface of the second lens 112 or around an object-side surface of the second lens 112.

The first lens 111 may have negative (−) refractive power. The first lens 111 may include a glass material. The first lens 111 may have a meniscus shape convex toward the object side. In other words, the first surface S1 of the first lens 111 may have a convex shape along the optical axis OA, and the second surface S2 may have a concave shape along the optical axis OA. Aspheric surface coefficients of the first and second surfaces S1 and S2 may be provided as L1S1 and L1S2 of FIG. 15. The first and second surfaces S1 and S2 may be provided from the optical axis OA to the end of the effective region without a critical point.

The second lens 112 may be disposed between the first lens 111 and the third lens 113. The second lens 112 may have positive (+) refractive power on the optical axis OA. The second lens 112 may include a glass material. The second lens 112 may have a meniscus shape convex toward the object side. In the optical axis OA, the third surface S3 of the second lens 112 may have a concave shape, and the fourth surface S4 may have a convex shape. Alternatively, the third surface S3 may be convex and the fourth surface S4 may be convex. The second lens 112 may have a convex shape on both sides. At least one or both of the third surface S3 and the fourth surface S4 may be spherical.

The third lens 113 may have positive (+) refractive power on the optical axis OA. The third lens 113 may include a glass material. On the optical axis OA, the fifth surface S5 of the third lens 113 may have a convex shape, and the sixth surface S6 may have a convex shape. Both surfaces of the third lens 113 may be convex. Alternatively, the third lens 113 may have a convex meniscus shape toward the object side or the sensor side. Alternatively, the third lens 113 may have a concave shape on both sides of the optical axis. At least one or both of the fifth surface S5 and the sixth surface S6 may be spherical. At least one or both of the fifth surface S5 and the sixth surface S6 may be provided from the optical axis OA to an end of the effective region without a critical point.

The fourth lens 114 may have positive (+) refractive power on the optical axis OA. The fourth lens 114 may include a glass material. The fourth lens 114 may have a convex meniscus shape toward the sensor side. On the optical axis OA, the seventh surface S7 of the fourth lens 114 may have a convex shape, and the eighth surface S8 may have a convex shape. The fourth lens 114 may have a convex shape on both sides of the optical axis OA. At least one or both of the seventh surface S7 and the eighth surface S8 may be spherical. The seventh surface S7 and the eighth surface S8 may be provided from the optical axis OA to the end of the effective region without a critical point.

The fifth lens 115 may have negative (−) refractive power on the optical axis OA. The fifth lens 115 may include a glass material. The fifth lens 115 may have a concave shape on both sides of the optical axis OA. In the optical axis OA, the ninth surface S9 of the fifth lens 115 may have a concave shape, and the tenth surface S10 may have a concave shape. Alternatively, the ninth surface S9 may have a concave shape along the optical axis OA, and the tenth surface S10 may have a convex shape along the optical axis OA. At least one or both of the ninth surface S9 and the tenth surface S10 may be spherical. At least one or both of the ninth surface S9 and the tenth surface S10 of the fifth lens 115 may be provided from an optical axis to an end of an effective region without a critical point.

The fourth lens 114 and the fifth lens 115 may be bonded. A bonding surface between the fourth lens 114 and the fifth lens 115 may be defined as an eighth surface S8. The eighth surface S8 may be the same surface as the ninth surface of the fifth lens 115. A distance between the fourth and fifth lenses 114 and 115 may be less than 0.01 mm. The fourth and fifth lenses 114 and 115 may have refractive powers opposite to each other. The composite refractive power of the fourth and fifth lenses 104 and 105 may have positive (+) refractive power. The combined lens may have positive refractive power, and the object-side lens 113 and the sensor-side lens 116 may have positive refractive power based on the combined lens. Accordingly, the third lens 103, the combined lens, and the sixth lens 106 may refract some incident light in the optical axis direction. An effective diameter of the fourth lens 114 may be greater than a diagonal length of the image sensor 300. The effective diameter of the fourth lens 114 is the average of the effective diameters of the seventh surface S7 and the eighth surface S8 and may be larger than the diagonal length of the image sensor 300. The effective diameter of the fifth lens 115 is smaller than the effective diameter of the fourth lens 114 and may have a length within #110% or +105% of the diagonal length of the image sensor 300.

The sixth lens 116 may have positive (+) refractive power. The sixth lens 116 may include a plastic material. The sixth lens 116 may have a convex shape on both sides of the optical axis OA. Alternatively, the sixth lens 116 may have a meniscus shape convex on the object side, a meniscus shape convex toward the sensor side, or a concave shape on both sides. At least one of the eleventh surface S11 and the twelfth surface S12 may be an aspheric surface. For example, both the eleventh surface S11 and the twelfth surface S12 may be aspherical surfaces. Aspheric surface coefficients of the eleventh and twelfth surfaces S11 and S12 may be provided as S1 and S2 of L6 in FIG. 15. At least one or both of the eleventh surface S11 and the twelfth surface S12 of the sixth lens 116 may be provided without a critical point.

The seventh lens 117 may have negative (−) refractive power. The seventh lens 117 may include plastic. The seventh lens 117 may have a meniscus shape convex from the optical axis toward the object side. Alternatively, on the optical axis OA, the thirteenth surface S13 may have a convex shape, and the fourteenth surface S14 may have a concave shape. At least one of the thirteenth surface S13 and the fourteenth surface S14 may be an aspheric surface. For example, both the thirteenth surface S13 and the fourteenth surface S14 may be aspheric surfaces. Aspheric surface coefficients of the thirteenth and fourteenth surfaces S13 and S14 may be provided as S1 and S2 of L7 in FIG. 15. At least one or both of the thirteenth surface S13 and the fourteenth surface S14 of the seventh lens 117 may be provided from the optical axis OA to the end of the effective region without a critical point.

FIG. 14 is an example of lens data of the optical system of the second embodiment of FIG. 13. As shown in FIG. 14, the radius of curvature, the thickness of the lens, the center distance between the lenses in the first to seventh lenses 111, 112, 113, 114, 115, 116, and 117 on the optical axis OA, the refractive index at d-line, Abbe number, and an effective diameter (CA: clear aperture) may be set.

As shown in FIG. 15, the lens surfaces of the first, sixth, and seventh lenses 111, 116, and 117 among the lenses of the lens portion 100A in the second embodiment may include an aspheric surface having a 30th order aspherical surface coefficient. For example, the first, sixth, and seventh lenses 111, 116, and 117 may include lens surfaces having a 30th order aspheric coefficient. As described above, an aspherical surface having a 30th order aspheric coefficient (a value other than "0") may change the aspherical shape of the peripheral portion particularly greatly, so that the optical performance of the peripheral portion of the field of view (FOV) may be well corrected.

As shown in FIG. 16, the thicknesses T1-T7 of the first to seventh lenses 111-117 and the distance G1-G6 between two adjacent lenses may be set. As shown in FIG. 16, it may be indicated at intervals of 0.1 mm or 0.2 mm or more for the thickness T1-T7 of each lens in the Y-axis direction, and at intervals of 0.1 mm or 0.2 mm or more for the distance G1-G6 between lenes. As shown in FIG. 17, in the optical system and camera module of FIG. 13, a chief ray angle (CRA) may be 10 degrees or more, for example, in a range of 10 degrees to 35 degrees or 10 degrees to 25 degrees. As shown in FIG. 35, as a graph showing the ambient light ratio or relative illumination according to the image height in the optical system according to the embodiments, the relative illumination of 70% or more, for example, 75% or more, from the center of the image sensor to the diagonal end may be seen to appear.

FIGS. 18 to 20 are graphs showing the diffraction MTF (Modulation Transfer Function) at room temperature, low temperature, and high temperature in the optical system of FIG. 13, and are graphs showing the luminance ratio (modulation) according to the spatial frequency. As shown in FIGS. 18 to 20, in the second embodiment of the invention, the deviation of MTF from a low temperature or a high temperature based on room temperature may be less than 10%, that is, 7% or less.

Figure 23:
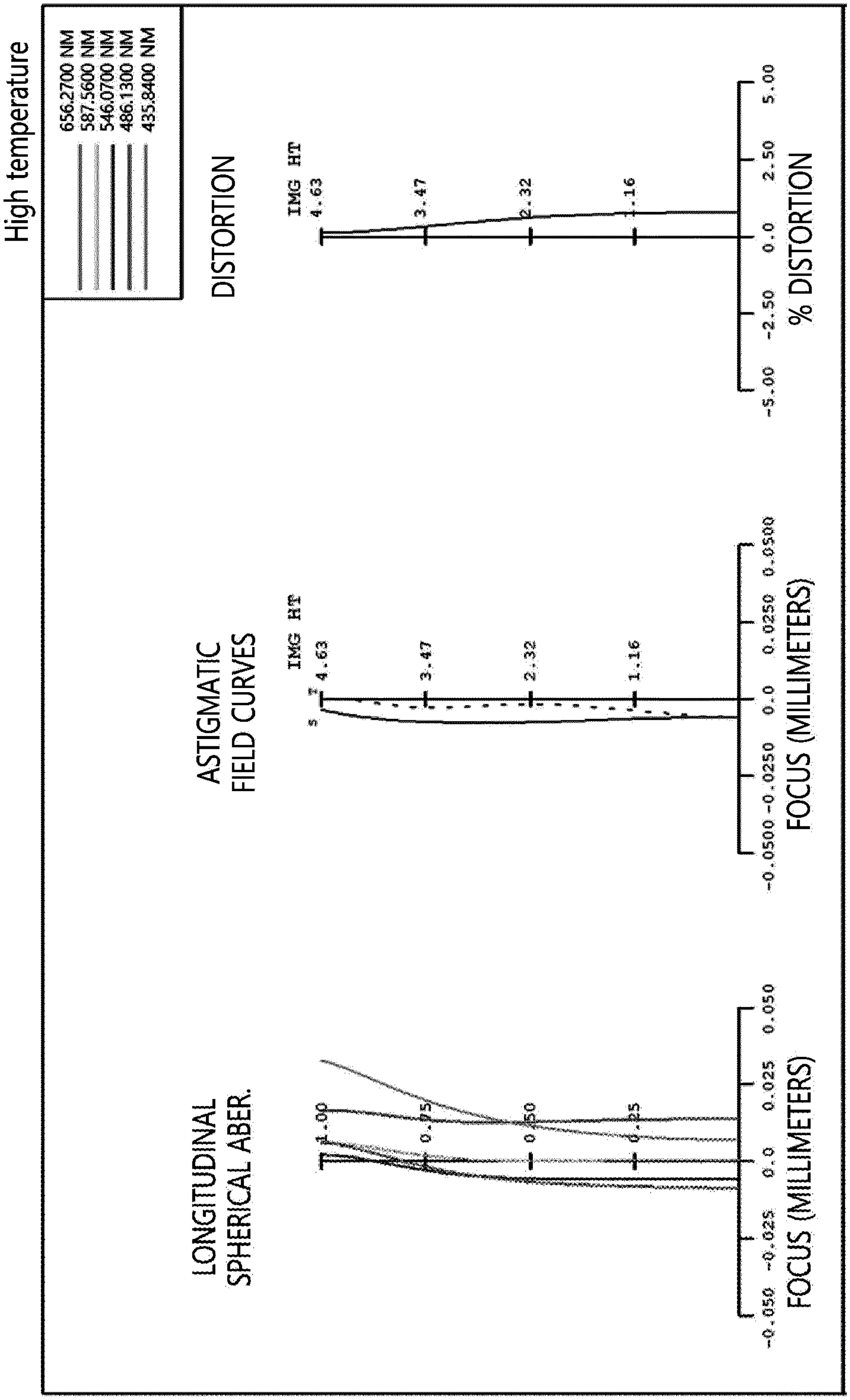
FIG. 23 is a graph showing data on aberration characteristics of the optical system of FIG. 13 at a high temperature.

FIGS. 21 to 23 are graphs showing aberration characteristics in the optical system of FIG. 13 at room temperature, low temperature, and high temperature. FIGS. 21 to 23 are graphs in which spherical aberration, astigmatic field curves, and distortion are measured from left to right in the aberration graphs of FIGS. 21 to 23. In FIGS. 21 to 23, the X-axis may represent a focal length (mm) and distortion (%), and the Y-axis may represent the height of an image. In addition, the graph for spherical aberration is a graph for light in a wavelength band of about 435 nm, about 486 nm, about 546 nm, about 587 nm, and about 656 nm, and the graph for astigmatism and distortion aberration is a graph for light in a wavelength band of about 546 nm. In the aberration diagrams of FIGS. 21 to 23, it may be interpreted that the aberration correction function is better as each curve at room temperature, low temperature, and high temperature approaches the Y-axis and it may be seen that the measured values are adjacent to the Y-axis. That is, the optical system 1000 according to the embodiment may have improved resolution and good optical performance not only at the center portion of the field of view (FOV) but also at the periphery portion. Here, the low temperature may be −20 degrees or less, for example, in the range of −20 to −40 degrees, the room temperature may be in the range of 22 degrees±5 degrees or 20 degrees to 27 degrees, and the high temperature may be in the range of 85 degrees or more, for example, 85 degrees to 105 degrees. Accordingly, it may be seen that the decrease in luminance ratio (modulation) from low temperature to high temperature in FIGS. 21 to 23 is less than 10%, for example, 5% or less, or almost unchanged. Therefore, it may be seen that the change in optical characteristic data according to the temperature change from low temperature to high temperature is not large, less than 10%.

Table 2 compares changes in optical properties such as EFL, BFL, F-number, TTL, and FOV at room temperature, low temperature, and high temperature in the optical system according to the second embodiment, and it may be seen that the change rate of optical properties of the low temperature based on room temperature is 5% or less, for example, 3% or less, and the change rate of the optical properties at low temperature based on room temperature is 5% or less, for example, 3% or less.

TABLE 2

| | Room temperature | Low temperature | High temperature | Low temperature/ Room temperature | High temperature/ Room temperature |
|---|---|---|---|---|---|
| EFL(F) | 15.101 | 15.06 | 15.151 | 99.73% | 100.33% |
| BFL | 2.100 | 2.10 | 2.103 | 99.87% | 100.15% |
| F# | 1.600 | 1.60 | 1.606 | 99.71% | 100.35% |
| TTL | 36.499 | 36.45 | 36.551 | 99.88% | 100.14% |
| FOV | 34.007 | 34.12 | 33.874 | 100.33% | 99.61% |

Therefore, in the second embodiment, it may be seen that the change rate in optical characteristics according to the temperature change from low temperature to high temperature, for example, the change rate of the effective focal length (EFL), the change rate of the TTL, BFL, F-number, angle of view (FOV) is 10% or less, that is, in a range of 0~5%. Even if at least one or two or more plastic lenses are used, it is designed to allow temperature compensation for the plastic lens, thereby inhibiting deterioration in reliability of optical characteristics.

Third Embodiment

Figure 29:
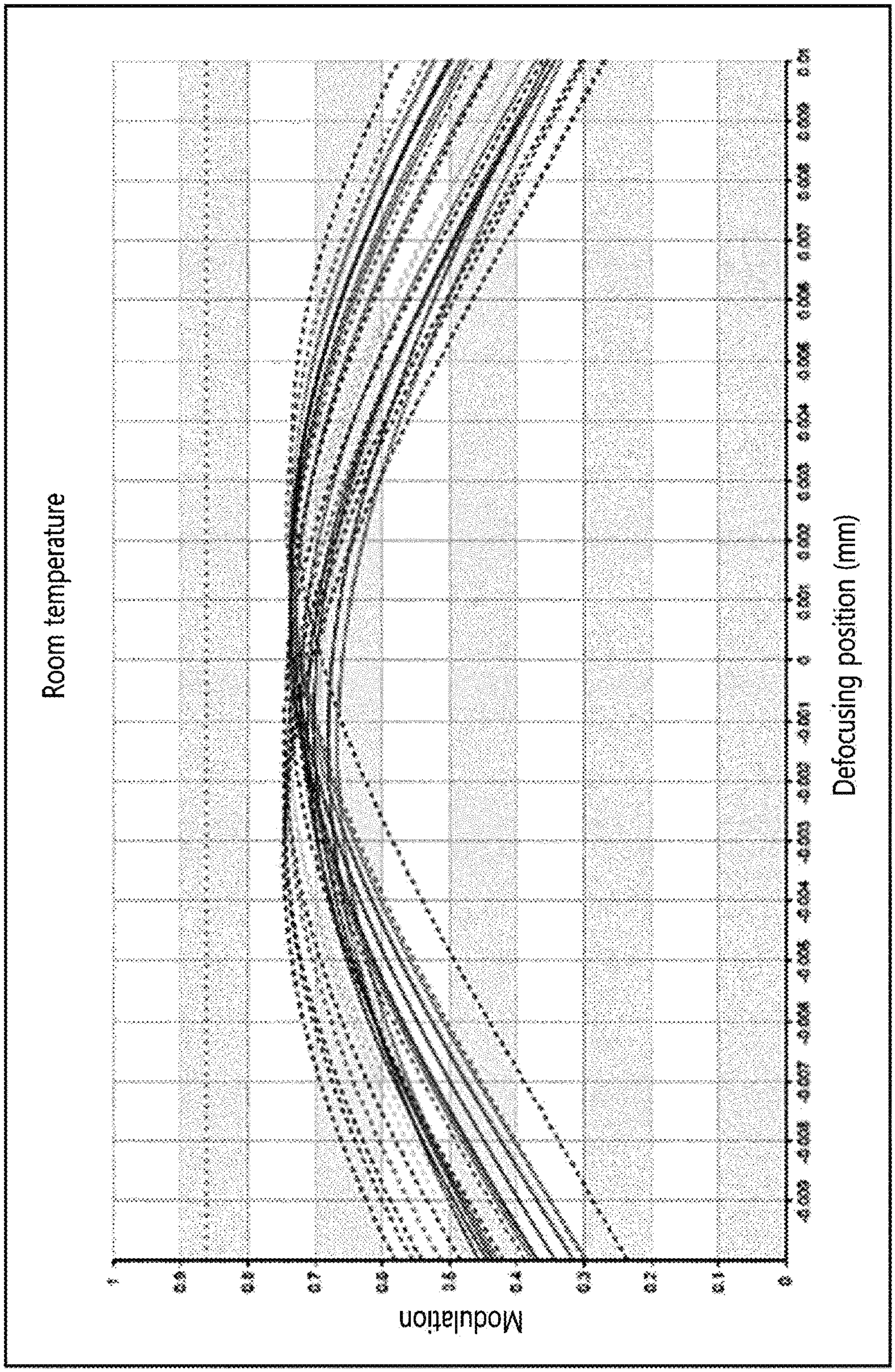
FIG. 29 is a graph showing diffraction MTF data of the optical system of FIG. 24 at room temperature.
Figure 30:
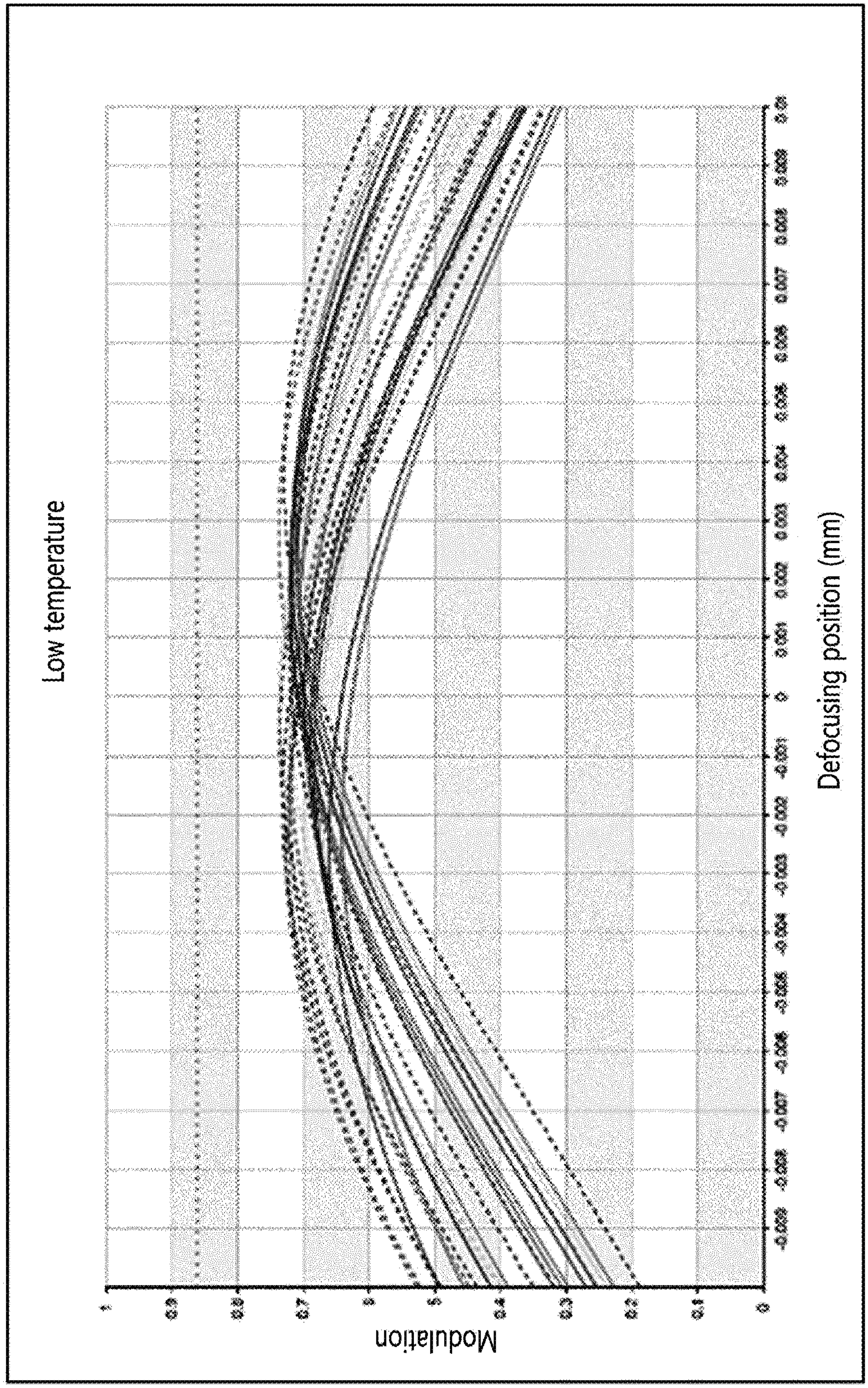
FIG. 30 is a graph showing diffraction MTF data of the optical system of FIG. 24 at a low temperature.
Figure 31:
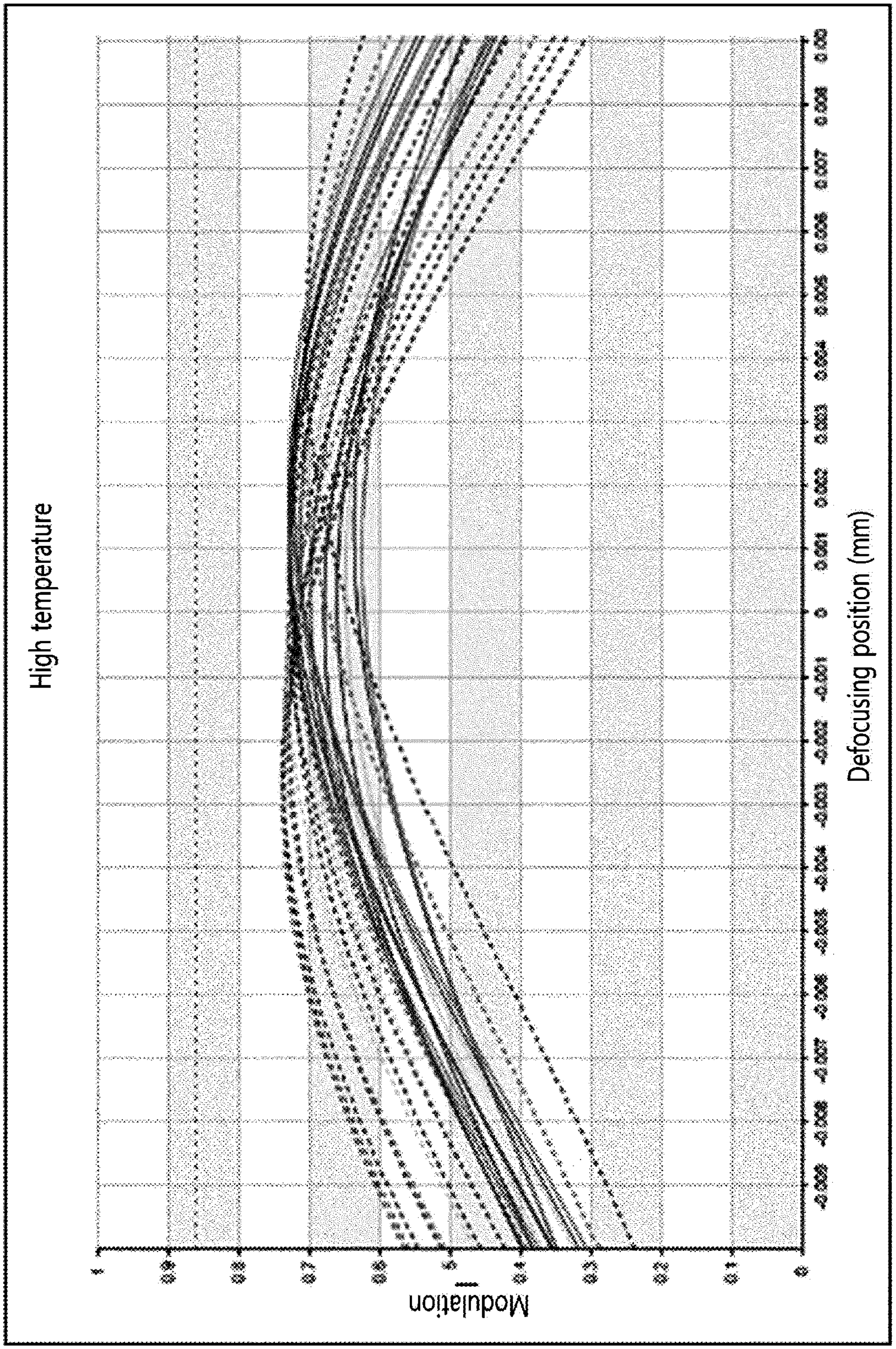
FIG. 31 is a graph showing data on the diffraction MTF of the optical system of FIG. 24 at a high temperature.
Figure 32:
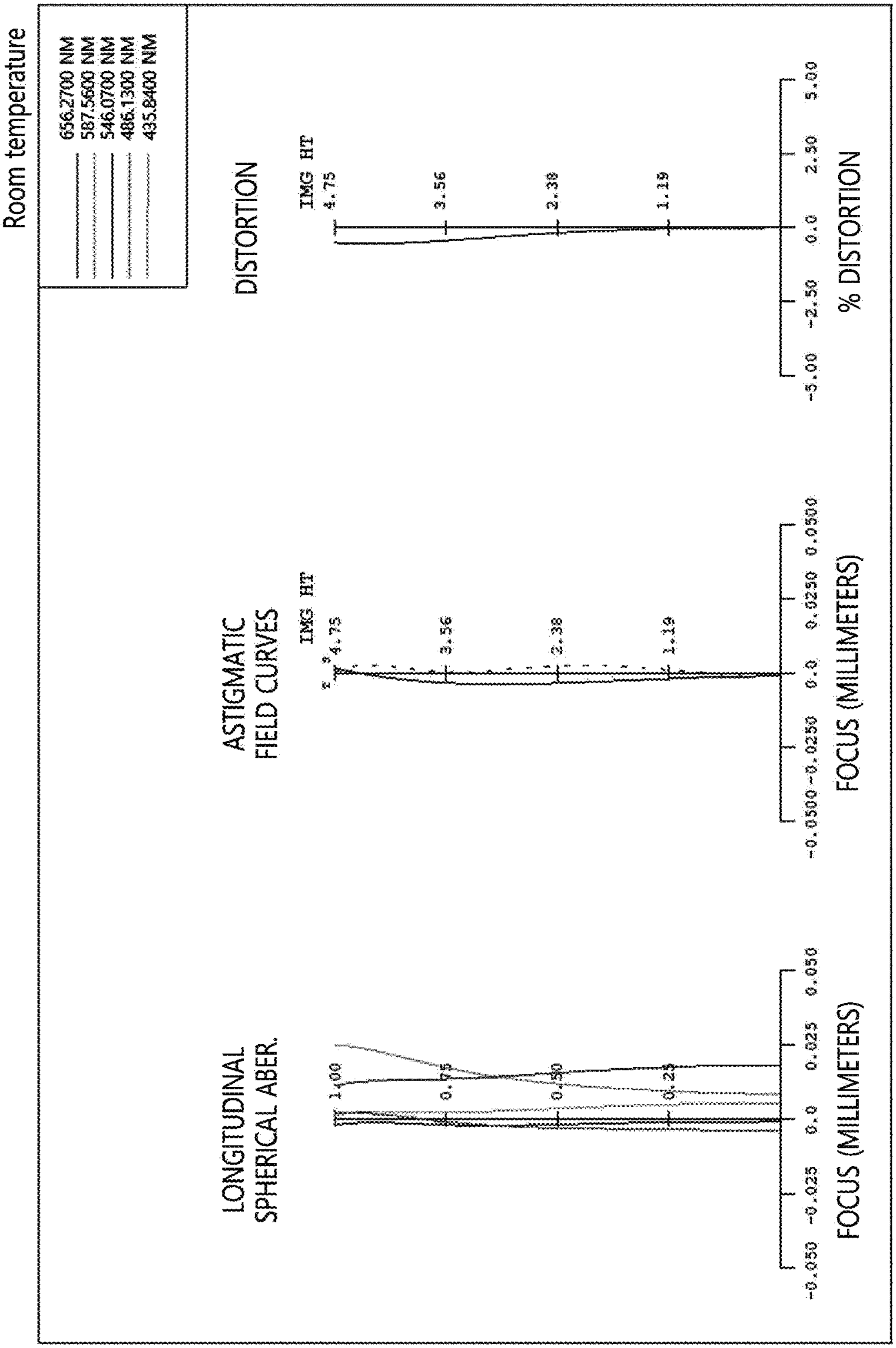
FIG. 32 is a graph showing data on aberration characteristics of the optical system of FIG. 24 at room temperature.
Figure 33:
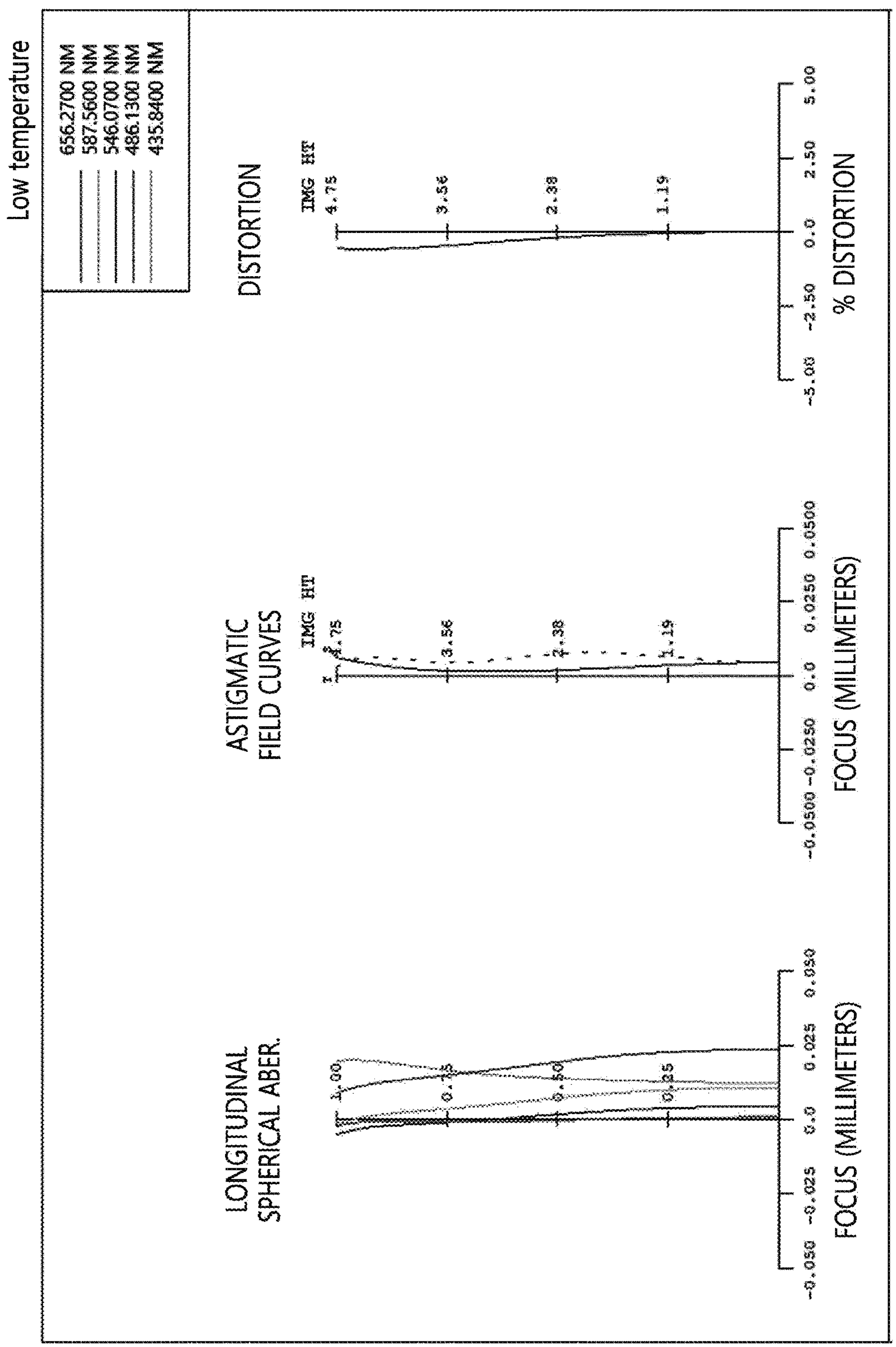
FIG. 33 is a graph showing data on aberration characteristics of the optical system of FIG. 24 at low temperatures.
Figure 34:
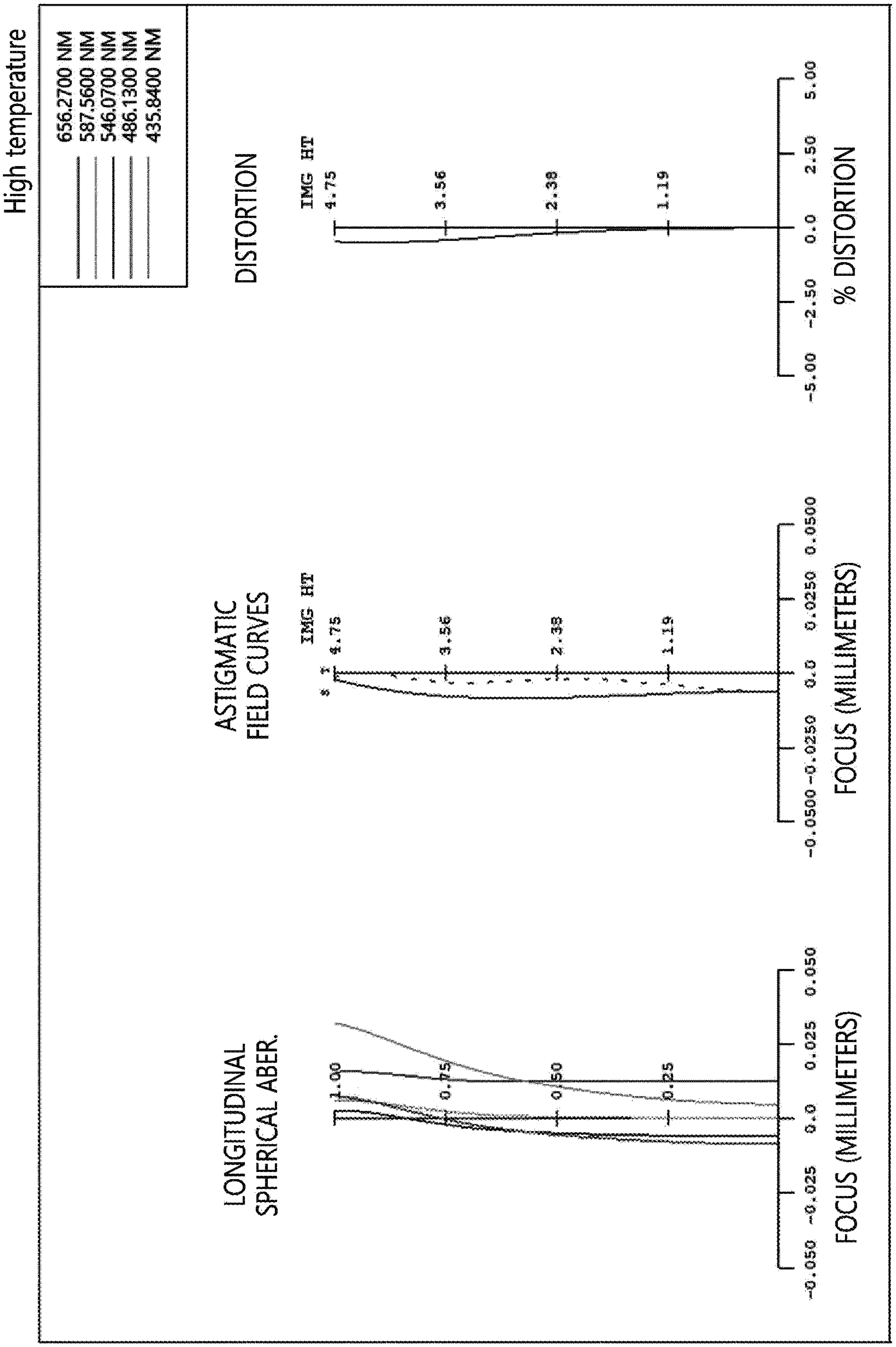
FIG. 34 is a graph showing data on aberration characteristics of the optical system of FIG. 24 at a high temperature.

FIG. 24 is a side cross-sectional view of an optical system according to a third embodiment and a camera module having the same, FIG. 25 is a table showing lens characteristics of the optical system of FIG. 24, FIG. 26 is a table showing aspherical surface coefficients of lenses in the optical system of FIG. 24, FIG. 27 is a table showing the thickness of each lens and the distance between adjacent lenses in the optical system of FIG. 24, FIG. 28 is CRA (Chief Ray Angle) at room temperature, low temperature and high temperature according to the position of the image sensor in the optical system of FIG. 24, FIG. 29 is a graph showing data on the diffraction MTF at room temperature of the optical system of FIG. 24, FIG. 30 is a graph showing data on the diffraction MTF of the optical system of FIG. 24 at a low temperature, FIG. 31 is a graph showing data on the diffraction MTF of the optical system of FIG. 24 at a high temperature, FIG. 32 is a graph showing data on aberration characteristics of the optical system of FIG. 24 at room temperature, FIG. 33 is a graph of the optical system of FIG. 24 at a low temperature, and FIG. 34 is a graph showing data on aberration characteristics of the optical system of FIG. 24 at a high temperature.

Referring to FIGS. 24 to 34, the optical system 1000 according to the second embodiment may include a lens portion 100B having a first lens 121, a second lens 122, a third lens 123, a fourth lens 124, a fifth lens 125, a sixth lens 126 and a seventh lens 127. The first lens 121 may be a first lens group LG1, and the second to seventh lenses 122, 123, 124, 125, 126, and 127 may be a second lens group LG2. The aperture stop may be disposed around a sensor-side surface of the second lens 122 or around an object-side surface of the second lens 122.

The first lens 121 may have negative (−) refractive power. The first lens 121 may include a glass material. The first lens 121 may have a meniscus shape convex toward the object side. In other words, the first surface S1 of the first lens 121 may have a convex shape along the optical axis OA, and the second surface S2 may have a concave shape along the optical axis OA. Aspherical surface coefficients of the first and second surfaces S1 and S2 may be provided as L1S1 and L1S2 of FIG. 26. The first and second surfaces S1 and S2 may be provided from the optical axis OA to the end of the effective region without a critical point.

The second lens 122 may be disposed between the first lens 121 and the third lens 123. The second lens 122 may have positive (+) refractive power on the optical axis OA. The second lens 122 may include a glass material. The second lens 122 may have a meniscus shape convex toward the object side. In the optical axis OA, the third surface S3 of the second lens 122 may have a concave shape, and the fourth surface S4 may have a convex shape. Alternatively, the third surface S3 may be convex and the fourth surface S4 may be convex. The second lens 122 may have a convex shape on both sides. At least one or both of the third surface S3 and the fourth surface S4 may be spherical.

The third lens 123 may have positive (+) refractive power on the optical axis OA. The third lens 123 may include a glass material. The fifth surface S5 of the third lens 123 may have a convex shape, and the sixth surface S6 may have a convex shape on the optical axis OA. Both sides of the third lens 123 may be convex. Alternatively, the third lens 123 may have a convex meniscus shape toward the object side or the sensor side. Alternatively, the third lens 123 may have a concave shape on both sides of the optical axis. At least one or both of the fifth surface S5 and the sixth surface S6 may be spherical. At least one or both of the fifth surface S5 and the sixth surface S6 may be provided from the optical axis OA to an end of the effective region without a critical point.

The fourth lens 124 may have positive (+) refractive power on the optical axis OA. The fourth lens 124 may include a glass material. The sensor side of the fourth lens 124 may have a convex meniscus shape. On the optical axis OA, the seventh surface S7 of the fourth lens 124 may have a convex shape, and the eighth surface S8 may have a convex shape. The fourth lens 124 may have a convex shape on both sides of the optical axis OA. At least one or both of the seventh surface S7 and the eighth surface S8 may be spherical. The seventh surface S7 and the eighth surface S8 may be provided from the optical axis OA to the end of the effective region without a critical point.

The fifth lens 125 may have negative (−) refractive power on the optical axis OA. The fifth lens 125 may include a glass material. The fifth lens 125 may have a concave shape on both sides of the optical axis OA. On the optical axis OA, the ninth surface S9 of the fifth lens 125 may have a concave shape, and the tenth surface S10 may have a concave shape. Alternatively, the ninth surface S9 may have a concave shape along the optical axis OA, and the tenth surface S10 may have a convex shape along the optical axis OA. At least one or both of the ninth surface S9 and the tenth surface S10 may be spherical. At least one or both of the ninth surface S9 and the tenth surface S10 of the fifth lens 125 may be provided from an optical axis to an end of an effective region without a critical point.

The fourth lens 124 and the fifth lens 125 may be bonded. A bonding surface between the fourth lens 124 and the fifth lens 125 may be defined as an eighth surface S8. The eighth surface S8 may be the same surface as the ninth surface of the fifth lens 125. A distance between the fourth and fifth lenses 124 and 125 may be less than 0.01 mm. The fourth and fifth lenses 124 and 125 may have refractive powers opposite to each other. The composite refractive power of the fourth and fifth lenses 104 and 105 may have positive (+) refractive power. The combined lens may have positive refractive power, and the object-side lens 123 and the sensor-side lens 126 may have positive refractive power based on the combined lens. Accordingly, the third lens 103, the combined lens, and the sixth lens 106 may refract some incident light in the optical axis direction. An effective diameter of the fourth lens 124 may be greater than a diagonal length of the image sensor 300. The effective diameter of the fourth lens 124 is the average of the effective diameters of the seventh surface S7 and the eighth surface S8 and may be greater than the diagonal length of the image sensor 300. The effective diameter of the fifth lens 125 is smaller than the effective diameter of the fourth lens 124 and may have a length within +110% or +105% of the diagonal length of the image sensor 300.

The sixth lens 126 may have positive (+) refractive power. The sixth lens 126 may include a plastic material. The sixth lens 126 may have a meniscus shape convex from the optical axis OA toward the object side. Alternatively, the sixth lens 126 may have a concave shape on both sides or a meniscus shape convex toward the sensor. At least one of the eleventh surface S11 and the twelfth surface S12 may be an aspheric surface. For example, both the eleventh surface S11 and the twelfth surface S12 may be aspherical surfaces. The aspheric coefficients of the eleventh and twelfth surfaces S11 and S12 may be provided as S1 and S2 of L6 in FIG. 26. At least one or both of the eleventh surface S11 and the twelfth surface S12 of the sixth lens 126 may be provided without a critical point.

The seventh lens 127 may have negative (−) refractive power. The seventh lens 127 may include plastic. The seventh lens 127 may have a shape in which both sides of the optical axis are convex. Alternatively, the seventh lens 127 may have a meniscus shape convex toward the object side. Alternatively, in the optical axis OA, the thirteenth surface S13 may have a convex shape, and the fourteenth surface S14 may have a concave shape. At least one of the thirteenth surface S13 and the fourteenth surface S14 may be an aspheric surface. For example, both the thirteenth surface S13 and the fourteenth surface S14 may be aspheric surfaces. Aspheric surface coefficients of the thirteenth and fourteenth surfaces S13 and S14 may be provided as S1 and S2 of L7 in FIG. 26. At least one or both of the thirteenth surface S13 and the fourteenth surface S14 of the seventh lens 127 may be provided from the optical axis OA to the end of the effective region without a critical point.

FIG. 25 is an example of lens data of the optical system of the third embodiment of FIG. 24. As shown in FIG. 25, the radius of curvature, the thickness of the lens, the center distance between the lenses of the first to seventh lenses 121, 122, 123, 124, 125, 126, and 127 on the optical axis OA, the refractive index at the d-line, Abbe number, and an effective diameter (CA: clear aperture) may be set.

As shown in FIG. 26, the lens surfaces of the first, sixth, and seventh lenses 121, 126, and 127 among the lenses of the lens portion 100B in the third embodiment may include aspheric surfaces having a 30th order aspheric coefficient. For example, the first, sixth, and seventh lenses 121, 126, and 127 may include lens surfaces having a 30th order aspheric coefficient. As described above, an aspherical surface having a 30th order aspheric coefficient (a value other than "0") may change the aspherical shape of the peripheral portion particularly greatly, so that the optical performance of the peripheral portion of the field of view (FOV) may be well corrected.

As shown in FIG. 27, the thicknesses T1 to T7 of the first to seventh lenses 121, 122, 123, 124, 125, 126, and 127 and the distance G1 to G6 between two adjacent lenses may be set. As shown in FIG. 27, it may be indicated at intervals of 0.1 mm or 0.2 mm or more for the thickness T1-T7 of each lens in the Y-axis direction, and at intervals of 0.1 mm or 0.2 mm or more for the distance G1-G6 between each lens. As shown in FIG. 28, in the optical system and camera module of FIG. 24, a chief ray angle (CRA) may be 10 degrees or more, for example, in the range of 10 degrees to 35 degrees or 10 degrees to 25 degrees. As shown in FIG. 35, as a graph showing the ambient light ratio or relative illumination according to the image height in the optical system according to the embodiments, the relative illumination of 70% or more, for example, 75% or more, from the center of the image sensor to the diagonal end may be seen to appear.

FIGS. 29 to 31 are graphs showing the diffraction MTF (Modulation transfer function) at room temperature, low temperature, and high temperature in the optical system of FIG. 24, and are graphs showing the luminance ratio (modulation) according to the spatial frequency. As shown in FIGS. 29 to 31, in the third embodiment, the deviation of the MTF from a low temperature or a high temperature based on room temperature may be less than 10%, that is, 7% or less.

FIGS. 32 to 34 are graphs showing aberration characteristics of the optical system of FIG. 24 at room temperature, low temperature, and high temperature. In the aberration graphs of FIGS. 32 to 34, spherical aberration, astigmatic field curves, and distortion are measured from left to right. In FIGS. 32 to 34, the X axis may indicate a focal length (mm) and distortion (%), and the Y axis may indicate the height of an image sensor. In addition, the graph for spherical aberration is a graph for light in a wavelength band of about 435 nm, about 486 nm, about 546 nm, about 587 nm, and about 656 nm, and the graph for astigmatism and distortion aberration is a graph for light in a wavelength band of about 546 nm. In the aberration diagrams of FIGS. 32 to 34, it may be interpreted that the aberration correction function is better as the curves at room temperature, low temperature, and high temperature are closer to the Y-axis, and it may be seen that the measured values are adjacent to the Y-axis. That is, the optical system 1000 according to the embodiment may have improved resolution and good optical performance not only at the center portion of the field of view (FOV) but also at the periphery portion. Here, the low temperature may be −20 degrees or less, for example, in the range of −20 to −40 degrees, the room temperature may be in the range of 22 degrees±5 degrees or 18 degrees to 27 degrees, and the high temperature may be in the range of 85 degrees or more, for example, 85 degrees to 105 degrees. Accordingly, it may be seen that the decrease in the luminance ratio (modulation) from the low temperature to the high temperature in FIGS. 32 to 34 is less than 10%, for example, 5% or less, or almost unchanged. Therefore, it may be seen that the change in optical characteristic data according to the temperature change from low temperature to high temperature is not large, less than 10%.

Table 3 compares changes in optical properties such as EFL, BFL, F-number, TTL and FOV at room temperature, low temperature and high temperature in the optical system according to the third embodiment, and it may be seen that the change rate of optical properties of the low temperature based on room temperature is 5% or less, for example, 3% or less, and the change rate of the optical properties at low temperature based on room temperature is 5% or less, for example, 3% or less.

TABLE 3

| | Room temperature | Low temperature | High temperature | Low temperature/ Room temperature | High temperature/ Room temperature |
|---|---|---|---|---|---|
| EFL | 15.230 | 15.193 | 15.276 | 99.76% | 99.46% |
| BFL | 2.100 | 2.097 | 2.103 | 99.87% | 99.71% |
| F# | 1.600 | 1.598 | 1.605 | 99.89% | 99.57% |

TABLE 3-continued

| | Room temper-ature | Low temper-ature | High temper-ature | Low temperature/ Room temperature | High temperature/ Room temperature |
|---|---|---|---|---|---|
| TTL | 36.292 | 36.248 | 36.343 | 99.88% | 99.74% |
| FOV | 33.983 | 34.087 | 33.861 | 100.31% | 100.67% |

Therefore, in the third embodiment, it may be seen that the change rate in optical characteristics according to the temperature change from low temperature to high temperature, for example, the change rate of the effective focal length (EFL), the change rate of the TTL, BFL, F-number, angle of view (FOV) is 10% or less, that is, in a range of 0~5%. Even if at least one or two or more plastic lenses are used, it is designed to allow temperature compensation for the plastic lens, thereby inhibiting deterioration in reliability of optical characteristics. The optical systems of the first to third embodiments disclosed above may effectively control aberration characteristics such as chromatic aberration and distortion aberration, and may have good optical performance not only in the center portion of the field of view (FOV) but also in the periphery portion. The optical system 1000 according to the first to third embodiments disclosed above may satisfy at least one or two or more of equations described below. Accordingly, the optical system 1000 according to the embodiment may have improved optical characteristics. For example, when the optical system 1000 satisfies at least one equation, the optical system 1000 may effectively control aberration characteristics such as chromatic aberration and distortion aberration, and may have good optical performance not only in the center portion of the field of view (FOV) but also in the periphery portion. Also, the optical system 1000 may have improved resolving power. In addition, the meaning of the thickness of the optical axis OA of the lens described in the equations and the interval of the optical axis OA of adjacent lenses may refer to the above-disclosed embodiment.

$$1 < CT6/CT7 < 3 \quad \text{[Equation 1]}$$

In Equation 1, CT6 means the thickness (mm) of the first lenses 106, 116, and 126 along the optical axis OA, and CT7 means the thickness (mm) of the seventh lenses 107, 117, and 127 along the optical axis OA. Equation 1 sets the center thickness difference between the sixth and seventh lenses, thereby improving the chromatic aberration of the optical system, and preferably satisfies: $1<CT6/CT7<2$. In addition, manufacturing precision of the sixth and seventh lenses may be alleviated, and optical performance of the center and periphery portions of the FOV may be improved.

$$0.5 < CT1/ET1 < 1 \quad \text{[Equation 2]}$$

In Equation 2, CT1 means the thickness (mm) of the first lenses 101, 111, and 121 along the optical axis OA, and ET1 means the thickness at the edge of the first lenses 101, 111, and 121, that is, at the end of the effective region do. Equation 2 sets the center thickness and the edge thickness of the first lens, so that factors affecting the angle of view of the optical system may be set, and factors affecting the effective focal length (EFL) may be set, preferably equation: $0.6 \leq CT1/ET1 < 1$ may be satisfied.

$$Po1 < 0 \quad \text{[Equation 3]}$$

In Equation 3, Po1 is set to the negative refractive power of the first lenses 101, 111, and 121, and may be set to have a short effective focal length compared to TTL in the optical system for performance of the optical system. Accordingly, equation: TTL>F may be satisfied, and for example, the TTL may be 1.5 times or more, for example, 1.5 times to 2.5 times the effective focal length F.

$$1.7 < n1 < 2.2 \quad \text{[Equation 4]}$$

In Equation 4, n1 is the refractive index of the first lenses 101, 111, and 121 at the d-line. Equation 4 sets the refractive index of the first lens to be high, so that factors affecting the reduction of the 3rd order aberration (Seidel aberration) of the optical system may be adjusted and the effect of TTL may be suppressed. Equation 4 may preferably satisfy: $1.75<n1<2.1$. When designed to be lower than the lower limit of Equation 4, there may be no efficacy in reducing aberrations. When designed higher than the upper limit of Equation 4, there is a disadvantage in that it is difficult to obtain materials.

$$1.6 \leq Aver(n1{:}\ n7) \leq 1.7 \quad \text{[Equation 4-1]}$$

In Equation 4-1, Aver (n1: n7) is an average of refractive index values of the first to seventh lenses at the d-line. When the optical system 1000 according to the embodiment satisfies Equation 4-1, the optical system 1000 may set the resolution and suppress the effect on TTL.

$$20 < FOV\_H \leq 40 \quad \text{[Equation 5]}$$

In Equation 5, FOV_H represents the horizontal angle of view, and the range of the vehicle optical system may be set. Equation 5 preferably satisfies: $30 \leq FOV\_H \leq 40$ or $25 \leq FOV\_H \leq 35$, or may satisfy a range of 29.8 degrees±3 degrees, and the sensor height in the horizontal direction may be 4.032 mm±0.5 mm. Also, when Equation 5 is satisfied, the change rate of the effective focal length and the change rate of the angle of view when the temperature changes from room temperature to high temperature may be set to 5% or less, for example, 0 to 5%. In addition, even when one or more plastic lenses are used in the optical system 1000 by mixing, for example, two or more plastic lenses, a decrease in optical characteristics may be inhibited through temperature compensation of the plastic lenses.

$$L1R1 > 0 \quad \text{[Equation 6]}$$

In Equation 6, L1R1 represents the radius of curvature of the first surface S1 of the first lenses 101, 111, and 121, and may be set smaller than 0. When Equation 6 is satisfied, the shape of the optical system may be limited. The object-side surface of the first lens is convex to inhibit deterioration of resolution due to a foreign material. When the foreign material comes into contact with the first object-side surface, as the optical axis portion of the object-side surface of the first lens is a convex shape, the foreign material is pushed to the outside of the optical axis, thereby inhibiting deterioration in resolution due to the foreign material.

$$1 < \text{L7S2\_max\_sag to Sensor} < 3 \quad \text{[Equation 7]}$$

In Equation 7, L7S2_max_sag to Sensor may be a straight-line distance from the maximum sag value of the seventh lenses 107, 117, and 127 to the image sensor 300, and conditions for manufacturing the camera module may be set. When L7S2_max_sag to Sensor distance is smaller than the lower limit of Equation 7, it is difficult to assemble with the current technology. When L7S2_max_sag to Sensor distance is greater than the upper limit of Equation 7, TTL becomes long, making it difficult to miniaturize the optical system.

That is, Equation 6 may set the minimum distance between the image sensor 300 and the last lens, and preferably satisfies: 2<L7S2_max_sag to Sensor<3. In addition, when there is no point where the last lens protrudes more toward the image sensor than the center of the sensor-side surface, the value of Equation 6 may be equal to a back focal length (BFL). BFL is the optical axis distance from the image sensor 300 to the center of the sensor-side surface of the last lens.

$$1 < CT1/CT7 < 3 \quad \text{[Equation 8]}$$

When Equation 8 is satisfied, aberration characteristics may be improved, and an effect on the reduction of the optical system may be set. Equation 8 may preferably satisfy: $0.5<CT1/CT7<2.5$, and the first embodiment may satisfy: $0.8\leq CT1/CT7\leq 1.2$. Equation 8 sets the difference between the center thicknesses of the first and seventh lenses, so that chromatic aberration of the optical system may be improved, and the total track length (TTL) may be controlled with good optical performance at the set angle of view.

$$0 < CT1/CT6 < 3 \quad \text{[Equation 9]}$$

In Equation 9, CT6 means the center thickness of the sixth lenses 106, 116, and 126. When the optical system satisfies Equation 9, the aberration characteristics are improved, and the influence of the reduction of the optical system may be set. Equation 9 may preferably satisfy: $0<CT1/CT6<2$. Equation 9 sets the difference between the center thicknesses of the first and sixth lenses, thereby improving the chromatic aberration of the optical system.

$$1 < CT45/CT6 < 5 \quad \text{[Equation 10]}$$

In Equation 10, CT45 is the center thickness of the fourth and fifth lenses, for example, the center thickness of the combined lens. That is, CT45 is the optical axis distance (mm) from the center of the object-side surface of the fourth lens 104, 114, and 124 to the center of the sensor-side surface of the fifth lens 105, 115, and 125. When the optical system satisfies Equation 10, the aberration characteristics may be improved by setting the thickness of the combined lens and the sixth lens 106, 116, and 126 adjacent thereto, preferably equation: $1<CT45/CT6<4$ or $2<CT45/CT6\leq 3.5$ may be satisfied. CT45 may be larger than each of the center thicknesses CT1-CT7 of the first to seventh lenses.

$$0 < L2R1/L4R2 < 1 \quad \text{[Equation 11]}$$

In Equation 11, L2R1 means the radius (mm) of curvature of the first surface S1 of the second lenses 102, 112, and 122, and L4R2 means the radius (mm) of curvature of the eighth surface S8 of the fourth lens 104, 114, and 124. When the optical system 1000 according to the embodiment satisfies Equation 11, the aberration characteristics of the optical system 1000 may be improved.

$$0 < CT45 - ET45 < 2 \quad \text{[Equation 12]}$$

In Equation 12, ET45 is the optical axis distance from the end of the effective region of the object-side surface of the fourth lens 104, 114, and 124 to the end of the effective region of the sensor-side surface of the fifth lens 105, 115, and 125. When the optical system satisfies Equation 12, the aberration characteristics may be improved by setting the center thickness and the edge thickness of the combined lens, and preferably, equation: $0.5<CT45/ET45<1.5$ may be satisfied. ET45 may be greater than the edge thickness ET1-ET7 of each of the first to seventh lenses.

$$0 < \text{CA\_L1S1/CA\_L3S1} < 2 \quad \text{[Equation 13]}$$

In Equation 13, CA_L1S1 means of the size (mm) of the effective diameter (CA: clear aperture) of the first surface S1 of the first lenses 101, 111, and 121, and CA_L3S1 means the size (mm) of the effective diameter (CA) of the fifth surface S5 of the third lenses 103, 113, and 123. When Equation 13 is satisfied, the optical system 1000 may control incident light and set factors affecting aberration, and preferably, equation: 0.5<CA_L1S1/CA_L3S1<1.5 may be satisfied.

$$0 < \text{CA\_L7S2/CA\_L4S2} < 2 \quad \text{[Equation 14]}$$

In Equation 14, CA_L4S2 means the size (mm) of the effective diameter (CA) of the eighth surface S8 of the fourth lens 104, 114, and 124, and CA_L7S2 means the size (mm) of the effective diameter (CA) of the fourteenth surface S14 of the seventh lens 107, 117, and 127. When Equation 14 is satisfied, the optical system 1000 may control an incident light path and set factors for performance change according to CRA and temperature. Preferably, Equation 14 may satisfy: 0.5<CA_L7S2/CA_L4S2<1.0.

$$0 < \text{CA\_L1S2/CA\_L2S1} < 1 \quad \text{[Equation 15]}$$

In Equation 15, CA_L1S2 means the size (mm) of the effective diameter (CA) of the second surface S2 of the first lens 101, 111, and 121, and CA_L2S1 means the size (mm) of the effective diameter (CA) of the third surface S3 of the second lens 102, 112, and 122. When the optical system 1000 according to the embodiment satisfies Equation 15, the optical system 1000 may control light traveling to the first lens group LG1 and the second lens group LG2, and reduce lens sensitivity, and may set a factor that affects a decrease in lens sensitivity. Equation 15 may preferably satisfy: $0.5<CA\_L1S2/CA\_L2S1<1.5$.

$$0.2 < CA\_L4S1/CA\_L5S2 < 1 \quad \text{[Equation 16]}$$

In Equation 16, CA_L4S1 means the size (mm) of the effective diameter (CA) of the seventh surface S7 of the fourth lens 104, 114, and 124, and CA_L5S2 means the size (mm) of the effective diameter (CA) of the tenth surface S10 of the fifth lens 105, 115, and 125. When the optical system 1000 according to the embodiment satisfies Equation 16, the size of the combined lens disposed on the object side of the plastic lens(s) may be set. Equation 16 may preferably satisfy: $1\leq CA\_L4S1/CA\_L5S2<1.8$.

$$0.1 < CA\_L4S1/CA\_L4S2 < 2.1 \quad \text{[Equation 17]}$$

In Equation 17, CA_L4S2 means the size (mm) of the effective diameter (CA) of the eighth surface S8 of the fourth lens 104, 114, and 124. When the optical system 1000 according to the embodiment satisfies Equation 17, the optical system 1000 may improve chromatic aberration and set the size between the object-side surface and the sensor-side surface of the object-side fourth lens in the combined lens. Accordingly, by setting the effective diameters of the fourth lens disposed closer to the object side than the plastic lens(s), it is possible to effectively guide the light incident through the combined lens to the plastic lens. Equation 17 may preferably satisfy: $1\leq CA\_L4S1/CA\_L4S2<2$. In detail, the following equation may be satisfied: $1.3<CA\_L4S1/CA\_L4S2\leq 1.6$. The size of the effective diameter is designed to gradually decrease from the fourth lens to the sixth lens made of plastic, so that light may be refracted and guided to the sixth lens having a relatively small effective diameter.

$$CA\_L4 > CA\_PL1 \quad \text{[Equation 17-1]}$$

In Equation 17-1, CA_L4 is a size of the effective diameter (average effective diameter) of the fourth lenses 104, 114, and 124, and CA_PL1 is a size of the effective diameter (average effective diameter) of the plastic lens closer to the object side than the image sensor when two plastic lenses are present.

$$1 < CA\_L5S1/CA\_L5S2 < 2 \quad \text{[Equation 18]}$$

In Equation 18, CA_L5S1 means the size (mm) of the effective diameter (CA) of the eighth surface S8 or the ninth surface of the fifth lens 105, 115, and 125, and CA_L5S2 means the size of the effective diameter of the tenth surface S10 of the fifth lens 105, 115, and 125. When the optical system 1000 according to the embodiment satisfies Equation 18, the optical system 1000 may improve chromatic aberration, and may be set the size between the object-side surface and the sensor-side surface of the fifth lens on the sensor side within the combined lens. Accordingly, the size of the effective diameter of the fifth lens closest to the object side than the plastic lens(s) may be set. Equation 18 may preferably satisfy: $1.1\leq CA\_L5S1/CA\_L5S2\leq 1.4$. When Equation 18 is satisfied, a lens having a maximum difference between an effective diameter on the object side and an effective diameter on the sensor side may be set as the fifth lens.

$$1.7 < CA\_L5S1 - CA\_L5S2 < 3 \quad \text{[Equation 18-1]}$$

In Equation 18-1, a difference between the effective diameters of the object-side surface L5S1 and the sensor-side surface L5S2 of the fifth lens may exceed 1.7, may be greater than difference (mm) of the effective diameters of the other lenses, and may be the maximum in the optical system. Accordingly, by maximizing a difference between the effective diameters of the object-side surface and the sensor-side surface of the fifth lens, which is the glass lens closest to the plastic lens, the light refracted through the fifth lens may travel into the effective region of the plastic lens.

$$CA\_L4 > CA\_L5 \quad \text{[Equation 18-2]}$$

$$CA\_L4S1 > (ImgH * 2) \quad \text{[Equation 18-3]}$$

$$CA\_L5S1 \geq (ImgH * 2) \quad \text{[Equation 18-4]}$$

In Equations 18-2 to 18-4, CA_L5 is the effective diameter (average effective diameter) of the fifth lenses 105, 115, and 125, and ImgH is ½ of the diagonal length of the image sensor 300. Accordingly, the effective diameter of the fifth lens 105, the effective diameter of the object-side surface of the fourth lens 104, 114, and 124, and the effective diameter of the object-side surface of the fifth lens 105, 115, and 125 are set as a region of the image sensor 300 to set the light path.

In the embodiment, since the fifth lens is disposed on the object side rather than the plastic lens and is closest to the plastic lens among the glass lenses, the effective diameter ratio between the object-side surface and the sensor-side surface of the fifth lens may satisfy Equation 18 or 18-1. Alternatively, when the plastic lens closest to the object side is disposed at the n−3th, n−4th, or n−5th position (n=6 to 8), the effective diameter ratio of the object side (PL-1_S1) and the sensor side (PL-1_S2) of the glass lens closest to the plastic lens while being disposed on the object side of the n−3rd, n−4th, or n−5th plastic lens may satisfy: $1<CA\_PL\text{-}1\_S1/CA\_PL\text{-}1\_S2<2$ or may be satisfy a difference (mm): $1.7<CA\_PL\text{-}1\_S1-CA\_PL\text{-}1\_S2<3$. Equation 18 may further satisfy Equation 18-5.

$$1.1 \leq Last\_GL\_CAS1/Last\_GL\_CAS2 \leq 1.4 \quad \text{[Equation 18-5]}$$

In Equation 18-5, Last_GL_CAS1 means an effective diameter CAS1 of the object-side surface of the last glass lens GL in the optical system, and Last_GL_CAS2 means an effective diameter CAS2 of the sensor-side surface of the last glass lens GL in the optical system.

$$0.2<CA\_GL\_AVER/CA\_PL\_AVER<2.2 \quad \text{[Equation 19]}$$

In Equation 19, CA_GL_AVER means the average effective diameter of the object-side and sensor-side surfaces of each glass lens, and CA_PL_AVER means the average effective diameter of the object-side and sensor-side surfaces of each plastic lens. In Equation 19, by setting the effective diameter of the glass lens disposed on the object side rather than the plastic lens and the effective diameter of the plastic lens, the path of the incident light may be effectively guided. Equation 19 may preferably satisfy: 1.1<CA_GL_AVER/CA_PL_AVER<1.5. Here, nGL>nPL may be satisfied. nGL is the number of lenses made of glass, and nPL is the number of plastic lenses.

$$1.20 \leq GL\_CA1\_AVER/PL\_CA1\_AVER \leq 1.6 \quad \text{[Equation 20]}$$

In Equation 20, GL_CA1_AVER is the average of the effective diameters of the object-side surfaces of the lenses made of glass, for example, the average of the effective diameters of the object-side surfaces of the first to fifth lenses. PL_CA1_AVER is the average of the effective diameters of the object-side surfaces of the plastic lenses, for example, the average of the effective diameters of the object-side surfaces of the sixth and seventh lenses. Since the effective diameter of the plastic lens is designed to be relatively small compared to the glass lens, Equation 20 may be satisfied. In this case, the sensor-side surface of the lens closest to the plastic lens, that is, the fifth lens, is designed to have a small effective diameter and a small radius of curvature, so that light may be guided to an effective region of the plastic lens having a relatively small effective diameter. Accordingly, when excluding the sensor-side effective diameter of the fifth lens, Equation 20 may design a design in which the average of the object-side surfaces of the glass material is greater than the effective diameter of the object-side surface of the plastic lens. Equation 20 may preferably satisfy: 1.20<GL_CA1_AVER/PL_CA1_AVER≤1.55.

$$CA\_L6 \text{ or } CA\_L7 < CA\_L5 \quad \text{[Equation 21]}$$

In Equation 21, CA_L6 is the effective diameter of the sixth lens 106, 116, and 126, CA_L7 is the effective diameter of the seventh lens 107, 117, and 127, and CA_L5 is the effective diameter of the object-side surface of the fifth lens. When Equation 20 is satisfied, the optical system sets the size of the effective diameter of the plastic lens disposed between the fifth lenses 105, 115, and 125 and the image sensor 300 to be smaller than the effective diameter of the fifth lenses 105, 115, and 125, so that light may be guided to the center and periphery portions of the image sensor 300, and color aberration may be improved.

$$CG4 < CG3 < CG5 \quad \text{[Equation 22]}$$

In Equation 22, CG3 may be the center distance between the third and fourth lenses, and CG5 may be the center distance between the fifth and sixth lenses. When Equation 22 is satisfied, a center distances from the fourth lens to the sixth lens may be set, thereby reducing the center distances and improving the optical performance of the periphery portion of the FOV.

$$G4 < 0.01 \quad \text{[Equation 22-1]}$$

In Equation 22-1, G4 may set the distance between the fourth lenses 104, 114, and 124 and the fifth lenses 105, 115, and 125, and may be a distance on an optical axis or/and an edge distance. When Equation 22-1 is satisfied, the fourth and fifth lenses may be set as a combined lens. Here, preferably, it may satisfy: CT45=CT4+CT5+CG4, and the center thicknesses CT4 and CT5 of the fourth and fifth lenses and the center distances CG4 between the fourth and fifth lenses may be set.

$$1 < CT7/CG6 < 3 \quad \text{[Equation 23]}$$

In Equation 23, CG6 is the center distance or optical axis distance between the sensor-side surface of the sixth lens 106, 116, and 126 and the object-side surface of the seventh lens 107, 117, and 127. In Equation 23, by setting the center thickness CT7 of the seventh lenses 107, 117, and 127 and the center distance between the sixth and seventh lenses, optical performance may be improved at the periphery portion of the FOV. Equation 23 may preferably satisfy: 1.5<CT7/CG6<2.7.

$$(CG5 + CG6) < CT4 < 2(CG5 + CG6) \quad \text{[Equation 24]}$$

In Equation 24, CT4 is the center thickness of the fourth lenses 104, 114, and 124. Since the center thickness of the fourth lens is greater than the sum of the center distance CG5 of the fifth and sixth lenses and the center distance CG6 of the sixth and seventh lenses, resolution and chromatic aberration may be improved, and the center distance may reduce them.

$$(CG2 + CG5) < CT2 < 2(CG2 + CG5) \quad \text{[Equation 25]}$$

In Equation 25, CT2 is the center thickness of the second lenses 102, 112, and 122, and CG2 is the center distance or optical axis distance between the second and third lenses. Since the center thickness of the second lens is greater than the sum of the center distance CG2 of the second and third lenses and the center distance CG5 of the fifth and sixth lenses, chromatic aberration may be improved and the center distances may be reduced.

$$1 < CT2/CT1 < 4 \quad \text{[Equation 26]}$$

In Equation 26, by setting the center thickness CT2 of the second lens to be thicker than the center thickness of the first lens, it is possible to control factors affecting aberration. Preferably, Equation 26 may satisfy: 1.4<CT2/CT1<3.

$$1 < |L7R1/CT7| < 100 \quad \text{[Equation 27]}$$

In Equation 27, L7R1 means the radius of curvature of the thirteenth surface of the seventh lens. The refractive power of the seventh lens may be controlled by setting the radius of curvature of the object-side surface of the seventh lens and the center thickness of the seventh lens in Equation 27. Accordingly, good optical performance may be obtained at the center and the periphery portions of the FOV. Preferably, Equation 27 may satisfy 1<L7R1/CT7<50.

$$0 < |L5R2/L7R1| < 10 \quad \text{[Equation 28]}$$

In Equation 28, L5R2 means the radius of curvature of the tenth surface of the fifth lens. In Equation 28, the radius of curvature of the sensor-side surface of the fifth lens and the radius of curvature of the object-side surface of the seventh lens may be set to control the refractive power of the fifth and seventh lenses. Accordingly, good optical performance may be obtained at the center and the periphery portion of the FOV. Preferably, Equation 28 may satisfy: 0<L5R2/L7R1<1.

$$L4R1 * L5R2 > 0 \quad \text{[Equation 29]}$$

In Equation 29, L4R1 is the radius of curvature of the object-side surface of the fourth lens, and L5R2 is the radius of curvature of the sensor-side surface of the fifth lens. When Equation 29 is satisfied, the optical path incident to the plastic lens may be controlled by controlling the refractive power of the combined lens. Equation 29 may satisfy: 20<L4R1*L5R2<100.

$$1 < L6R1/L5R2 < 10 \quad \text{[Equation 30]}$$

In Equation 30, L6R1 means the radius of curvature of the object-side surface of the sixth lens. By setting the curvature radii of the sensor-side surface of the fifth lens and the sensor-side surface of the sixth lens in Equation 30, light may be effectively refracted from the combined lens toward the plastic lens. Equation 30 may preferably satisfy: 1<L6R1/L5R2<6.

$$|LR|\_\text{Min} < \text{PL1\_R1} \quad \text{[Equation 30-1]}$$

Here, |LR|_Min means the minimum radius of curvature among all lenses, and PL1_R1 means the radius of curvature of the object-side surface of the plastic lens closest to the object-side. When Equation 30-1 is satisfied, the plastic lens may be disposed closer to the sensor than the sensor-side surface of the glass lens having the minimum radius of curvature, so that light may be refracted to the incident surface of the plastic lens.

$$0 < |L6R2/L6R1| < 100 \quad \text{[Equation 31]}$$

In Equation 31, L6R2 means the radius of curvature of the sensor-side surface of the sixth lens. By setting the radii of curvature of the object-side surface and the sensor-side surface of the sixth lens in Equation 31, the plastic lens may effectively refract the incident light toward the image sensor. Equation 31 may preferably satisfy: 0<|L6R2/L6R1|<50.

$$0 < \text{CT\_Max/CG\_Max} < 5 \quad \text{[Equation 32]}$$

In Equation 32, the maximum center thickness CT_Max of lenses and the maximum distance CT_Max between adjacent lenses may be set. When Equation 32 is satisfied, the optical system may have good optical performance at the focal length and the set FOV and may reduce the TTL. Preferably, it may satisfy: 1<CT_Max/CG_Max<3.

$$1 < \Sigma CT/\Sigma CG < 5 \quad \text{[Equation 33]}$$

In Equation 33, ΣCT is the sum of the center thicknesses of the lenses, and ΣCG is the sum of the distances between adjacent lenses. When Equation 33 is satisfied, the optical system may have good optical performance at the focal length and the set FOV and may reduce the TTL. Preferably, it may satisfy: 2<ΣCT/ΣCG<4.5.

$$10 < \Sigma\text{Index} < 30 \quad \text{[Equation 34]}$$

>Index means the sum of the refractive indices at the d-line of each of a plurality of lenses. When Equation 34 is satisfied, TTL may be controlled in the optical system 1000 in which a plastic lens and a glass lens are mixed, and improved resolving power may be obtained. In addition, when the number of lenses made of glass is greater than the number of lenses made of plastic, or when the number of lenses made of glass is relatively thick, the sum of the TTL and the refractive index may be set. Equation 34 may preferably satisfy: 10<ΣIndex<20.

$$10 < \Sigma Abb/\Sigma\text{Index} < 50 \quad \text{[Equation 35]}$$

ΣAbbe means the sum of Abbe numbers of each of the plurality of lenses. When Equation 31 is satisfied, the optical system 1000 may have improved aberration characteristics and resolution. By setting Equation 35 to the sum of the Abbe numbers and the sum of the refractive index of the lenses, the optical characteristics may be controlled, and it may preferably satisfy: 10<ΣAbb/ΣIndex<40.

$$\text{Distortion} < 2 \quad \text{[Equation 36]}$$

Distortion means a maximum value of distortion or an absolute value of the maximum value in a region from the center 0.0F to the diagonal end 1.0F based on optical characteristics detected by the image sensor 300. When the optical system 1000 satisfies Equation 32, the optical system 1000 may improve distortion characteristics and set conditions for image processing. Preferably, it may satisfy: Distortion≤1.5.

$$0 < \Sigma CT/\Sigma ET < 2 \quad \text{[Equation 37]}$$

ECT is the sum of the center thicknesses of the lenses, and ΣET is the sum of edge thicknesses of the effective regions of the lenses. When Equation 37 is satisfied, the optical system may have good optical performance at the focal length and the set FOV and may reduce the TTL. Equation 37 may preferably satisfy: 0.5<ΣCT/ΣET<1.5.

$$0.5 < \text{CA\_L2S1}/\text{CA\_min} < 2 \quad \text{[Equation 38]}$$

CA_L2S1 is the effective diameter of the third object-side surface S3 of the second lens, and CA Min means the minimum effective diameter among the object-side surfaces and sensor-side surfaces of the lenses. When Equation 38 is satisfied, the optical system may provide a slimmer module while maintaining incident light control and optical performance. Equation 38 may preferably satisfy: 1<CA_L2S1/CA min<2.

$$1 < \text{CA\_max}/\text{CA\_min} < 5 \quad \text{[Equation 39]}$$

CA_max means the maximum effective diameter among the object-side surfaces and the sensor-side surfaces of the lenses. When Equation 39 is satisfied, the size of the optical system may be set for a slim and compact structure while maintaining optical performance. Equation 39 may preferably satisfy: 1<CA_max/CA min<4.

$$1 < \text{CA\_max}/\text{CA\_Aver} < 3 \quad \text{[Equation 40]}$$

CA_Aver means the average of the effective diameters of the object-side surfaces and the sensor-side surfaces of the lenses. When Equation 40 is satisfied, the size of the optical system may be set for a slim and compact structure while maintaining optical performance. Equation 40 may preferably satisfy: 1<CA_max/CA_Aver<1.5.

$$0.5 < \text{CA\_min}/\text{CA\_Aver} < 2 \quad \text{[Equation 41]}$$

When Equation 41 is satisfied, the size of the optical system may be set for a slim and compact structure while maintaining optical performance. Equation 41 may preferably satisfy: 0.5<CA min/CA_Aver<1.

$$1 < \text{CA\_max}/(2 * ImgH) < 3 \quad \text{[Equation 42]}$$

Equation 42 may be set to the maximum effective diameter CA_Max and the length (2*ImgH) of the image sensor, and when this is satisfied, the optical system may maintain good optical performance and set the size for a slim and compact structure. Equation 42 may preferably satisfy: 1<CA_max/(2*ImgH)<2.

$$1 < TD/\text{CA\_max} < 4 \quad \text{[Equation 43]}$$

TD is the optical axis distance from the center of the object-side surface of the first lens to the center of the sensor-side surface of the last lens. When Equation 43 is satisfied, it is possible to set the total optical axis distance and the maximum effective diameter of the lenses, so that the size for good optical performance may be set. Equation 43 may preferably satisfy: 1.5<TD/CA_max<3.

$$TD > SD \quad \text{[Equation 43-1]}$$

The SD is the distance from the position of the aperture stop to the center of the sensor-side surface of the last lens.

$$1 < F/\text{CA\_L6S1} < 10 \quad \text{[Equation 44]}$$

In Equation 44, F means the effective focal length of the optical system, and by setting the relationship between the effective focal length and the effective diameter of the object-side surface of the plastic lens, the effect on optical system reduction, for example, TTL, may be adjusted. Equation 44 may preferably satisfy: 1<F/CA_L6S1<5.

$$0 < F/L1R1 < 1 \quad \text{[Equation 45]}$$

In Equation 45, by setting the effective focal length of the optical system and the radius of curvature of the object-side surface of the first lens, the effect on the incident light and TTL may be adjusted. Equation 45 may preferably satisfy: 0.2≤F/L1R1≤0.8.

$$\text{MAX}(CT/ET) < 3 \quad \text{[Equation 46]}$$

In Equation 46, MAX (CT/ET) may set a value at which the ratio of the center thickness CT to the edge thickness ET of each lens is the maximum. When Equation 46 is satisfied, the optical system may adjust the effect on the effective focal length. Equation 46 may preferably satisfy: 0<MAX (CT/ET)≤2.

$$0 < EPD/L1R1 < 1 \quad \text{[Equation 47]}$$

EPD means the size (mm) of the entrance pupil of the optical system 1000, and L1R1 means the radius (mm) of curvature of the first surface S1 of the first lens. When the optical system 1000 according to the embodiment satisfies Equation 47, the optical system 1000 may control incident light. Equation 47 may preferably satisfy: 0<EPD/LIR1<0.5.

$$-3 < F1/F3 < 0 \quad \text{[Equation 48]}$$

F1 is the focal length of the first lens, and F3 is the focal length of the third lens. When Equation 48 is satisfied, the resolving power may be improved by controlling the refractive power of the first and third lenses, and the TTL and the effective focal length EFL may be affected.

$$|F5| < F4 \quad \text{[Equation 48-1]}$$

$$|F5| < F6 \quad \text{[Equation 48-2]}$$

$$|F5| < F7 \quad \text{[Equation 48-3]}$$

In Equations 48-1 to 48-3, F5 is the focal length of the fifth lens, F4 is the focal length of the fourth lens, F6 is the focal length of the sixth lens, and F7 is the focal length of the seventh lens. Accordingly, an absolute value of a focal length of the fifth lens closest to the plastic lens may be smaller than that of the fourth lens and smaller than that of the sixth and seventh lenses. Accordingly, by controlling the refractive power of the last glass lens, it is possible to effectively guide the plastic lens.

$$Po4 * Po5 < 0 \quad \text{[Equation 49]}$$

Po4 is the refractive power value of the fourth lens, and Po5 is the refractive power value of the fifth lens. That is, since the refractive powers of the fourth and fifth lenses are opposite to each other, aberration may be improved and light may be effectively guided to the plastic lens. When the value of equation: Po4*Po5 is greater than 0, the effect of chromatic aberration improvement is not greatly shown as a combined lens.

$$Po1(Po4 * Po5) > 0 \quad \text{[Equation 49-1]}$$

$$F45 > 0 \quad \text{[Equation 49-2]}$$

$$F4 * F5 < 0 \quad \text{[Equation 49-3]}$$

Pol is the refractive power of the first lens, F45 is the composite focal length of the fourth and fifth lenses, F4 is the focal length of the fourth lens, and F5 is the focal length of the fifth lens. When Equations 49-1 to 49-3 are satisfied, it is easy to improve the aberration of the optical system with the fourth lens and the fifth lens, which are combined lens, and may effectively guide incident light to the plastic lens.

$$15 < |v4 - v5| < 50 \quad \text{[Equation 50]}$$

In Equation 50, v4 is the Abbe number of the fourth lens, and v5 is the Abbe number of the fifth lens. When Equation 50 is satisfied, a difference in Abbe numbers between at least two lenses constituting a combined lens may be maintained at a predetermined value or more, and chromatic aberration may be improved. Equation 50 may preferably satisfy: $20 \le v4 - v5 \le 40$. When the combined lens is less than the lower limit of Equation 50, it may be insignificant in improving the aberration characteristics of the optical system. Accordingly, when the difference in Abbe number between the object-side lens and the sensor-side lens in the combined lens is 20 or more and 40 or less, aberration characteristics may be improved.

$$0 < |F1|/F < 10 \quad \text{[Equation 51]}$$

Equation 51 sets the relationship between the focal length F1 of the first lens and the effective focal length F, so that the TTL of the optical system may be set. Equation 51 may preferably satisfy: $1 < |F1|/F < 5$.

$$0 < |F5/F6| < 1 \quad \text{[Equation 52]}$$

In Equation 52, by setting the relationship between the focal lengths F5 and F6 of the fifth and sixth lenses, the refractive power and light path of the last glass lens and the first plastic lens adjacent thereto may be adjusted, and resolution may be improved. Equation 52 may preferably satisfy $0 < |F5/F6| < 0.5$.

$$0 < |F5/F7| < 1 \quad \text{[Equation 53]}$$

In Equation 53, by setting the relationship between the focal lengths F5 and F7 of the fifth and seventh lenses, the refractive power and light path of the last glass lens and the last plastic lens may be adjusted, and resolution may be improved. Equation 53 may preferably satisfy: $0 < |F5/F7| < 0.6$.

$$0 < |F6/F1| < 1.2 \quad \text{[Equation 54]}$$

In Equation 54, by setting the relationship between the focal lengths F1 and F6 of the first and sixth lenses, the refractive power and light path of the first glass lens and the first plastic lens may be adjusted, and the effect of TTL is adjusted and the resolution is improved. Equation 54 may preferably satisfy: $0.5 < |F6/F1| < 1$.

$$0 < |F27|/F < 2 \quad \text{[Equation 55]}$$

In Equation 55, by setting the relationship between the composite focal length F27 and the effective focal length F of the second to seventh lenses, the refractive power of the second to seventh lenses may be controlled to improve resolution, and the optical system may be provided in a slim and compact size. Equation 55 may preferably satisfy: $0.5 < |F27/F| < 1.5$.

$$0 < |F27 < F6| < 1 \quad \text{[Equation 56]}$$

In Equation 56, the relationship between the composite focal length F27 of the second to seventh lenses and the focal length F6 of the sixth lens is set, and the composite refractive power of the second to seventh lenses and the refractive power of the plastic lens are adjusted. Resolution may be improved, and an optical system may be provided in a slim and compact size. Equation 56 may preferably satisfy: 0<|F27<F6|<0.8.

$$0 < |F27 < F7| < 1 \quad \text{[Equation 57]}$$

In Equation 57, the relationship between the composite focal length F27 of the second to seventh lenses and the focal length F7 of the seventh lens is set, and the refractive power of the second to seventh lenses and the refractive power of the last plastic lens are adjusted. Resolution may be improved, and an optical system may be provided in a slim and compact size. Equation 57 may preferably satisfy: 0<|F27<F7|<0.5.

$$0 < F6/F < 5 \quad \text{[Equation 58]}$$

By setting the relationship between the focal length F6 and the effective focal length F of the sixth lens in Equation 58, the resolving power may be improved by adjusting the refractive power of the first plastic lens and the total focal length, and the optical system may be provided in a slim and compact size. Equation 58 may preferably satisfy: 0<F6/F<4.

$$F\_LG1/F\_LG2 < 0 \quad \text{[Equation 59]}$$

In Equation 59, a relationship between the focal length F_LG1 of the first lens group LG1 and the focal length of the second lens group F_LG2 may be set. The focal length of the first lens group may have a negative value, and the focal length of the second lens group may have a positive value. When Equation 59 is satisfied, the optical system 1000 may improve aberration characteristics such as chromatic aberration and distortion aberration. Equation 59 may preferably satisfy: 2<|F_LG1/F_LG2|<5.

$$1 < nGL/nPL < 4 \quad \text{[Equation 60]}$$

In Equation 60, nGL is the number of lenses made of glass, and nPL is the number of plastic lenses. In Equation 60, by arranging the number of plastic lenses to exceed 1 time the number of glass lenses, the thickness of the optical system may be reduced and more diverse refractive power may be provided through the aspheric surface. Equation 60 may preferably satisfy: 1<GL_Ln/PL_Ln<3.

$$CA\_L2 < CA\_L3 > CA\_L4 \quad \text{[Equation 61]}$$

In Equation 61, it is possible to set a size relationship between the average effective diameters CA_L2, CA_L3, and CA_L4 of the object-side surface and the sensor-side surface of the second, third, and fourth lenses. When Equation 61 is satisfied, the first and second lens groups may be set, and aberration may be improved through the first lens of the second lens group LG2. CA_L3 may have the maximum effective diameter in the optical system.

$$0 < \sum PL\_CT / \sum GL\_CT < 1 \quad \text{[Equation 62]}$$

In Equation 62, ΣPL_CT is the sum of the center thicknesses of the plastic lens(s), and ΣGL_CT is the sum of the center thicknesses of the glass lenses. When Equation 62 is satisfied, the overall TTL may be controlled by setting a relationship between the thickness of the plastic lens and the thickness of the glass lens with respect to TTL. Equation 62 may preferably satisfy: 0<ΣPL_CT/ΣGL_CT<0.5.

$$0 < \sum PL\_Index \sum GL\_Index < 1 \quad \text{[Equation 63]}$$

In Equation 63, ΣPL_Index is the sum of the refractive index thicknesses of the plastic lens(s) on the d-line, and ΣGL_Index is the sum of the refractive indices of the glass lenses on the d-line. When Equation 63 is satisfied, the overall resolving power may be controlled by setting the relationship between the refractive indices of the plastic lens and the glass lens. Equation 63 may preferably satisfy: 0<ΣPL_Index/ΣGL_Index<0.5.

$$10 < TTL < 40 \quad \text{[Equation 64]}$$

TTL means a distance (mm) along an optical axis OA from the center of the first surface S1 of the first lens to the upper surface of the image sensor 300. In Equation 64, the TTL may exceed 10 or 20 to provide an optical system for a vehicle. Equation 64 may preferably satisfy: 22<TTL≤38 or TD<TTL.

$$2 < ImgH \quad \text{[Equation 65]}$$

Equation 65 may set the diagonal size (2*ImgH) of the image sensor 300, and may provide an optical system having a sensor size for a vehicle. Equation 65 may preferably satisfy: 4≤ImgH.

$$2 < BFL < 3.5 \quad \text{[Equation 66]}$$

In Equation 66, the back focal length BFL is set to greater than 2 mm and less than 3.5 mm to secure installation space for the filter 500 and the cover glass 400, and the distance between the image sensor 300 and the last lens Through this, it is possible to improve the assemblability of the components and improve the coupling reliability. Equation 66 may preferably satisfy: 2.5≤BFL≤3. When the BFL is less than the range of Equation 68, some light traveling to the image sensor may not be transmitted to the image sensor, which may cause resolution degradation. When the BFL exceeds the range of Equation 68, unnecessary light is introduced, and aberration characteristics of the optical system may be deteriorated.

$$1 < BFL / CG5 < 2 \quad \text{[Equation 67]}$$

In Equation 67, the BFL is set to be larger than the distance between the lenses, for example, the center distance CG5 between the fifth and sixth lenses, thereby securing the installation space for the filter 500 and the cover glass 400. And, through the distance between the image sensor 300 and the last lens, it is possible to improve the assemblability of the components and improve the coupling reliability. Equation 67 may satisfy: 1.1≤BFL/CG5≤1.5.

$$CG2, CG3, CG5, CG6 < BFL \quad \text{[Equation 68]}$$

In Equation 68, BFL is set to be greater than the center distances between lenses, for example, the center distance CG2 between second and third lenses, the center distance CG3 between third and fourth lenses, the center distance CG5 between fifth and sixth lenses, the center distance CG6 between the sixth and seventh lenses, thereby increasing the installation space of filter 500 and cover glass 400, and it is possible to improve assembly of the components and improve coupling reliability through the distance between the image sensor 300 and the last lens. In addition, the seventh lens, which is the last lens, may disperse the incident light into the effective region of the image sensor, but when the BFL does not satisfy Equation 68, some of the emitted light may not be transmitted to the effective region of the image sensor and thus the resolution may be reduced. Here, CG3 may be an optical axis distance between a lens disposed on the object side and a combined lens rather than a combined lens, and may be smaller than BFL.

$$3 < F < 40 \quad \text{[Equation 69]}$$

Equation 69 may set the total focal length F to suit the vehicle optical system. Equation 69 may satisfy: 5<F<30.

$$FOV < 45 \quad \text{[Equation 70]}$$

In Equation 70, FOV (field of view) means a degree of view of the optical system 1000, and a vehicle optical system of less than 45 degrees may be provided. The FOV may preferably satisfy: 20≤FOV≤40.

$$1 < TTL/\text{CA\_max} < 5 \quad \text{[Equation 71]}$$

In Equation 71, CA_max means the largest effective diameter (mm) among the object-side and sensor-side surfaces of the plurality of lenses, and TTL means a distance from the vertex of the first surface S1 of the first lens to the upper surface of the image sensor 300 on the optical axis OA. Equation 71 sets the relationship between the total optical axis length and the maximum effective diameter of the optical system, thereby providing an improved optical system for a vehicle. Equation 71 may preferably satisfy: 1.5<TTL/CA_max≤4.

$$2 < TTL/IMgH < 10 \quad \text{[Equation 72]}$$

Equation 72 may set the TTL of the optical system and the diagonal length (ImgH) of the optical axis of the image sensor 300. When the optical system 1000 according to the embodiment satisfies Equation 72, the optical system 1000 may have a TTL for application of the image sensor 300 for a vehicle, thereby providing more improved image quality. Equation 72 may preferably satisfy: 4<TTL/ImgH<8.4.

$$0.1 < BFL/ImgH < 1 \quad \text{[Equation 73]}$$

Equation 73 may set the distance between the optical axis between the image sensor 300 and the last lens and the length in the diagonal direction from the optical axis of the image sensor 300. When the optical system 1000 according to the embodiment satisfies Equation 73, the optical system 1000 may secure a BFL (Back focal length) for applying the size of the vehicle image sensor 300, set the distance between the last lens and image sensors 300, and have good optical characteristics at the center and the periphery portions of the FOV. Equation 73 may preferably satisfy: 0.3<BFL/ImgH<0.8.

$$5 < TTL/BFL < 20 \quad \text{[Equation 74]}$$

Equation 74 may set (unit, mm) the TTL of the optical system and the optical axis distance (BFL) between the image sensor 300 and the last lens. When the optical system 1000 according to the embodiment satisfies Equation 55, the optical system 1000 may secure BFL. Equation 74 may preferably satisfy: 5<TTL/BFL<16.

$$1 < TTL/F < 3 \quad \text{[Equation 75]}$$

Equation 75 may set the total focal length (F) and TTL of the optical system 1000. Accordingly, an optical system for ADAS may be provided. Equation 75 may preferably satisfy at least one of equations: 1.8<TTL/F≤2.3, 1.5≤TTL/F≤2.8, 1.5≤TTL/F≤3, 1.9≤TTL/F≤2.1, or 1.8≤TTL/F≤2.5. When the optical system 1000 according to the embodiment satisfies Equation 75, the optical system 1000 may have an appropriate focal length in the set TTL range, and provides the optical system that may form an image while maintaining the appropriate focal length even when the temperature changes from low temperature to high temperature.

$$3 < F/BFL < 10 \quad \text{[Equation 76]}$$

Equation 76 may set the total focal length (F) of the optical system 1000 and the optical axis distance (BFL) between the image sensor 300 and the last lens. When the optical system 1000 according to the embodiment satisfies Equation 76, the optical system 1000 may have a set FOV and an appropriate focal length, and may provide an optical system for a vehicle. In addition, the optical system 1000 may minimize the distance between the last lens and the image sensor 300, so that it may have good optical characteristics in the periphery portion of the FOV. Equation 76 may preferably satisfy: 3<F/BFL<8.

$$1 < F / ImgH < 5 \quad \text{[Equation 77]}$$

Equation 77 may set the total focal length (F, mm) of the optical system 1000 and the diagonal length (ImgH) in the optical axis of the image sensor 300. The optical system 1000 may have improved aberration characteristics in the size of the vehicle image sensor 300. Equation 77 may preferably satisfy: 2<F/ImgH<4.1.

$$1 < F / EPD < 5 \quad \text{[Equation 78]}$$

Equation 78 may set the total focal length (F, mm) of the optical system 1000 and the entrance pupil size. Accordingly, the overall brightness of the optical system may be controlled. Equation 78 may preferably set: 1<F/EPD<3.

$$0 < BFL / TD < 0.3 \quad \text{[Equation 79]}$$

Equation 79 may set a relationship between the optical axis distance (TD) of the lenses of the optical system 1000 and the BFL. Accordingly, it is possible to control the overall size while maintaining the resolving power of the optical system. Equation 79 may preferably satisfy: 0<BFL/TD<0.2. When BFL/TD is 0.2 or more, the size of the entire optical system becomes large because the BFL is designed to be large compared to the TD. An unnecessary amount of light may be increased between the lens and the image sensor, and as a result, there is a problem in that resolution is lowered, such as deterioration in aberration characteristics.

$$0 < EPD / ImgH / FOV < 0.2 \quad \text{[Equation 80]}$$

Equation 80 may establish a relationship between the entrance pupil size (EPD), the length (ImgH) of ½ of the maximum diagonal length of the image sensor, and the FOV. Accordingly, the overall size and brightness of the optical system may be controlled. Equation 80 may preferably satisfy: 0<EPD/ImgH/FOV<0.1.

$$5 < FOV / F\# < 40 \quad \text{[Equation 81]}$$

Equation 81 may establish a relationship between the FOV of the optical system and the F number. Equation 81 may preferably satisfy: 10<FOV/F #<30.

$$1 < \sum \text{GL\_CT} / F\# < 20 \quad \text{[Equation 82]}$$

Equation 82 may establish a relationship between the sum of the center thicknesses of the glass lenses of the optical system and the F number (F #). Equation 82 may preferably satisfy: 1<ΣGL_CT/F #<10.

$$1 < \sum \text{PL\_CT} / F\# < 20 \quad \text{[Equation 83]}$$

Equation 83 may establish a relationship between the sum of the center thicknesses of the plastic lenses of the optical system and the F number (F #). Equation 83 may preferably satisfy: 1<ΣPL_CT/F #<10.

$$1 < \sum \text{GL\_Index} / F\# < 20 \quad \text{[Equation 84]}$$

Equation 84 may establish a relationship between the sum of the refractive indices of the glass lenses of the optical system and the F number (F #). Equation 84 may preferably satisfy: 1<GL_Index/F #<20. Equation 84 may preferably satisfy: 1<ΣGL_Index/F #<10.

$$1 < \sum \text{PL\_Index} / F\# < 10 \quad \text{[Equation 85]}$$

Equation 85 may establish a relationship between the sum of the refractive indices of the plastic lenses of the optical system and the F number (F #). Equation 85 may preferably satisfy: 1<ΣPL_Index/F #<5.

$$0 < |\text{L1S1\_sag\_max}| < 0.5 \quad \text{[Equation 86]}$$

In Equation 86, L1S1_sag_max means the distance from the maximally spaced lens surface in a straight line orthogonal to the center of the object-side first surface S1 of the first lens. When Equation 86 is satisfied, a maximum separation point for a straight line orthogonal to the curvature and center of the first surface S1 may be set. Equation 86 may preferably satisfy: 0.15<|L1S1_sag_max|<0.3.

$$0 < |\text{L1S2\_sag\_max}| < 1.5 \quad \text{[Equation 87]}$$

In Equation 87, L1S2_sag_max means the distance from the maximally spaced lens surface in a straight line orthogonal to the center of the object-side second surface S2 of the first lens. When Equation 87 is satisfied, a maximum separation point for a straight line orthogonal to the curvature and center of the second surface S2 may be set. Equation 87 may preferably satisfy: 0.65<|L1S2_sag_max|<1.3.

$$0 < |\text{L2S2\_sag\_max}| < 2 \quad \text{[Equation 88]}$$

In Equation 88, L2S2_sag_max represents the distance from the maximally spaced lens surface in a straight line orthogonal to the center of the object-side fourth surface S4 of the second lens. When Equation 86 is satisfied, a maximum separation point for a straight line orthogonal to the curvature and center of the fourth surface S4 may be set. Equation 88 may preferably satisfy: 0.8<|L2S2_sag_max|<1.5.

$$0 < |\text{L3S1\_sag\_max}| < 2 \quad \text{[Equation 89]}$$

In Equation 89, L3S1_sag_max means the distance from the lens surface maximally spaced in a straight line orthogonal to the center of the object-side fifth surface S5 of the third lens. When Equation 89 is satisfied, a maximum separation point for a straight line orthogonal to the curvature and center of the fifth surface S5 may be set. Equation 89 may preferably satisfy: 0.6<|L3S1_sag_max|<1.5.

$$1 < |L4S1\_sag\_max| < 3 \quad \text{[Equation 90]}$$

In Equation 90, L4S1_sag_max means the distance from the maximally spaced lens surface in a straight line orthogonal to the center of the seventh object-side surface S7 of the fourth lens. When Equation 90 is satisfied, a maximum separation point for a straight line orthogonal to the curvature and center of the seventh surface S7 may be set. Equation 88 may preferably satisfy: 1.5<|L4S1_sag_max|<2.0.

$$1 < |L5S2\_sag\_max| < 3 \quad \text{[Equation 91]}$$

In Equation 91, L5S2_sag_max means the distance from the lens surface maximally spaced in a straight line orthogonal to the center of the object-side tenth surface S10 of the fifth lens. When Equation 91 is satisfied, a maximum separation point for a straight line orthogonal to the curvature and center of the tenth surface S10 may be set. Equation 91 may preferably satisfy: 1.2<|L5S2_sag_max|<2.0.

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 92]}$$

In Equation 92, Z is Sag, and may mean a distance in the optical axis direction from an arbitrary position on the aspherical surface to the apex of the aspheric surface. Y may mean a distance in a direction perpendicular to the optical axis from an arbitrary position on the aspheric surface to the optical axis. c may mean the curvature of the lens, and K may mean the conic constant. Also, A, B, C, D, E, and F may mean aspheric constants.

The optical system 1000 according to the first and second embodiments may satisfy at least one or two or more of Equations 1 to 50. At least one or two or more of Equations 1 to 50 may satisfy at least one or two or more of Equations 51 to 91. In this case, the optical system 1000 may have improved optical characteristics. In detail, when the optical system 1000 satisfies at least one of Equations 1 to 50 and/or at least one of Equations 51 to 91, the optical system 1000 has improved resolution and may improve aberration and distortion characteristics. In addition, the optical system 1000 may secure a BFL (Back focal length) for applying the image sensor 300 for the vehicle, may compensate for the degradation of optical characteristics due to temperature change, and may be minimized a distance between the last lens and image sensor 300, so good optical performance may be obtained at the center and the periphery portions of the FOV.

Table 4 shows the items of the equations described above in the optical system 1000 of the first and third embodiments, and relates to TTL (Total track length) (mm), BFL (Back focal length), effective focus length (F) (mm), ImgH (mm), effective diameter (CA, mm), thickness (mm), TD (mm), which is an optical axis distance from the first surface S1 to the fourteenth surface S14, the focal lengths F1, F2, F3, F4, F5, F6, and F7 (mm), the sum of refractive indices, the sum of Abbe numbers, the sum of thicknesses (mm) of each of the first to seventh lenses, the sum of the distances between adjacent lenses, the characteristics of the effective diameter, the sum of the refractive index of the glass lens, the sum of the refractive index of the plastic material, the angle of view (FOV) (Degree), the edge thickness (ET), the focal length of the first and second lens groups, the F number, etc. of the optical system 1000.

TABLE 4

| Items | First embodiment | Second embodiment | Third embodiment |
|---|---|---|---|
| F | 15.100 | 15.101 | 15.230 |
| F1 | −43.294 | −53.309 | −53.004 |
| F2 | 41.765 | 50.299 | 49.903 |
| F3 | 19.482 | 20.814 | 20.589 |
| F4 | 28.823 | 15.855 | 14.687 |
| F5 | −8.433 | −7.967 | −7.790 |
| F6 | 42.249 | 33.458 | 36.300 |
| F7 | −51.089 | −51.847 | −40.756 |
| F_LG1 | −43.294 | −53.309 | −53.004 |
| F_LG2 | 10.937 | 17.877 | 11.510 |
| ΣIndex | 11.628 | 11.628 | 11.706 |
| ΣAbbe | 336.704 | 336.704 | 341.109 |
| ΣCT | 21.878 | 25.938 | 25.614 |
| ΣCG | 6.161 | 7.961 | 7.976 |
| CA_max | 12.666 | 13.837 | 13.722 |
| CA_min | 8.283 | 7.908 | 7.995 |
| CA_Aver | 10.458 | 10.592 | 10.704 |
| CT_max | 4.996 | 4.992 | 4.767 |
| CT_min | 2.000 | 2.000 | 2.000 |
| CT_Aver | 3.125 | 3.705 | 3.659 |
| CT_Max | 2.210 | 5.151 | 4.373 |
| ΣGL_Index | 8.427 | 8.427 | 8.505 |
| ΣPL_Index | 3.201 | 3.201 | 3.201 |
| ET1 | 2.551 | 4.459 | 4.8808 |
| ET2 | 4.355 | 4.464 | 4.2466 |
| ET3 | 2.754 | 3.004 | 2.4895 |
| ET4 | 3.483 | 2.632 | 2.4895 |
| ET5 | 3.483 | 4.779 | 2.5102 |
| ET6 | 0.347 | 2.001 | 4.7489 |
| ET7 | 2.551 | 2.162 | 2.0162 |
| F-number | 1.60 | 1.60 | 1.60 |
| FOV | 33.928 | 34.007 | 33.983 |
| EPD | 9.437 | 9.438 | 9.519 |
| BFL | 2.100 | 2.100 | 2.100 |
| TD | 28.039 | 33.899 | 33.589 |
| ImgH | 4.630 | 4.630 | 4.630 |
| SD | 18.834 | 19.729 | 19.981 |
| TTL | 30.842 | 36.499 | 36.292 |

Table 5 is for the resultant values of Equations 1 to 50 in the optical system 1000 of the first to second embodiments. Referring to Table 5, it may be seen that the optical system 1000 satisfies at least one, two or more, or three or more of Equations 1 to 50. In detail, it may be seen that the optical system 1000 according to the embodiment satisfies all of Equations 1 to 50 above. Accordingly, the optical system 1000 may have good optical performance at the center portion and the periphery portion of the FOV and may have excellent optical characteristics.

TABLE 5

| | Equations | First embodiment | Second embodiment | Third embodiment |
|---|---|---|---|---|
| 1 | 1 < CT6/CT7 < 3 | 1.354 | 1.343 | 1.336 |
| 2 | 0.5 < CT1/ET1 < 1 | 0.784 | 0.903 | 0.915 |
| 3 | Po1 < 0 | −0.023 | −0.019 | −0.019 |
| 4 | 1.7 < n1 | 1.856 | 1.856 | 1.856 |
| 5 | 20 < FOV_H ≤ 40 | 29.800 | 29.800 | 29.800 |
| 6 | L1R1 > 0 | 28.878 | 26.707 | 28.491 |
| 7 | 1 < L7S2_max_sag to Sensor < 3 | 2.803 | 2.600 | 2.702 |
| 8 | 0.1 < CT1/CT7 < 5 | 1.000 | 2.013 | 2.234 |
| 9 | 0 < CT1/CT6 < 3 | 0.738 | 1.499 | 1.672 |
| 10 | 1 < CT45/CT6 < 5 | 2.384 | 2.853 | 2.826 |
| 11 | 0 < L2R1/L4R2 < 1 | 0.447 | 0.408 | 0.542 |
| 12 | 0 < (CT45 − ET45) < 2 | 1.035 | 1.034 | 1.511 |
| 13 | 0 < CA_L1S1/CA_L3S1 < 2 | 0.950 | 1.122 | 1.084 |
| 14 | 0 < CA_L7S2/CA_L4S2 < 2 | 0.881 | 0.846 | 0.814 |
| 15 | 0 < CA_L1S2/CA_L2S1 < 2 | 1.016 | 1.063 | 1.052 |
| 16 | 0.5 < CA_LAS1/CA_L5S2 < 2.5 | 1.446 | 1.472 | 1.470 |
| 17 | 0.1 < CA_LAS1/CA_L4S2 < 2.1 | 1.162 | 1.135 | 1.128 |
| 18 | 1 < CA_L5S1/CAL_5S2 < 2 | 1.244 | 1.296 | 1.303 |
| 19 | 0.2 < CA_GL_AVER/CA_PL_AVER < 2.2 | 1.295 | 1.379 | 1.381 |
| 20 | 1.20 ≤ GL_CA1_AVER/PL_CA1_AVER ≤ 1.60 | 1.368 | 1.483 | 1.473 |
| 21 | CA_L6 or CA_L7 < CA_L5 | Satisfaction | Satisfaction | Satisfaction |
| 22 | CG4 < CG3 < CG5 | Satisfaction | Satisfaction | Satisfaction |
| 23 | 1 < CT7/CG6 < 3 | 2.207 | 1.473 | 1.518 |
| 24 | (CG5 + CG6) < CT4 < 2(CG5 + CG6) | Satisfaction | Satisfaction | Satisfaction |
| 25 | (CG2 + CG5) < CT2 < 2(CG2 + CG5) | Satisfaction | Satisfaction | Satisfaction |
| 26 | 1 < CT2/CT1 < 4 | 2.498 | 1.240 | 1.067 |
| 27 | 1 < \| L7R1/CT7 \| < 100 | 13.692 | 14.003 | 18.134 |
| 28 | 0 < \| L5R2/L7R1 \| < 10 | 0.228 | 0.233 | 0.188 |
| 29 | L4R1*L5R2 > 0 | 67.997 | 75.535 | 80.925 |
| 30 | 1 < L6R1/L5R2 < 10 | 3.971 | 2.818 | 2.701 |
| 31 | 0 < \| L6R2/L6R1 \| < 100 | 10.432 | 40.389 | 16.943 |
| 32 | 0 < CT_Max/CG_Max < 5 | 2.261 | 0.969 | 1.090 |
| 33 | 1 < ΣCT/ΣCG < 5 | 3.551 | 3.258 | 3.211 |
| 34 | 10 < ΣIndex < 30 | 11.628 | 11.628 | 11.706 |
| 35 | 10 < ΣAbb/ΣIndex < 50 | 28.956 | 28.956 | 29.139 |
| 36 | Distortion < 2 | 0.478 | 0.478 | 0.478 |
| 37 | 0 < ΣCT/ΣET < 2 | 1.153 | 1.104 | 1.095 |
| 38 | 0.5 < CA_L2S1/CA_min < 2 | 1.335 | 1.410 | 1.380 |
| 39 | 1 < CA_max/CA_min < 5 | 1.529 | 1.750 | 1.716 |
| 40 | 1 < CA_max/CA_Aver < 3 | 1.211 | 1.306 | 1.282 |
| 41 | 0.5 < CA_min/CA_Aver < 2 | 0.792 | 0.747 | 0.747 |
| 42 | 1 < CA_max/(2*ImgH) < 3 | 1.332 | 1.494 | 1.482 |
| 43 | 1 < TD/CA_max < 4 | 2.214 | 2.450 | 2.448 |
| 44 | 1 < F/CA_L6S1 < 10 | 1.733 | 1.805 | 1.775 |
| 45 | 0 < F/L1R1 < 1 | 0.523 | 0.565 | 0.535 |
| 46 | MAX (CT/ET) < 3 | 1.943 | 0.659 | 1.668 |
| 47 | 0 < EPD/L1R1 < 1 | 0.327 | 0.353 | 0.334 |
| 48 | −3 < F1/F3 < 0 | −2.222 | −2.561 | −2.574 |
| 49 | Po4 * Po5 < 0 | Satisfaction | Satisfaction | Satisfaction |
| 50 | 15 < \| v4 − v5 \| < 50 | 25.270 | 25.270 | 25.724 |

Table 6 shows result values for Equations 51 to 91 described above in the optical system 1000 of the first and second embodiments. Referring to Table 6, it may be seen that the optical system 1000 satisfies at least one, two or more, or three or more of Equations 51 to 91. In detail, it may be seen that the optical system 1000 according to the embodiment satisfies all of Equations 1 to 91 above. Accordingly, the optical system 1000 may have good optical performance at the center portion and the periphery portion of the FOV and may have excellent optical characteristics.

TABLE 6

| | Equations | First embodiment | Second embodiment | Third embodiment |
|---|---|---|---|---|
| 51 | 0 < \| F1\|/F < 10 | 2.867 | 3.530 | 3.480 |
| 52 | 0 < \| F5/F6 \| < 1 | 0.200 | 0.238 | 0.215 |
| 53 | 0 < \| F5/F7 \| < 1 | 0.165 | 0.154 | 0.191 |
| 54 | 0 < \| F6/F1 \| < 1.2 | 0.976 | 0.628 | 0.685 |
| 55 | 0 < \| F27\|/F < 2 | 0.724 | 1.184 | 0.756 |
| 56 | 0 < \| F27 < F6 \| < 1 | 0.259 | 0.534 | 0.317 |
| 57 | 0 < \| F27 < F7 \| < 1 | 0.214 | 0.345 | 0.282 |
| 58 | 0 < F6/F < 5 | 2.798 | 2.216 | 2.383 |
| 59 | F_LG1/F_LG2 < 0 | −3.959 | −2.982 | −4.605 |
| 60 | 1 < nGL/nPL < 4 | 2.500 | 2.500 | 2.500 |
| 61 | CA_L2 < CA_L3 > CA_L4 | Satisfaction | Satisfaction | Satisfaction |
| 62 | 0 < ΣPL_CT/ΣGL_CT < 1 | 0.274 | 0.220 | 0.223 |

TABLE 6-continued

| | Equations | First embodiment | Second embodiment | Third embodiment |
|---|---|---|---|---|
| 63 | 0 < ΣPL_Index/ΣGL_Index < 1 | 0.380 | 0.380 | 0.376 |
| 64 | 10 < TTL < 40 | 30.842 | 36.499 | 36.292 |
| 65 | 2 < ImgH | 4.754 | 4.630 | 4.630 |
| 66 | 2 < BFL < 3.5 | 2.803 | 2.600 | 2.703 |
| 67 | 1 < BFL/CG5 < 2 | 1.402 | 0.836 | 0.886 |
| 68 | CG2, CG3, CG5, CG6 < BFL | Satisfaction | Satisfaction | Satisfaction |
| 69 | 3 < F < 40 | 15.100 | 15.101 | 15.230 |
| 70 | FOV < 45 | 33.928 | 34.007 | 33.983 |
| 71 | 1 < TTL/CA_max < 5 | 2.435 | 2.638 | 2.645 |
| 72 | 2 < TTL/ImgH < 10 | 6.488 | 7.883 | 7.838 |
| 73 | 0.1 < BFL/ImgH < 1 | 0.590 | 0.562 | 0.584 |
| 74 | 5 < TTL/BFL < 20 | 11.003 | 14.038 | 13.429 |
| 75 | 1 < TTL/F < 3 | 2.043 | 2.417 | 2.383 |
| 76 | 3 < F/BFL < 10 | 5.387 | 5.808 | 5.636 |
| 77 | 1 < F/ImgH < 5 | 3.176 | 3.262 | 3.289 |
| 78 | 1 < F/EPD < 5 | 1.600 | 1.600 | 1.600 |
| 79 | 0 < BFL/TD < 0.3 | 0.1000 | 0.0767 | 0.0805 |
| 80 | 0 < EPD/ImgH/FOV < 0.2 | 0.0585 | 0.0599 | 0.0605 |
| 81 | 5 < FOV/F# < 40 | 16.298 | 21.254 | 21.240 |
| 82 | 1 < ΣGL_CT/F# < 20 | 5.374 | 7.184 | 7.263 |
| 83 | 1 < ΣPL_CT/F# < 20 | 4.150 | 5.208 | 5.258 |
| 84 | 1 < ΣGL_Index/F# < 20 | 4.048 | 5.267 | 5.316 |
| 85 | 1 < ΣPL_Index/F# < 10 | 1.538 | 2.001 | 2.001 |
| 86 | 0 < \|L1S1_sag_max\| < 0.5 | 0.224 | 0.688 | 0.618 |
| 87 | 0 < \|L1S2_sag_max\| < 1.5 | 0.734 | 1.116 | 1.042 |
| 88 | 0 < \|L2S2_sag_max\| < 2 | 0.995 | 0.980 | 0.929 |
| 89 | 0 < \|L3S1_sag_max\| < 2 | 0.984 | 0.833 | 0.820 |
| 90 | 1 < \|L4S1_sag_max\| < 3 | 1.801 | 1.738 | 1.747 |
| 91 | 1 < \|L5S2_sag_max\| < 3 | 1.536 | 1.448 | 1.448 |

Figure 36:
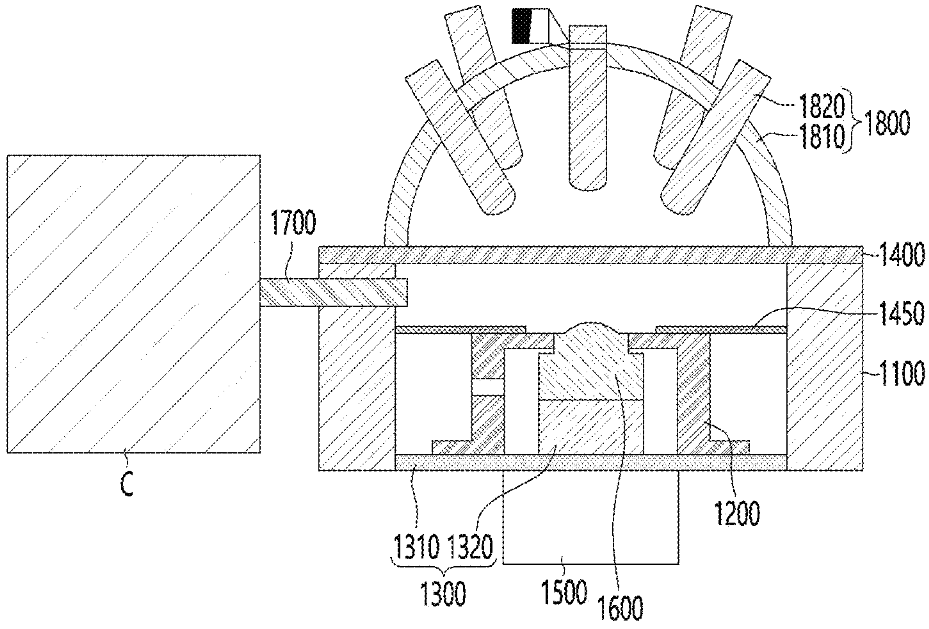
FIG. 36 is an overall cross-sectional view of an inspection equipment for a camera module having an optical system disclosed in an embodiment.
Figure 37:
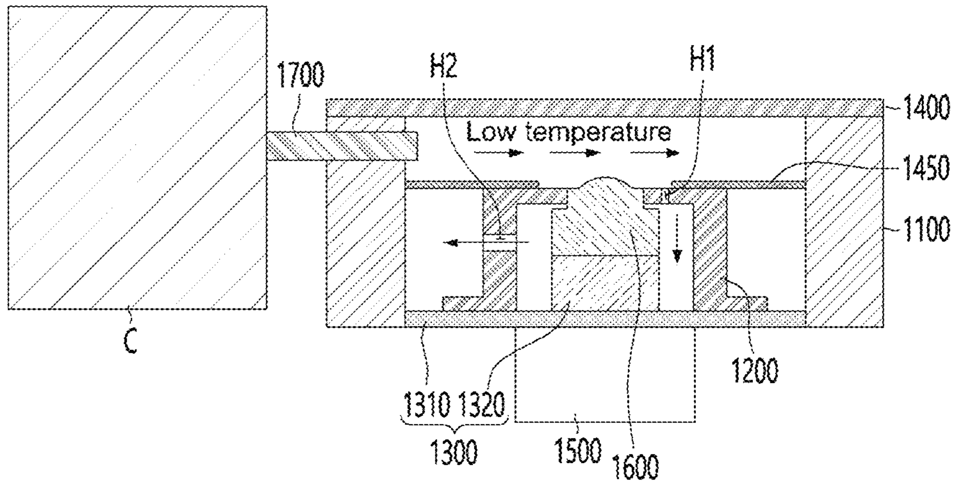
FIGS. 37 and 38 are diagrams for explaining the temperature change of the camera module inspection equipment having an optical system according to the embodiment.
Figure 38:
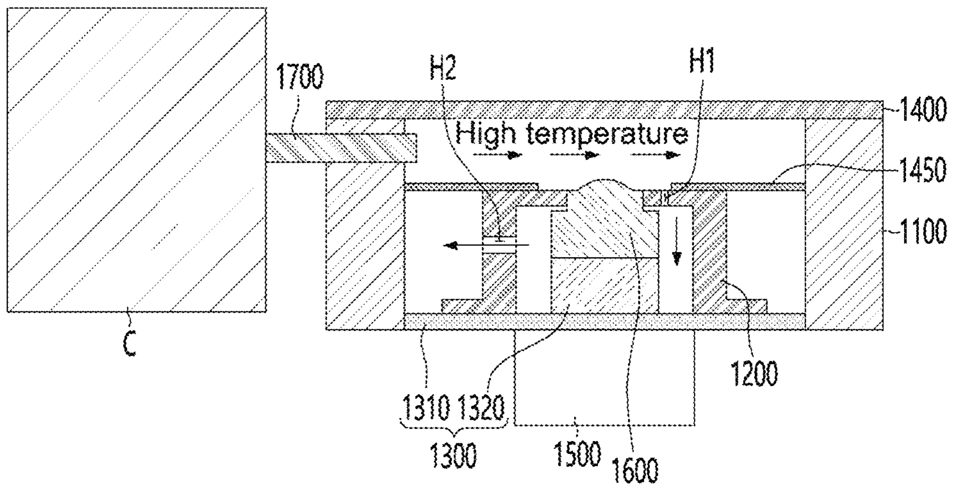

FIG. 36 is a view showing an overall cross-sectional view of inspection equipment for a camera module having an optical system disclosed in an embodiment, and FIGS. 37 and 38 are diagrams for explaining temperature changes of the camera module inspection equipment having an optical system disclosed in the embodiments. The inspection equipment of the camera module may measure the optical characteristics according to the temperature change from the low temperature to the high temperature of the optical system or the camera module described above. Referring to FIG. 36, the camera module inspection equipment according to the embodiment may include an accommodating member 1100, a fixing member 1200 disposed inside the accommodating member 1100, and a support member 1300 disposed inside the accommodating member 1100, a cover member 1400 disposed above the accommodating member 1100, a driving member 1500 disposed below the accommodating member 1100, and a light source member 1800 disposed above the accommodating member. The accommodating member 1100 may be formed in a shape with an open top. The accommodating member 1100 may include the fixing member 1200, the support member 1300, and the camera module 1600 disposed on the support member 1300. The light source member 1800 emitting light in the direction of the accommodating member 1100 may be disposed above the accommodating member 1100. Light emitted from the light source member 1800 may be incident to the camera module 1600 disposed inside the accommodating member 1100 through an open area above the accommodating member 1100.

The fixing member 1200 may fix the camera module 1600 disposed in the camera module inspection equipment. In detail, the fixing member 1200 may include a fixing region to which the camera module 1600 is fixed, and the camera module 1600 may be inserted into the fixing region and fixed through the fixing member 1200.

Accordingly, the camera module 1600 may be disposed both inside and outside the fixing member 1200. That is, the lens 1610 of the camera module 1600 may be disposed to protrude upward from the fixing member 1200. In detail, the camera module 1600 includes a lens 1610 and an image sensor 1620 disposed under the lens, and the lens 1610 protrudes upward from the fixing member 1200 and is disposed. The image sensor 16200 may be disposed inside the fixing member 1200.

The support member 1300 may support the fixing member 1200 and the camera module 1600. That is, the support member 1300 may support the fixing member 1200 and the camera module 1600 on the fixing member 1200. The support member 1300 may include a first support member 1310 and a second support member 1320. In detail, the first support member 1310 may support the second support member 1320, the fixing member 1200 and the camera module 1600. Also, the second support member 1320 may support the camera module 1600.

The support member 1300 may be disposed inside the accommodating member 1100, and the driving member 1500 may be disposed under the support member 1300. The driving member 1500 may move the second support member 1320. That is, the second support member 1320 moves through the driving member 1500, and the camera module 1600 disposed on the second support member 1320 may move together.

In detail, the second supporting member 1320 is connected to a driving shaft (not shown) of the driving member 1500, and the position, angle, and coordinates of the second supporting member 1320 may be changed through the driving shaft. The first support member 1310 between the second support member 1320 and the drive member 1500 may have a hole in which the drive shaft is disposed, and the second support member 1310 and the drive member 1500 may be connected through the drive shaft disposed inside the hole.

The position of the second support member 1320 may be changed in a horizontal direction and/or a vertical direction through the driving member 1500. That is, the position of the camera module 1600 disposed on the second support member 1320 may be changed in a horizontal direction and/or a vertical direction through the driving member 1500.

Also, the inclination angle of the second support member 1320 may be changed through the driving member 1500. That is, the inclination angle of the camera module 1600 disposed on the second support member 1320 may be changed through the driving member 1500. In addition, the coordinates of the second support member 1320 may be changed through the driving member 1500. That is, the coordinates of the camera module 1600 disposed on the second support member 1320 may be changed through the driving member 1500.

The cover member 1400 may be disposed on the accommodating member 1100. In detail, the cover member 1400 may be disposed while covering the opening region of the accommodating member 1100. The cover member 1400 may serve to seal the inside of the accommodating member 1100. Accordingly, the cover member 1400 may serve to change and maintain the internal temperature of the accommodating member 1100. That is, when the internal temperature of the accommodating member 1100 is changed through the cover member 1400, the internal temperature of the accommodating part 1100 may be easily changed by blocking the accommodating member 1100 from the outside. In addition, after changing the internal temperature of the accommodating member 1100, the changed internal temperature of the accommodating member 1100 may be maintained through the cover member 1400. Accordingly, the camera module equipment according to the embodiment may measure the performance of the camera module at various temperatures.

Meanwhile, a shielding member 1450 may be further disposed between the fixing member 1200 and the cover member 1400. The shielding member 1450 may serve to block the upper and lower portions of the fixing member 1200. The light source member 1800 may be disposed above the accommodating part 1100. The light source member 1800 may emit light toward the camera module 1600 disposed inside the accommodating member 1100.

Meanwhile, the camera module device according to the embodiment may include an air inlet 1700. The air inlet 1700 may be connected to the side of the accommodating member 1100. In detail, one end of the air inlet 1700 may be connected to the external chamber C, and the other end may be connected to the side of the accommodating member 1100. The air inlet 1700 may introduce air into the accommodating member 1100. In detail, the air inlet 1700 may introduce air having a set temperature range into the accommodating member 1100 through an external chamber. For example, the air inlet 1700 may introduce air having a temperature higher than room temperature or air having a temperature lower than room temperature into the accommodating member 1100. The temperature inside the accommodating member 1100 may change according to the temperature of the air introduced through the air inlet 1700. That is, the temperature inside the accommodating member 1100 may be changed to a temperature lower than room temperature, room temperature, or higher than room temperature.

FIGS. 37 and 38 are views for explaining that the temperature of the camera module device is changed. The camera module device may maintain room temperature when air is not introduced through the air inlet 1700. Here, the room temperature state may mean a temperature of 20° C. to 25° C. Referring to FIGS. 37 and 38, the temperature of the camera module device may be changed to a low temperature state lower than room temperature or a high temperature state higher than room temperature. In detail, when measuring camera module performance at a lower temperature than room temperature, air with a set temperature may be generated in the chamber, as shown in FIG. 2, and the low temperature air may flow into the accommodating member 1100 through the air inlet 1700. Alternatively, when measuring the performance of the camera module at a high temperature, as shown in FIG. 3, air with a high temperature in a set range may be generated in the chamber, and the high temperature air may flow into the accommodating member 1100 through the air inlet 1700.

The air introduced into the accommodating member 1100 may be exhausted to the outside of the accommodating member via the inside of the fixing member 1200 by air flow inside the accommodating member. In detail, the fixing member 1200 may have at least one hole through which the air can move. For example, holes through which air can move may be formed on the top and side surfaces of the fixing member 1200. For example, a first hole H1 may be formed on an upper surface of the fixing member 1200 and a second hole H2 may be formed on a side surface of the fixing member 1200.

Air introduced into the accommodating member through the air inlet 1700 may move into the fixing member through the first hole H1 while circulating in the accommodating member 1100. Next, the air moved into the fixing member 1200 may circulate inside the fixing member 1200 to the outside of the fixing member 1200 through the second hole H2, and may be exhausted to the outside through an air exhaust formed on the side of the accommodating member 1100.

Accordingly, the air having a predetermined range of temperature introduced into the accommodating member through the air inlet is exhausted to the outside while circulating the inside of the accommodating member, and the camera module may measure performance of the camera module in a predetermined range of temperature environment.

The size and location of the air inlet 1700 may be related to the lens of the camera module fixed to the fixing member 1200. In detail, the air inlet 1700 may be positioned so that the lens 1610 of the camera module is located within the diameter of the air inlet 1700. For example, when the lens 1610 of the camera module is a convex lens, the uppermost surface of the convex lens may be located within the diameter of the air inlet. Alternatively, when the lens of the camera module is a concave lens, the uppermost surface of the fixing member on which the concave lens is disposed may be located within the diameter of the air inlet.

Accordingly, since the low-temperature or high-temperature air coming out of the air inlet may sufficiently contact the lens disposed on the fixing member, performance measurement according to the temperature change of the camera module equipment, that is, the temperature change from low temperature to high temperature may be measured more precisely.

Figure 39:
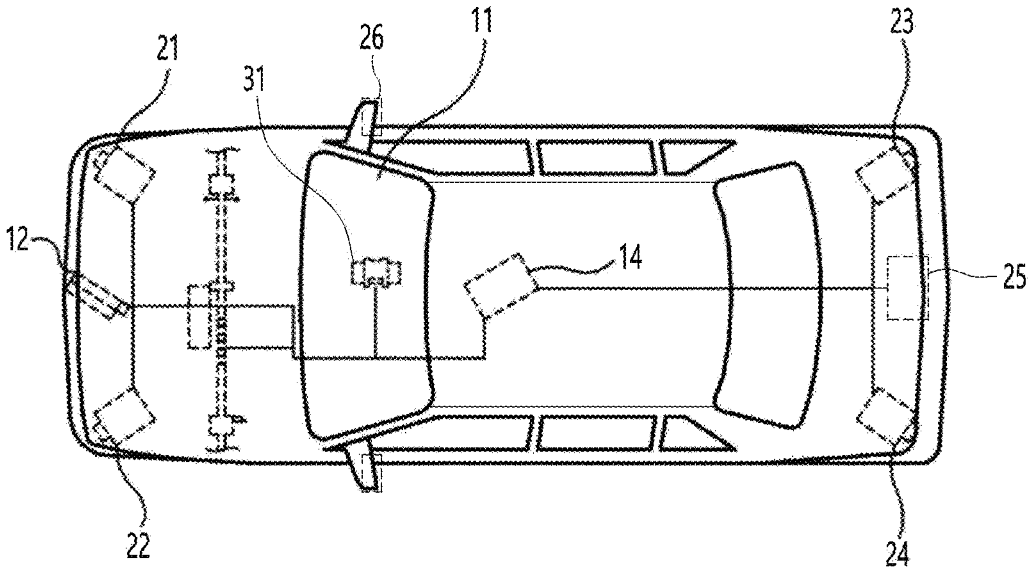
FIG. 39 is an example of a vehicle having an optical system according to an embodiment of the invention.

FIG. 39 is an example of a plan view of a vehicle to which a camera module or optical system according to an embodiment of the invention is applied. Referring to FIG. 39, the vehicle camera system according to an embodiment of the invention includes an image generating unit 11, a first information generating unit 12, second information generating units 21, 22, 23, and 24, and a control unit 14. The image generating unit 11 may include at least one camera module 20 disposed in the own vehicle, and may generate a front image of the own vehicle or an image inside the vehicle by photographing the front and/or driver of the own vehicle. In addition, the image generating unit 11 may generate an image captured by the driver or the surroundings of the own vehicle in one or more directions as well as in front of the own vehicle by using the camera module 20. Here, the front image and the surrounding image may be a digital image, and may include a color image, a black-and-white image, and an infrared image. In addition, the front image and the surrounding image may include a still image and a moving image. The image generating unit 11 provides the driver image, the front image, and the surrounding image to the control unit 14. Next, the first information generating unit 12 may include at least one radar and/or a camera disposed on the own vehicle, and generates first detection information by detecting the front of the own vehicle. Specifically, the first information generating unit 12 is disposed in the own vehicle, and generates the first sensing information by detecting the positions and speeds of vehicles located in front of the own vehicle, the presence and location of pedestrians, and the like.

By using the first detection information generated by the first information generating unit 12, it is possible to control to maintain a constant distance between the own vehicle and the vehicle in front, and the stability of vehicle operation may be improved in a preset specific case, such as when the driver wants to change the driving lane of the own vehicle or when reverse parking. The first information generating unit 12 provides the first detection information to the control unit 14. The second information generating unit 21, 22, 23, 24 detect each side of the own vehicle and generate second sensing information based on the front image generated by the image generating unit 11 and the first sensing information generated by the first information generating unit 12. Specifically, the second information generating units 21, 22, 23, and 24 may include at least one radar and/or camera disposed on the own vehicle, and detect the positions and speeds of vehicles located on the side of the own vehicle, or may take a video. Here, the second information generating units 21, 22, 23, and 24 may be disposed on both sides of the front and rear of the own vehicle, respectively. Such a vehicle camera system may include the following camera module, and may protect the vehicle and objects from automatic driving or surrounding safety by providing or processing information obtained through the front, rear, each side or corner region of the own vehicle to the user.

At least one information generating unit of such a vehicle camera system may include the optical system described in the above-described embodiment(s) and a camera module having the same, and information obtained through the front, rear, each side or corner region of the vehicle may be provided or processed to the user to protect the vehicle and the object from automatic driving or ambient safety. A plurality of optical systems of the camera module according to an embodiment of the invention may be mounted in a vehicle for safety regulation, reinforcement of autonomous driving functions, and increased convenience. In addition, the optical system of the camera module is a part for control such as a lane keeping assistance system (LKAS), a lane departure warning system (LDWS), and a driver monitoring system (DMS), and is applied in a vehicle. Such a vehicle camera module may realize stable optical performance even when ambient temperature changes and provide a module with competitive price, thereby securing reliability of vehicle components.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:

an image sensor; and first to seventh lenses aligned along an optical axis from an object side to a sensor side, wherein a refractive power of the first lens is negative, wherein a composite refractive power of the second lens to the seventh lens is positive, wherein at least one of the sixth lens and the seventh lens is made of a plastic material, wherein each of the first to seventh lenses has an object-side surface and a sensor-side surface, and wherein a difference between effective diameters of the object-side surface and the sensor-side surface of the fifth lens is a largest among differences between effective diameters of the object-side surface and the sensor-side surface of each of the first to seventh lenses.

2. The optical system of claim 1, wherein an absolute value of a radius of curvature of the sensor-side surface of the fifth lens is a smallest among absolute values of a radius of curvature of the object-side surface and the sensor-side surfaces of the first to seventh lenses.

3. The optical system of claim 1, wherein based on the optical axis, a distance from the sensor-side surface of the second lens to the object-side surface of the third lens is G2, a distance from the sensor-side surface of the third lens to the object-side surface of the fourth lens is G3, a distance from the sensor-side surface of the fifth lens to the object-side surface of the sixth lens is G5, and a distance from the sensor-side surface of the sixth lens to the object-side surface of the seventh lens is G6, wherein G5 is a largest distance among G2, G3, G5, and G6.

4. The optical system of claim 3, wherein a distance on the optical axis from the sensor-side surface of the first lens to the object-side surface of the second lens is G1, and a distance on the optical axis from the sensor-side surface of the seventh lens to the image sensor is BFL, and wherein BFL is the largest distance among G1, G2, G3, G5, G6, and BFL.

5. The optical system of claim 1, wherein the effective diameter of the object-side surface of the fourth lens is CA_L4S1, wherein the effective diameter of the sensor-side surface of the fourth lens is CA_L4S2, and $$\text{Equation satisfies: } 1.3 \leq CA\_L4S1/CA\_L4S2 \leq 1.6.$$

6. The optical system of claim 1, wherein an average value of the effective diameters of the object-side surface of each of the first to fifth lenses is GL_CA1_AVER, wherein an average value of the effective diameters of the object-side surface of each of the sixth to seventh lenses is PL_CA1_AVER, and $$\text{Equation satisfies: } 1.20 \leq GL\_CA1\_AVER/PL\_CA1\_AVER \leq 1.55.$$

7. An optical system comprising:

a plurality of lenses and image sensor, each of the lenses having an object-side surface and a sensor-side surface, wherein a first lens closest to an object among the plurality of lenses is a first glass lens and has negative refractive power, wherein a composite refractive power of lenses other than the first lens is positive, wherein at least two or more lenses adjacent to the image sensor among the plurality of lenses are plastic lenses, wherein an effective diameter of the object-side surface of each of the plastic lenses is smaller than an effective diameter of the object-side surface of the first glass lens, wherein the sensor-side surface of a second glass lens closest to the plastic lenses among the plurality of lenses has an effective diameter smaller than that of the sensor-side surface of another glass lens disposed between the first glass lens and the second glass lens, and wherein the sensor-side surface of the second glass lens has a concave shape on an optical axis.

8. The optical system of claim 7, wherein a lens closest to the image sensor is a first plastic lens, wherein an effective diameter of the object-side surface of the first plastic lens is smaller than an effective diameter of the sensor-side surface of the first plastic lens.

9. The optical system of claim 8, wherein a distance on the optical axis between the sensor-side surface of the first plastic lens and the image sensor is greatest among distances on an optical axis between adjacent lenses of the plurality of lenses.

10. The optical system of claim 7, wherein the object-side surface of the first lens has a convex shape on the optical axis, and wherein the plurality of lenses is seven lenses, wherein the optical system has a horizontal angle of view (FOV_H) of 30 degrees or more and 40 degrees or less.

11. The optical system of claim 8, wherein a difference between effective diameters of the object-side surface and the sensor-side surface of the second glass lens is a largest among differences between effective diameters of the object-side surface and the sensor-side surface of each of the plurality of lenses.

12. The optical system claim 7, wherein a refractive index of the first lens is greater than 1.7, wherein the object-side surface of the first lens based on the optical axis has a convex shape, and the sensor-side surface of the first lens has a concave shape based on the optical axis.

13. The optical system of claim 12, wherein the optical system has a horizontal angle of view of 30 degrees or more and 40 degrees or less.

14. The optical system of claim 12, wherein two of the plurality of lenses are combined lenses bonded to each other, wherein the combined lens includes a first combined lens and a second combined lens, wherein a product of a refractive power of the first combined lens and a refractive power of the second combined lens is smaller than zero.

15. The optical system of claim 14, wherein a difference between an Abbe number of the first combined lens and an Abbe number of the second combined lens is 20 or more and 40 or less.

16. The optical system of claim 14, wherein a distance on the optical axis between the combined lens and a lens disposed on an object side from the combined lens is smaller than a distance on the optical axis between the image sensor and a last lens.

17. The optical system of claim 12, comprising an aperture stop disposed around the sensor-side surface of the second lens.

18. The optical system of claim 12, wherein a distance from the first glass lens to the image sensor is TTL, wherein a total effective focal length is F, and $$\text{Equation satisfies: } 1.8 \leq TTL/F \leq 2.3.$$

19. The optical system of claim 12, wherein the object-side surface and the sensor-side surface of the first lens are aspheric surfaces.

20. A camera module comprising:

a plurality of lenses and image sensor, wherein a refractive power of the first lens closest to an object among the plurality of lenses is negative, wherein a composite refractive power of lenses other than the first lens is positive, wherein at least two or more lenses adjacent to the image sensor among the plurality of lenses are plastic lenses, wherein the first lens and the plastic lenses are aspheric lenses, wherein a horizontal angle of view is 30 degrees or more and 40 degrees or less, and wherein when a temperature changes from room temperature (25 degrees) to high temperature (85 degrees to 105 degrees), a rate of change of effective focal length and angle of view is 0 to 5%, and wherein a difference between effective diameters of an object-side surface and a sensor-side surface of a last glass lens disposed between the first lens and the plastic lenses is a largest among differences between effective diameters of an object-side surface and a sensor-side surface of each of the plurality of lenses.

* * * * *